US006633797B1

(12) United States Patent
Akella et al.

(10) Patent No.: US 6,633,797 B1
(45) Date of Patent: Oct. 14, 2003

(54) AUTOMATED RECONFIGURABLE OBJECT MANIPULATION DEVICE WITH AN ARRAY OF PINS

(76) Inventors: Srinivas Akella, P.O. Box 12, Troy, NY (US) 12181; Sebastien L. Blind, 1820 N. Quinn St. #605, Arlington, VA (US) 22209; Christopher McCullough, 12282 Cornwallis Sq., San Diego, CA (US) 92128; Jean Ponce, 914 S. Lynn St., Champaign, IL (US) 61820

( * ) Notice: Subject to any disclaimer, the term of this patent is extended or adjusted under 35 U.S.C. 154(b) by 53 days.

(21) Appl. No.: 09/705,855

(22) Filed: Nov. 3, 2000

Related U.S. Application Data
(60) Provisional application No. 60/163,278, filed on Nov. 3, 1999.

(51) Int. Cl.[7] .............................................. G06F 19/00
(52) U.S. Cl. ....................... 700/245; 700/126; 700/182; 700/161; 29/430
(58) Field of Search ................................ 700/245, 126, 700/182, 161; 324/758; 29/430, 466, 469, 559, 563; 269/21, 20, 56.6, 305, 900; 273/108, 118 A, 118 R, 121 B; 463/16, 36

(56) References Cited

U.S. PATENT DOCUMENTS

| | | | |
|---|---|---|---|
| 4,640,501 A | * 2/1987 | Poland | 269/21 |
| 4,794,687 A | * 1/1989 | Peters et al. | 29/559 |
| 4,901,990 A | * 2/1990 | Frechette | 269/25 |
| 5,239,739 A | * 8/1993 | Akeel et al. | 29/430 |
| 5,343,611 A | * 9/1994 | Lager et al. | 29/559 |
| 5,408,189 A | * 4/1995 | Swart et al. | 324/758 |
| 5,856,924 A | * 1/1999 | Brost et al. | 700/182 |
| 6,000,696 A | * 12/1999 | Yamazaki et al. | 273/108 |

OTHER PUBLICATIONS

Blind et al., A reconfigurable parts feeder with an array of pins, 2000, IEEE, pp. 147–153.*
Blind et al., Manipulating parts with an array of pins, 2001, Internet, pp. 1–18.*
Zhang et al., Pin design for part feeding, 2001, Internet, pp. 1–10.*
Blind et al., Manipulaitng parts with an array of pins: A method and a machine, Oct. 1999, Internet, p. 1.*
Tamara Abell, Michael Erdmann, Stably Supported Rotations of a Planar Polygon with Two Frictionless Contacts, 0–8186–7108–4/95 IEEE, pp. 411–418.
Randy C. Brost, Dynamic Analysis of Planar Manipulation Tasks, International Conference on Robotics and Automation, 0–8186–2720–4/92 IEEE, pp. 2247–2254, Nice, France.
Randy C. Brost, Kenneth Y. Goldberg, A Complete Algorithm for Designing Planar Fixtures Using Modular Components, IEEE Transactions on Robotics and Automation, 1042–296X, Feb. 1996, pp. 31–46, vol. 12, No. 1.
Randy C. Brost, Ralph R. Peters, Automatic Design of 3–d Fixtures and Assembly Pallets, 0–7803–2988–4/96 IEEE, pp. 495–502, Minneapolis Minnesota.
John F. Canny, Kenneth Y. Goldberg, "Risc" for Industrial Robotics: Recent Results and Open Problems, 1050–4729/94 IEEE, pp. 1951–1958.

(List continued on next page.)

Primary Examiner—William A. Cuchlinski, Jr.
Assistant Examiner—McDieunel Marc
(74) Attorney, Agent, or Firm—Heslin Rothenberg Farley & Mesiti P.C.

(57) ABSTRACT

An apparatus for manipulating an object to a desired state. The object is received by a grid of retractable pins. A control component determines, through employment of a manipulation algorithm, one or more retractable pins to actuate to place the object in the desired state. The pins are then actuated by an actuation component that is coupled to both the grid of retractable pins and the control component.

19 Claims, 46 Drawing Sheets

OTHER PUBLICATIONS

G.S. Chirikjian, Kinematic Synthesis of Mechanisms and Robotic Manipulators with Binary Actuators, Journal of Mechanical Design, Dec. 1995, pp. 573–580, vol. 117.

A.O. Farahat, P.F. Stiller, J.C. Trinkle, On the Geometry of Contact Formation Cells for Systems of Polygons, IEE Transactions on Robotics and Automation, 1042–296X, Aug. 1995, pp. 522–536, vol. 11, No. 4.

Ronald S. Fearing, Simplified Grasping and Manipulation with Dextrous Robot Hands, IEEE Journal of Robotics and Automation, 0882–4967/86/1200–0188, Dec. 1986, pp. 188–195, vol. RA–2, No. 4.

David J. Kriegman, Let Them Fall Where They May: Capture Regions of Curved Objects and Polyhedra, The International Journal of Robotics Research, Aug. 1997, pp. 448–472, vol. 16, No. 4, Massachusetts Institute of Technology.

Susanna Leveroni, Kenneth Salisbury, Reorienting Objects with a Robot Hand Using Grasp Gaits, pp. 39–51.

Richard Mason, Elon Rimon, Joel Burdick, The Stability of Heavy Objects with Multiple Contacts, IEEE International Conference on Robotics and Automation, 0–7803–1965–6/95, pp. 439–445.

Anil Rao, David J. Kriegman, Kenneth Y. Goldberg, Complete Algorithms for Feeding Polyhedral Parts Using Pivot Grasps, IEEE Transactions on Robotics and Automation, 1042–296X, Apr. 1996, pp. 331–342, vol. 12, No. 2.

Attawith Sudsang, Jean Ponce, Narayan Srinivasa, Algorithms for Constructing Immobilizing Fixtures and Grasps of Three–Dimensional Objects, pp. 363–380.

A.S. Wallack, J.F. Canny, Planning for Modular and Hybrid Fixtures, Algorithmica, 1997, pp. 40–60, Springer–Verlag New York Inc.

* cited by examiner

STEP 7

STEP 8

STEP 9

STEP 10

STEP 7

STEP 8

STEP 9

STEP 10

AUTOMATED RECONFIGURABLE OBJECT MANIPULATION DEVICE WITH AN ARRAY OF PINS

CROSS REFERENCE TO RELATED APPLICATION

This application claims priority from U.S. provisional application No. 60/163,278, filed Nov. 3, 1999.

STATEMENT REGARDING FEDERAL SPONSORSHIP

This invention was made with Government support under Grant Number IRI-9634393 awarded by the National Science Foundation. The Government has certain rights in this invention.

FIELD OF THE INVENTION

The present invention relates generally to object manipulation devices.

BACKGROUND OF THE INVENTION

Object manipulation devices, such as parts feeding devices and parts nests, are often used to manufacture products. For instance, a parts feeding device can convey parts to a phase of product assembly. Similarly, a parts nest can capture parts in a desired orientation.

Unfortunately, these devices are not easily configurable. For example, parts feeding devices, such as bowl feeders, are typically custom designed and machined, and have to be redesigned when an object or part shape is changed or introduced.

Accordingly, a need exists for easily reconfigurable object manipulation devices.

SUMMARY OF THE INVENTION

Pursuant to the present invention, shortcomings of the existing art are overcome and additional advantages are provided through the provision of an automated reconfigurable parts feeder with an array of pins.

The invention in one embodiment encompasses a method for manipulating an object to a desired state. The object is received in a grid of retractable pins such that the object rests in an initial equilibrium state. A manipulation algorithm is employed to determine one or more retractable pins to actuate to place the object in the desired state. Then, the one or more retractable pins are actuated.

Another embodiment of the invention encompasses an apparatus for manipulating an object to a desired state. The apparatus comprises a grid of retractable pins to receive the object. A control component determines, through employment of a manipulation algorithm, one or more retractable pins to actuate to place the object in the desired state. Finally, an actuation component, coupled to both the grid of retractable pins and the control component, actuates the one or more pins.

DETAILED DESCRIPTION

Figure 1:
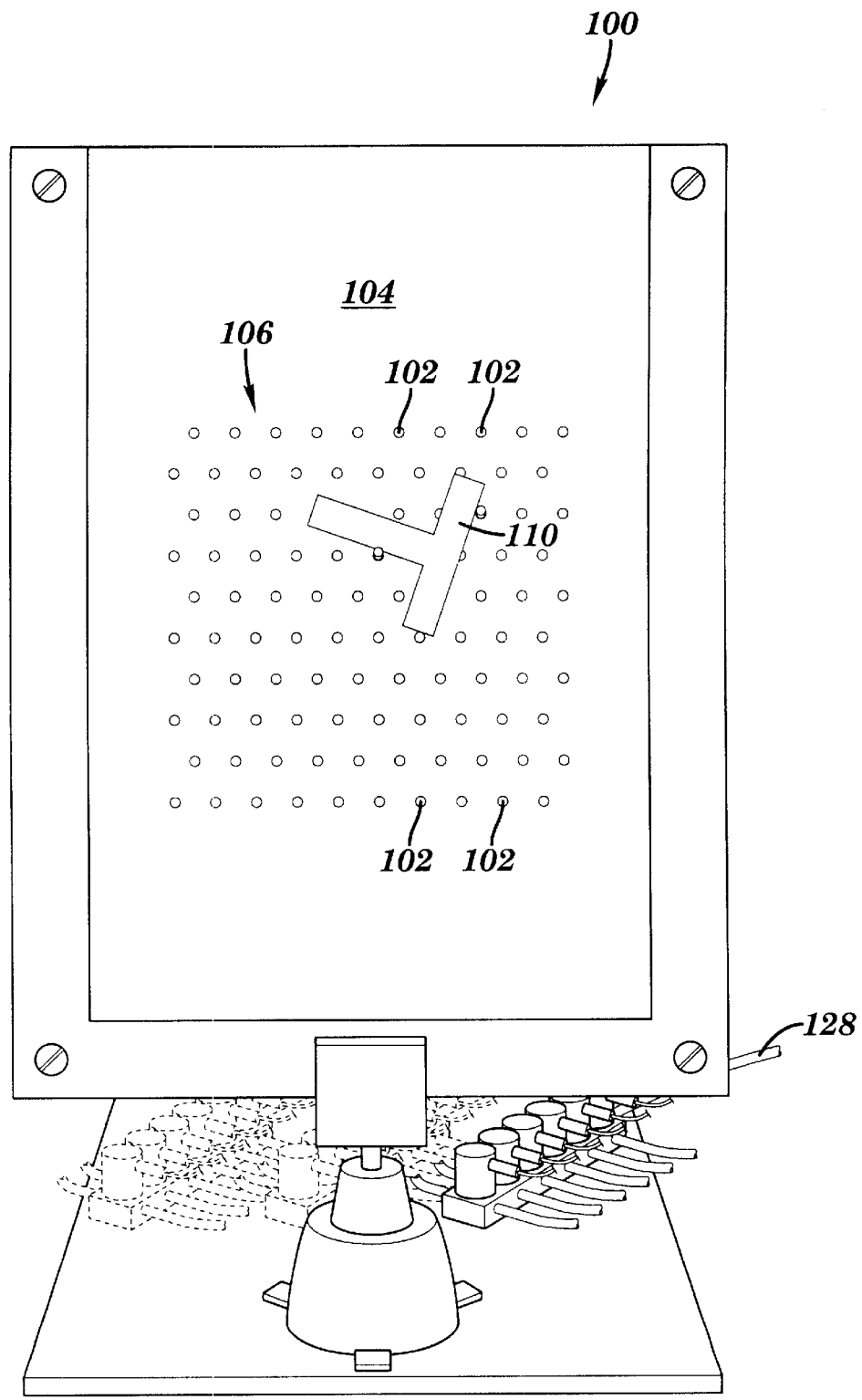
FIG. 1 is a front view of an object manipulation device at the start of a sequence.
Figure 2:
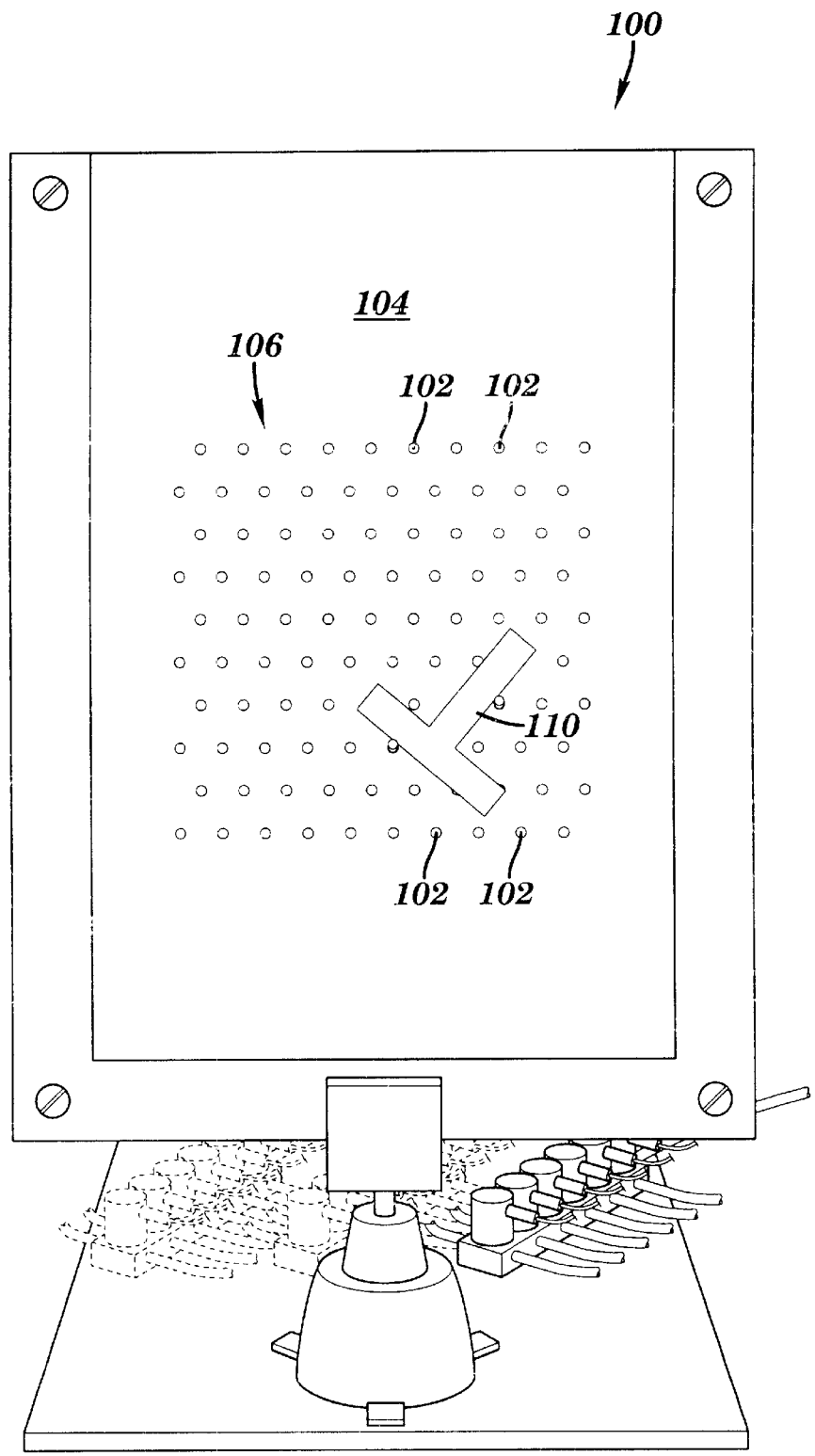
FIG. 2 is the front view of the object manipulation device at the end of a sequence.
Figure 3:
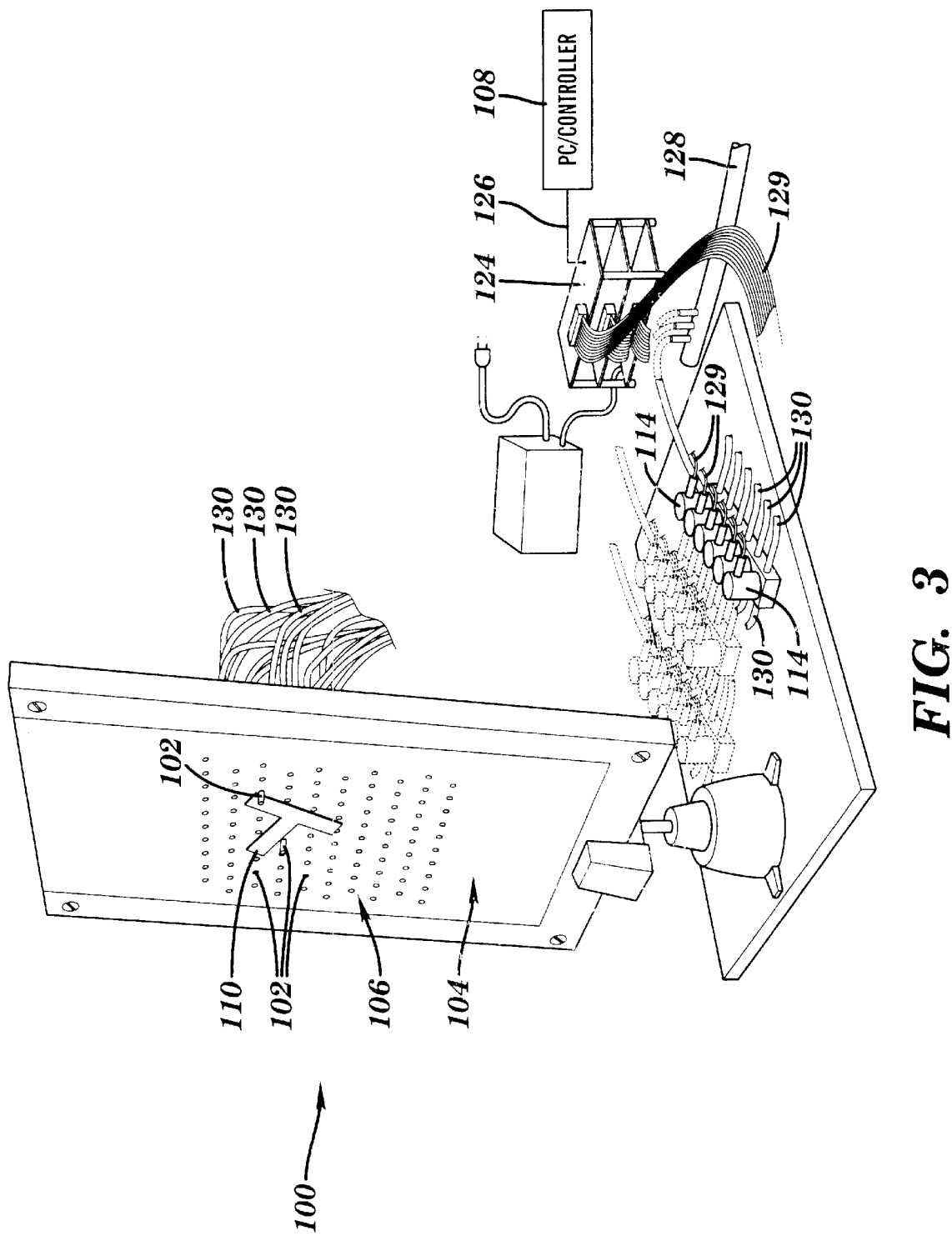
FIG. 3 is a side perspective view of the object manipulation device.

FIGS. 1–4 show an object manipulation device 100 having of an array of actuated pins 102 mounted on a plate 104 slightly tilted from the vertical; the device 100 can capture, orient, transfer, sort, and recognize objects. The pins 102 are arranged along a grid 106; they are individually controlled by a computer 108, and can be either retracted below the surface of the plate 104, or actuated to project out of the plate and constrain possible object motions. Objects 110 dropped on the device from above are manipulated under the action of gravity by sequences of pin retractions and actuations, and delivered at the bottom of the object manipulation device 100. Potential applications of the invention include automated parts feeding and product assembly for a broad class of products including cellular phones, VCRs, and automotive components.

The device handles different part shapes with just a change in the pin actuation sequence. It orients and feeds parts for product assembly with minimum changeover and setup time. Given a new object, a new sequence of pin actuations to orient and transfer parts can be generated, using manipulation algorithms. This is in sharp contrast to devices such as bowl feeders that have to be redesigned when the part or object shape is changed. The device uses pneumatic cylinders 112 as binary on-off actuators. This greatly simplifies the control and implementation of the device 100.

Preparing the device 100 for a new object 110 consists of running software with the manipulation algorithms to automatically generate a new sequence of pin 102 activations. The device 100 is reconfigurable, meaning that it can be automatically configured to adapt to a new object shape.

The subsets of pins 102 are actuated to catch and reorient objects 110 as they move into contact with the pins due to a drift field created by gravity or a conveyor belt. The device 100 is software based to automatically compute the possible contact and equilibrium configurations of an object 110 with the pins 102, and select a sequence of pin actuations to manipulate the object as desired. The part manipulations consist of sequences of deterministic transitions. The device 100 can also use nondeterministic transitions in the manipulation sequences.

In addition to performing such tasks as automatic parts feeding, the device 100 can sort and transfer parts for product assembly. Further, the device 100 assists in the direct assembly of parts through its ability to manipulate parts.

The object manipulation device 100 was developed in the Robotics lab of the Beckman Institute at the University of Illinois at Urbana-Champaign. This device 100 consists of a grid 106 of pneumatic cylinders 112 on a slightly tilted vertical plexiglass plate 104. The device 100 has pins 102 arranged in a staggered grid 106. The pins 102 may also be arranged in a rectangular grid, or other grid arrangements. When an object 110 drops on the plate, it rests on pins 102 of a set of actuated cylinders 112. By retracting and actuating the pins 102, based on planning software, the device 100 can move, orient, and sort objects. Given a sequence of pin actuations, the control software which is stored in memory of computer controller 108 and written in assembly and C++, converts it into serial data sent to a single pin of the parallel port of a computer controller device, such as a PC. The other outputs of the parallel port are used as various clock and circuit control signals. A circuit, which is a serial to parallel converter, receives the data stream and converts it to a coordinated signal, such as a voltage boosted parallel output, that activates appropriate solenoid valves 114. These valves 114 in turn activate the corresponding cylinders 112 and actuate or retract the pins and thereby manipulate the object 110.

The object manipulation device 100 as seen in FIGS. 1–4 has pins 102 that are the metal shafts of pneumatic cylinders 112, which are mounted on a plexiglass plate 104 tilted from vertical. Solenoid valves 114 that preferably are independently controlled by a PC (personal computer) controller device 108 actuate the pneumatic cylinders 112.

The manipulation algorithm may selectively be implemented in C++. The computation of the capture graph of a T-shaped object currently takes 3 hours and 45 minutes on a 233 MHz Pentium II microprocessor device. The graph is composed of 1013 nodes and 14889 links.

When a part 110 is dropped on device 100, it may come to rest on two or three of the actuated pins, or bounce out or fall through. Carefully selecting the set of actuated pin 102 for a given part shape controls the set of captured equilibrium part configurations. The objective is to compute a sequence of pin actuations and retractions that brings the part 110 to some desired configuration by a sequence of transitions from one set of pins to the next.

The approach is based on the construction of the capture region of each part, i.e., the maximal subset of the configuration space of the part such that any motion starting within this subset is guaranteed to end up in the equilibrium configuration. In other words, capture regions are the largest region of free configuration space such that: (1) kinematic contact and energy constraints prevent the object from escaping it, and (2) the object eventually comes to rest at an equilibrium configuration. The capture regions are constructed using the kinematic and dynamic constraints on part motion. Under this framework, manipulation planning amounts to constructing a directed transition graph whose nodes consist of equilibrium states and whose arcs link pairs of nodes such that the first equilibrium lies in the capture region of the second one, and then exploring this graph to find paths from initial to goal nodes. An algorithm has been implemented to generate these paths, and device 100 operates in accordance with this method.

A discussion of capture regions and modular fixtures is provided in R. Brost, *Dynamic Analysis of Planar Manipulation Tasks,* IEEE Int. Conf. On Robotics and Automation, pp. 2247–2254, Nice, France, June 1992, ("Brost 1"); R. Brost and K. Goldberg, *A Complete Algorithm for Synthesizing Modular Fixtures for Polygonal Parts,* IEEE International Conference on Robotics and Automation, pp. 535–542, San Diego, Calif., May 1994, ("Brost & Goldberg");. R. C. Brost and R. R. Peters, *Automatic Design of 3d Fixtures and Assembly Pallets,* IEEE International Conference on Robotics and Automation, pp. 495–502, Minneapolis, Minn., April 1996, ("Brost & Peters"); D. Kriegman, *Let Them Fall Where They May: Capture Regions of Curved Objects and Polyhedra,* International Journal of Robotics Research, 16(4): 448–472, August 1997 ("Kriegman").

This approach does not assume that contact is maintained during the manipulation phase, nor does it attempt to predict the exact object motion between equilibria. When a part falls 110 on the pins 102 from above, it may slide, rotate, break contact, or bounce, but will end up being supported by two or three of the pins. Accurately predicting the motion of the part is difficult, even when detailed models of friction and contact dynamics are available. Instead, frictionless contacts and dissipative dynamics are assumed, and the approach avoids this prediction step by reducing the problem of planning the overall motion of an object 110 to constructing a sequence of deterministic transitions between equilibrium states of the object.

The device 100 is intended in one example for implementation as a parts feeding device for flexible assembly. It uses simple binary actuators, has a modular design, and can be reconfigured automatically to adapt to different polygonal part shapes. Such automatic devices to feed parts can potentially replace fixed automation devices such as bowl feeders. The device 100 can also be used as a parts nest to capture parts in a single configuration, with parts that are not captured being recirculated. More interestingly, it also may selectively be used to bring a part dropped from an unknown or uncertain initial configuration to a desired configuration, a process dubbed herein as reorienting the part, despite the fact that both orientation and position changes are involved. The device 100 also distinguishes and sorts parts by using the same set of pins 102 to induce different part motions for different parts.

Figure 4:
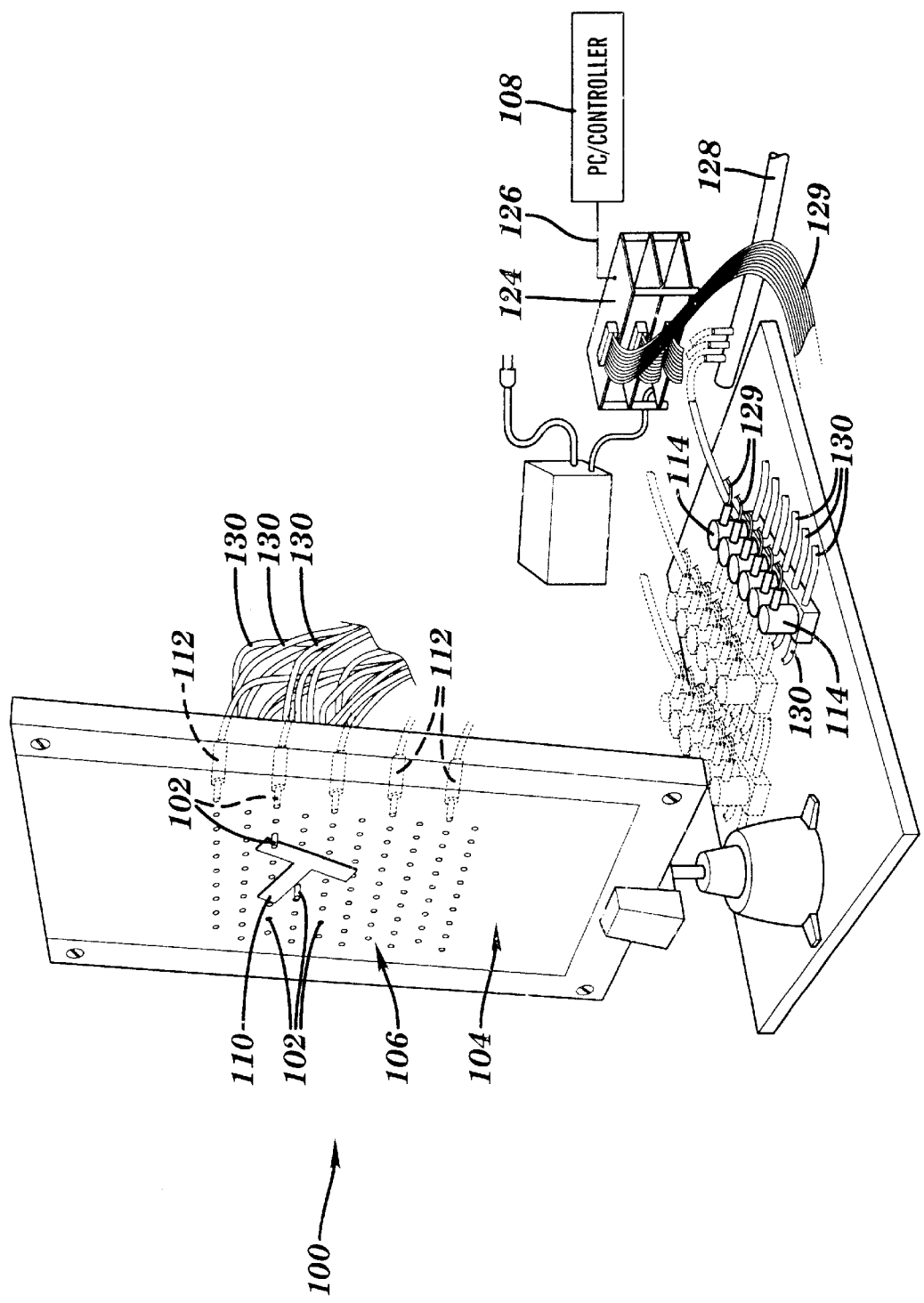
FIG. 4 is a side view of the object manipulation device.
Figure 4A:
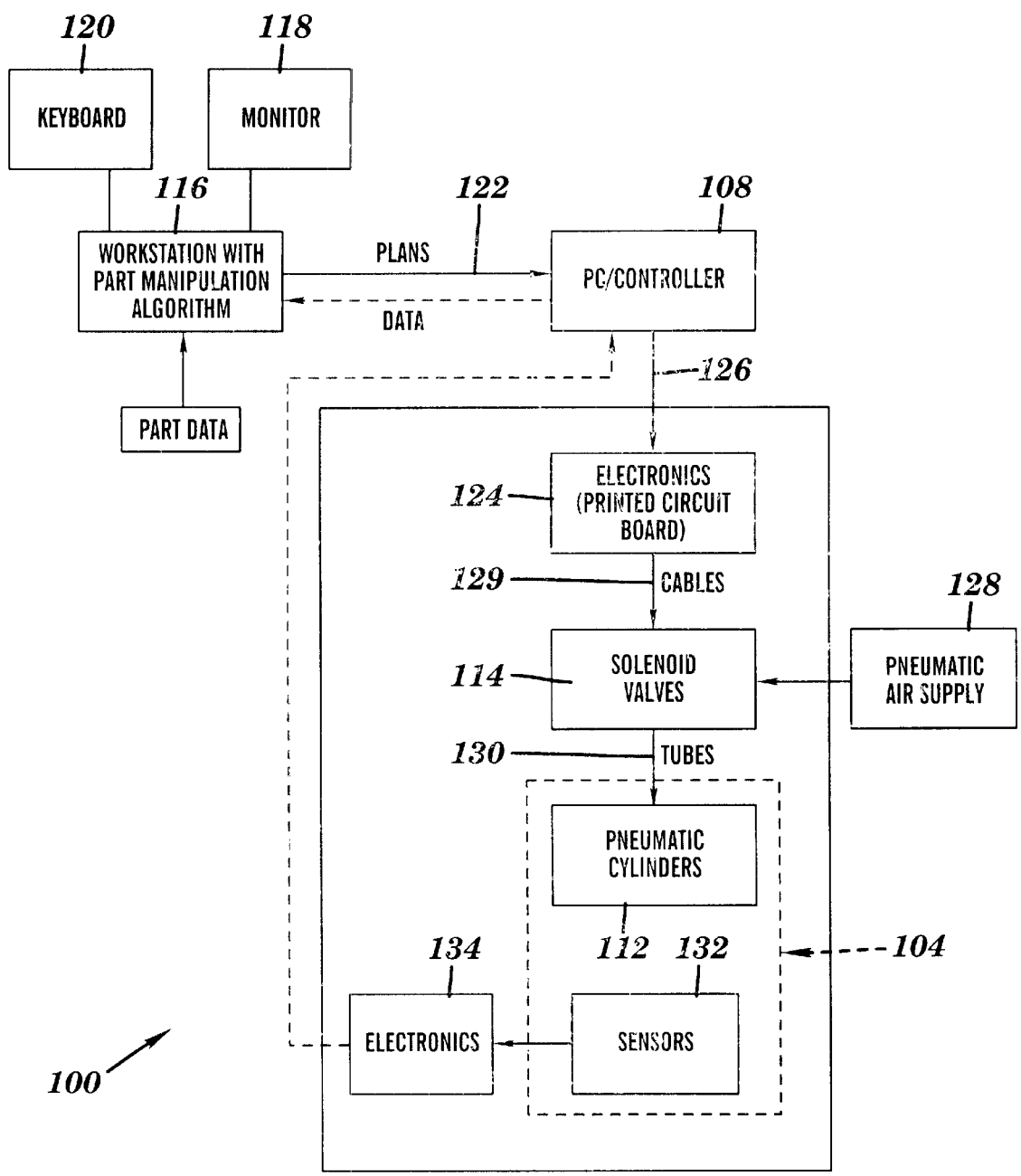
FIG. 4A is a schematic block diagram of the object manipulation device.

Referring now to FIG. 4A, a schematic block diagram of the object manipulation device 100 is shown. Data regarding the parts which are being fed to the object manipulation device is stored at a computer workstation 116 having the part manipulation algorithm. The workstation 116 is coupled to a monitor 118 such as a CRT display device for display of information regarding the object or objects 110. Data regarding the shape of the object(s) 110 is inputted into the workstation 116 via keyboard 120 or alternatively through a mouse input device or any other suitable data input device. The workstation 116 reads the data regarding the shape of the object 110 and performs processing functions in accordance with the part manipulation algorithm stored therein. The workstation 116 accordingly generates plans 122 which inform the PC or controller device 108 of the sequence of events to operate the array of pins 102. The controller 108 is coupled to a printed circuit board 124 at the object manipulation device 100 by a serial cable 126. It should be noted that the functions of workstation 116, controller 108, and printed circuit board 124 could be implemented as any variation of computer software and/or hardware components. A number of such components can be combined or divided.

Depending on the input plan 122 received at the controller 108, the printed circuit board electronics 124 acts as an actuation component to actuate selected ones of the solenoid valves 114 corresponding to the pneumatic cylinders 112 having pins that are desirable to move. A pneumatic air supply 128 is connected to the solenoid valves 114 to enable movement of the pneumatic cylinders 112. The printed circuit board 124 communicates to the individual solenoid valves 114 via cables 129. The solenoid valves 114 pneumatically activate individual ones of the pneumatic cylinders 112 having the pins at the vertical plate 104 via individually corresponding tubes 130. Depending on which pins 102 require actuation, the printed circuit board 124 provides an on signal to the appropriate solenoid valves 114 which accordingly enable air (from pneumatic air supply 128) to travel through tubes 130 to the appropriate pneumatic cylinders 112 that are to be activated at the vertical plate 104. Alternatively, a device other than a solenoid valve, such as a motor, could be used to actuate a pneumatic cylinder.

Various sensors 132 are positioned throughout the grid 106 at the vertical plate 104. In one example, the sensors could comprise one or more photodetectors. Upon the object 110 moving through the plate 104, various sensors 132 sense the object and provide signal information to the feedback electronics 134. These signals provide information about the position and orientation of the object 110. The sensors 132 via feedback electronics 134 send this information back to the controller 108 and, based on the position and orientation of the object 110, the controller then determines which is the next set of pins to actuate.

Figure 4B:
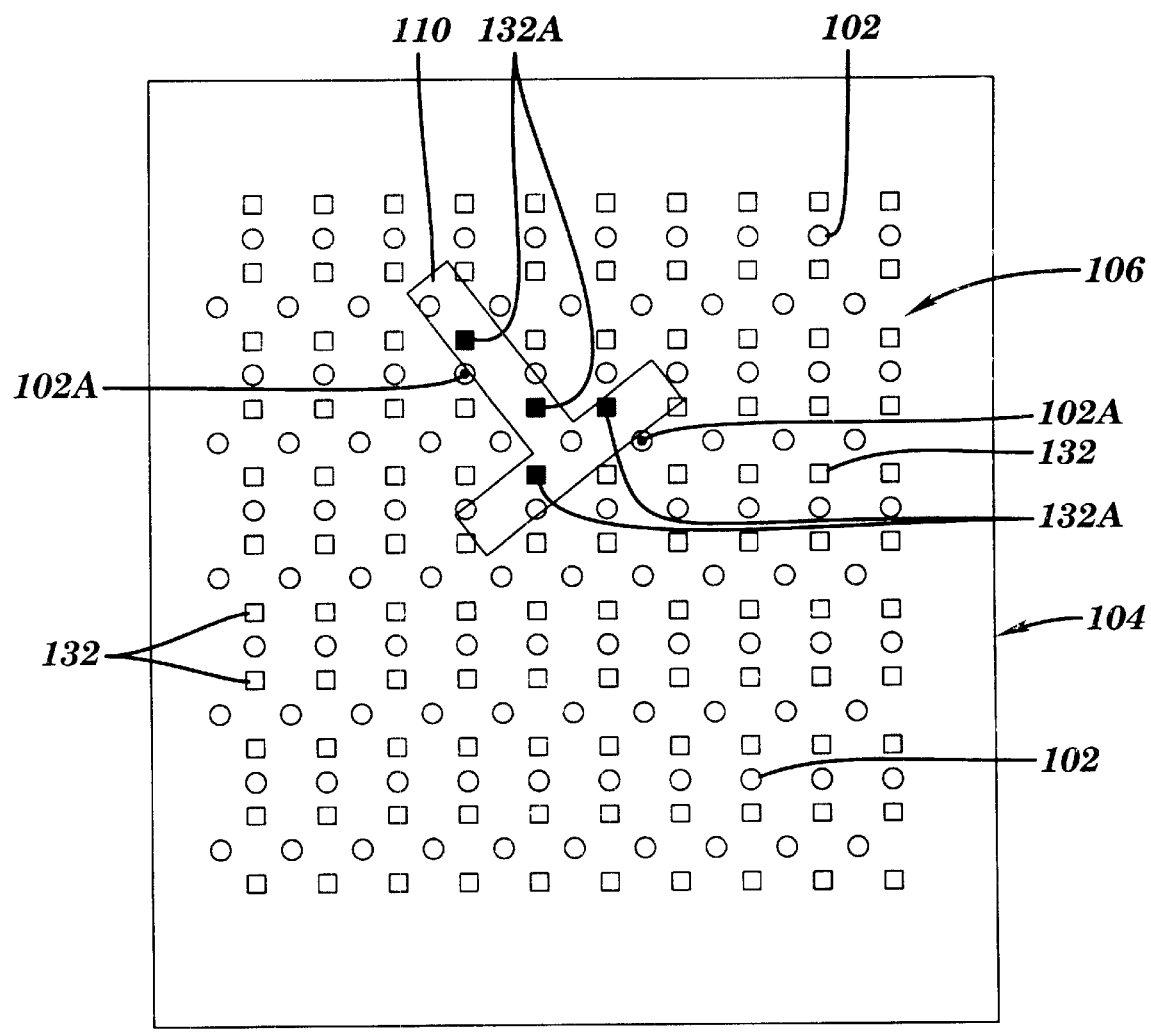
FIG. 4B illustrates a grid of pins along plate having a plurality of sensors disbursed at various locations about the grid to sense the object on the grid.

FIG. 4B illustrates the grid 106 having a plurality of pins 102 and a plurality of sensors 132 intermixed throughout the grid. The part or object 110 is shown positioned on the plate 104 such that certain sensors 132A become activated as the object covers them. In response to the sensing by sensors 132A, the position and orientation of the object 110 is determined. This along with the processing of the data relating to the shape of the object 110, the controller 108 appropriately determines which pins 102A to actuate in order to move the object in a desired manner along the plate 104.

The manipulation algorithm operates under the assumptions of polygonal parts, frictionless contacts, and assume dissipative dynamics. Under these assumptions, the potential energy of an object starting at rest can never exceed its initial value. The configuration of an object is specified by the position of its center of mass (x, y) and its orientation θ. Gravity provides a downward force field and the potential energy corresponds to the height y of the center of mass. Equilibrium configurations correspond to the local minimum of the potential energy field.

The configuration space obstacle for every pair and triple of pins are implicitly computed to get all possible equilibria. The manipulation algorithm constructs a representation of the configuration space obstacle (or C-obstacle) with a quantitative/qualitative approach. The qualitative shape of the C-obstacle is represented as a finite collection of polygonal sections of the C-obstacle, where each section is obtained from the intersection of the C-obstacle with a fixed orientation plane and is topologically invariant over an interval of orientations. The quantitative information consists of the parameterization of the actual positions of the vertices of these polygonal sections. Equilibrium configurations are then identified as the configurations with locally minimum energy.

Figure 5A:
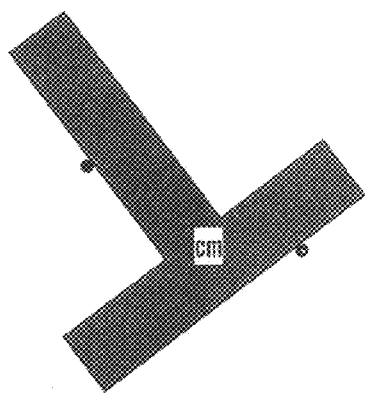
FIGS. 5A and 5B show an example equilibrium object configuration and its capture region.
Figure 5B:
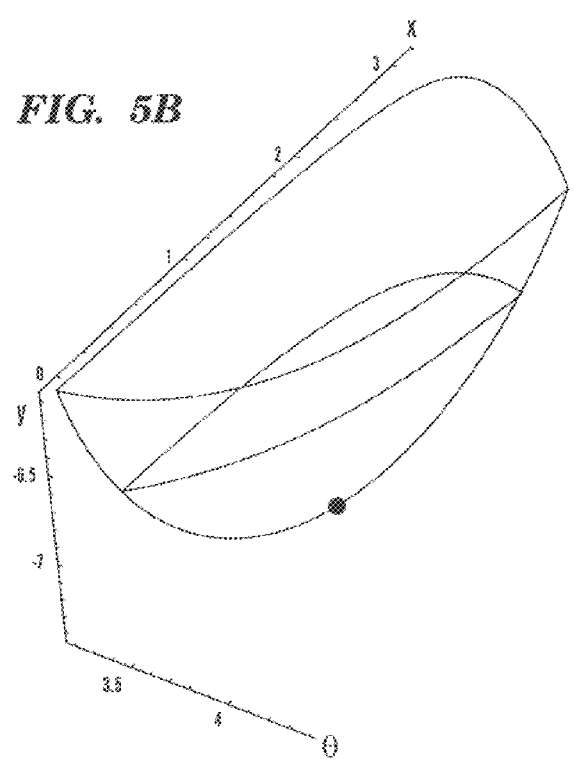
Figure 6:
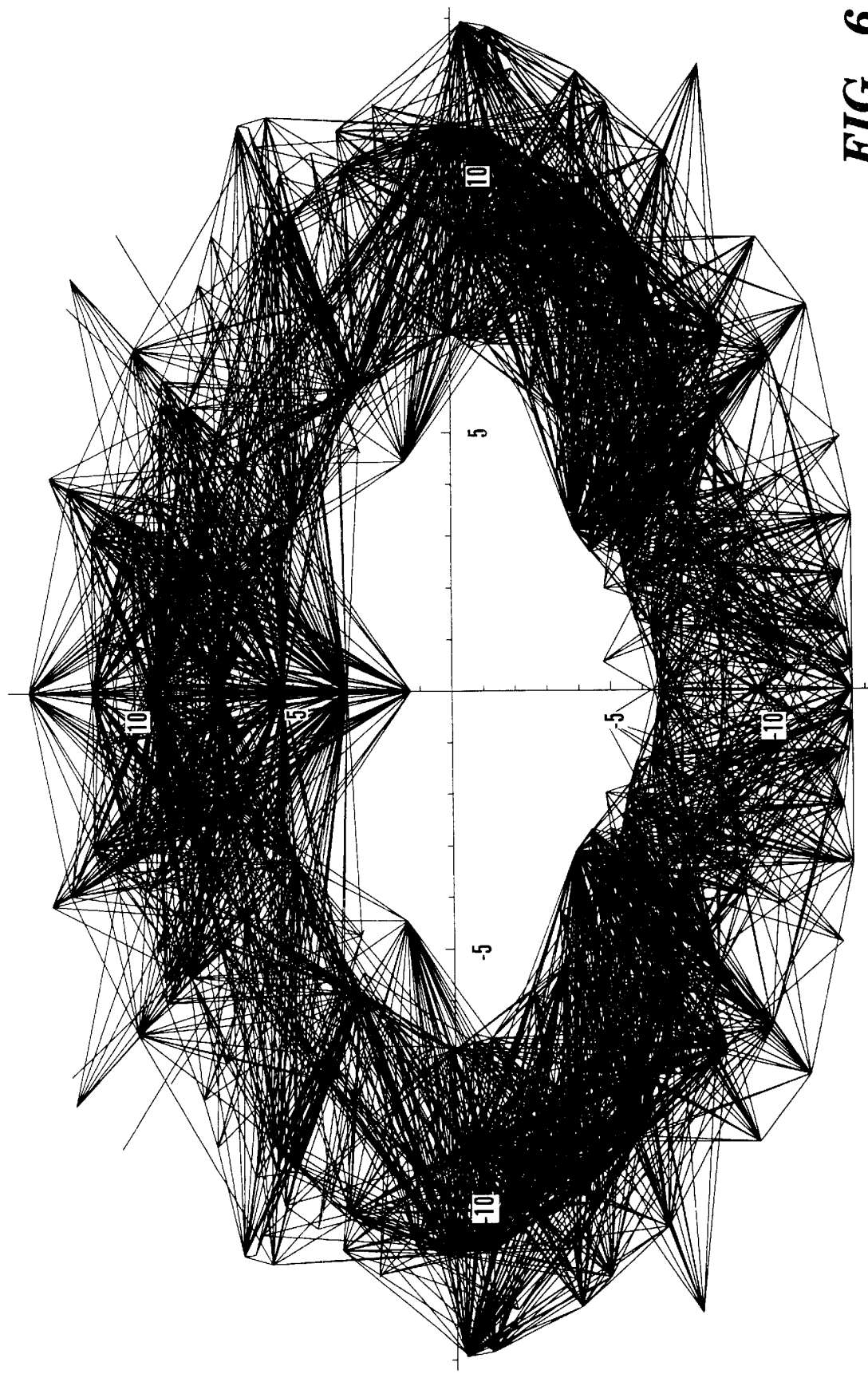
FIG. 6 shows a transition graph of the object of FIG. 5A.

Once the equilibria are computed, capture regions are built. The construction of a capture region is implemented by sweeping a horizontal plane upwards along the Y axis from its equilibrium until an escape configuration is reached. The criterion the algorithm uses to find such configurations is inspired by the classification of saddle points in Stratified Morse theory. FIGS. 5A and 5B show an example equilibrium part configuration and its capture region. The algorithm uses these capture regions to determine whether an equilibrium belongs to the capture region of another equilibrium, and adds an arc to the graph if it does. FIG. 6 shows a polar transition graph of the T-shaped object of FIG. 5A.

Applicants have conducted experiments using four example objects (T-shape, triangle, connector, cylinder). Applicants have achieved successful manipulation of these objects using computer-generated and human-generated manipulation plans.

A slightly different implementation of the device has a smooth support plate and pins mounted on a parallel plate. The pins are actuated from above the supporting surface. This implementation effects manipulation objects with non-flat bottom surfaces. This implementation combats the effects of friction between the part 110 and the support plate 104 by vibrating the support plate. A small amount of vibration reduces the effective friction. Another potential implementation has a horizontal plate with pins arranged above a conveyor belt. This device manipulates parts in the horizontal plane as the parts move due to the drift of the conveyor. To handle 3-D parts, two parallel vertical plates can both be equipped with pins. The selection of pin 102 activations to account for rotations of the part 110 out of the plane of the plates.

Alternative implementations use parts recirculation to improve the throughput of the device. A recirculating device could feed uncaptured and unmanipulated parts back to the device. The recirculating device may consist of a conveyor with a recirculating bucket.

A more detailed discussion of the theory underlying the novel object manipulation device and method is now provided herein.

In addition to the references provided above, related to capture regions, there is also a rich literature related to manipulation planning. For example, Fearing proposes grasping and reorienting strategies for polygonal objects manipulated by two fingers of a dextrous robot hand. R. Fearing, *Simplified Grasping and Manipulation with Dextrous Robot Hands*, MIT Artificial Intelligence Lab, 1984, ("Fearing"). Abell and Erdmann use two frictionless fingers to stably support and rotate a polygonal object in a gravitational field. T. Abell and M. A. Erdmann, *Stably Supported Rotations of a Planar Polygon with Two Frictionless Contacts*, IEEE/RSJ International Conference on Robots and Systems, (3):411–418, August 1995, ("Abell & Erdmann"). These works assume that the fingers can undergo arbitrary translations. Leveroni and Salisbury use finger gaits to manipulate a polygon in the plane by sequencing the grasping fingers to move within their workspace limits while maintaining a stable grasp of the object. S. Leveroni and K. Salisbury, *Reorienting Objects with a Robot Hand Using Grasp Gaits*, The Seventh International Symposium, pages 39–51, London, UK, 1996. Springer, ("Leveroni & Salisbury"). Farahat, Stiller, and Trinkle derive solutions for the configuration of a polygon in sliding and rolling contact with two or three independently controlled polygons. A. O. Farahat, P. F. Stiller, and J. C. Trinkle, *On the Geometry of Contact Formation Cells for Systems of Polygons*, IEEE Transactions on Robotics and Automation, volume 11(4), August 1995, ("Farahat, Stiller, & Trinkle").

The use of simple actuators with discrete degrees of freedom is an example of the trend towards minimalism in robotics. Canny and Goldberg advocate the use of simple, inexpensive sensors and actuators for industrial automation tasks. J. F. Canny & K. Y. Goldberg, *Risc for Industrial Robotics: Recent Results and Open Problems*, IEEE International Conference on Robotics and Automation, San Diego, Calif., May 1994, ("Canny & Goldberg"). Chirikijian proposes robot manipulators consisting of binary actuators that are reliable, repeatable, and inexpensive, and presents algorithms for the kinematic synthesis of such manipulators. G. S. Chirikjian, *Kinematic Synthesis of Mechanisms and Robotic Manipulators with Binary Actuators*, ASME Journal of Mechanical Design, 117(4):573–580, December 1995 ("Chirikjian"). Brost and Goldberg and Wallack and Canny have developed planners that automatically generate fixtures of two-dimensional objects for modular fixturing toolkits. This approach has been generalized to prismatic three-dimensional parts by Brost and Peters, and Sudsang, Ponce, and Srinivasa present algorithms for fixturing, grasping, and manipulating true three-dimensional parts using a reconfigurable gripper. A. Sudsang, J. Ponce, and N. Srinivasa, *Algorithms for Constructing Immobilizing Fixtures and Grasps of Three-Dimensional Objects*, Algorithmic Foundations of Robotics II, pages 363–380, A K Peters, Ltd., 1997, ("Sudsang, Ponce, & Srinivasa").

The notion of configuration space as applied to robotic planning was first proposed by Lozano-Perez. T. Lozano-Perez, *Spatial Planning: A configuration space approach*, IEEE Transactions on Computers, Vol C-32, pp. 108–120, February 1983 ("Perez"). In this approach, a coordinate frame is attached to an object and the configuration of this object is fully determined by the position (x,y) and an orientation θ of this object frame relative to a world frame also see V. I. Arnold, *Mathematical Methods of Classical Mathematics*, Springer-Verlag, New York, N.Y., 1978, "Arnold". The configuration space is the set of configurations of the object frame, i.e., $R^2 \times S^1$. This set is recomputed each time a new pin of the manipulation object is activated. The set of configurations which cannot be achieved because of one pin is called the configuration obstacle or C-obstacle associated with that pin, and the union of these unachievable configurations for all active pins is called the C-obstacle associated with the corresponding pin configuration. In what follows, the C-obstacle will refer to the latter.

FIGS. 1–4 depict a part manipulation device used to manipulate two-dimensional parts or objects using retractable pins that are mounted on a vertical plate in a grid. As a polygonal object falls on the pins, it comes to rest on two or three support pins. The object tumbles and falls onto another set of pins when the first ones are retracted. By utilizing the manipulation algorithm to select the set of actuated pins for a given part shape, the object can be manipulated to a desired position and orientation.

Accurately predicting the motion of the object during execution of the above operation is difficult, even when detailed models of friction and contact dynamics are available. Thus, in the approach of the device of FIGS. 1–4 frictionless contacts and dissipative dynamics are assumed. The overall motion of an object is planned through construction of a sequence of atomic transitions between equilibrium states of the device/object system.

These transitions are constructed through the calculation of the capture region of each equilibrium, see, R. Brost, *Analysis and Planning of Planar Manipulation Tasks*. PhD thesis, Carnegie-Mellon University School of Computer Science, January 1991, ("Brost 2") and Kriegman. Thus, reorienting an object amounts to constructing the directed graph with nodes consisting of equilibrium states for the object and with arcs linking a pair of nodes such that the first equilibrium lies in the capture region of the second one, then exploring this transition graph to find paths from initial to goal nodes. The approach does not assume that contact is maintained during the execution of the manipulation task; nor does it attempt to predict the object motion between equilibria.

The part manipulation device shown in FIGS. 1–4 can be configured to adapt to different polygonal objects, and it uses inexpensive and reliable binary actuators, leading to a modular design. The device can be used as a part nest to bring a part dropped from an unknown or uncertain initial configuration to a desired configuration or to distinguish and sort parts using the same set of pins to induce different part motions for different parts.

In the following description, the pins are initially assumed to have zero diameter and the focus is on the shape of a single C-obstacle. Then, pairs of C-obstacles and an algorithm used to represent the configuration space for a finite but arbitrary number of C-obstacles are given consideration. Finally, the pins with a non-zero diameter are considered.

Figure 7:
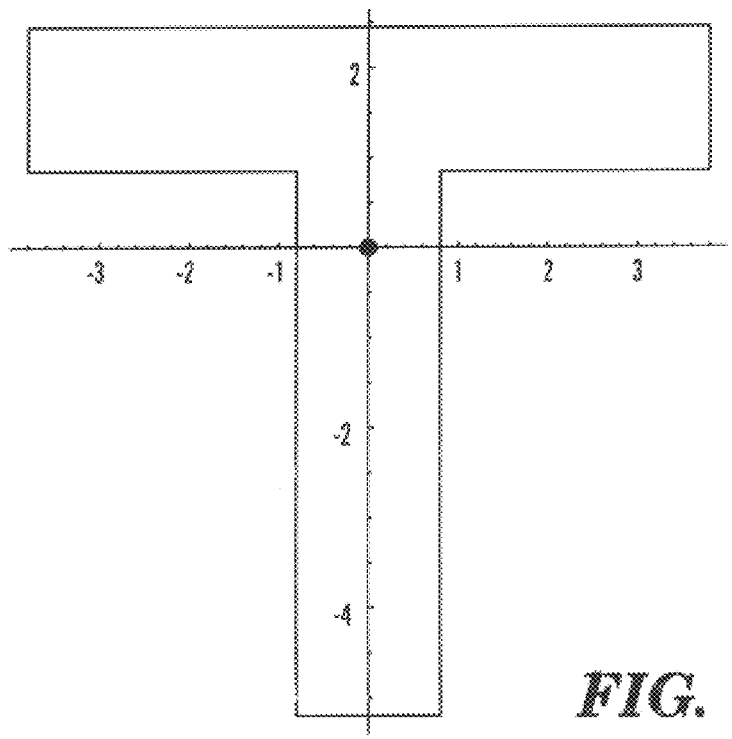
FIG. 7 shows a T-Shaped object with the origin of the object frame located at (0,0)
Figure 8:
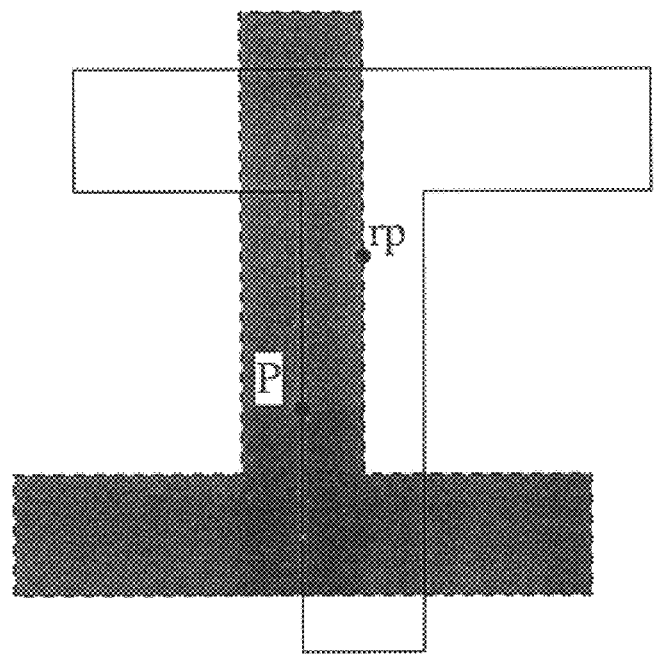
FIG. 8 illustrates the object with pin P at (0,0)

Referring to the T-shaped object of FIG. 7, if pins are assumed to have zero diameter, the shape of a configuration obstacle at a given orientation reflects the shape of the object. FIG. 8, for instance, illustrates the T-shaped object at orientation θ=0 radians. Also shown are the possible configurations of the T-shaped object at orientation θ when pin P=(0, 0) is activated. The gray area is the C-obstacle at orientation θ.

If the boundary of the object is given by the parameterized function $f: t \in [0, 1] \mapsto (f_x(t), f_y(t))$ and the activated pin is located at P, the shape of the C-obstacle at orientation θ is given by the function.

$$t \in [0, 1] \mapsto P + \begin{bmatrix} \cos(\theta + \pi) & -\sin(\theta + \pi) \\ \sin(\theta + \pi) & -\sin(\theta + \pi) \end{bmatrix} \begin{bmatrix} f_x(t) \\ f_y(t) \end{bmatrix}$$

In FIG. 8, the object is a polygon, the function $f$ defines a succession of edges, and the entire shape of the C-obstacle is given by a rotation of these edges around P.

Figure 9:
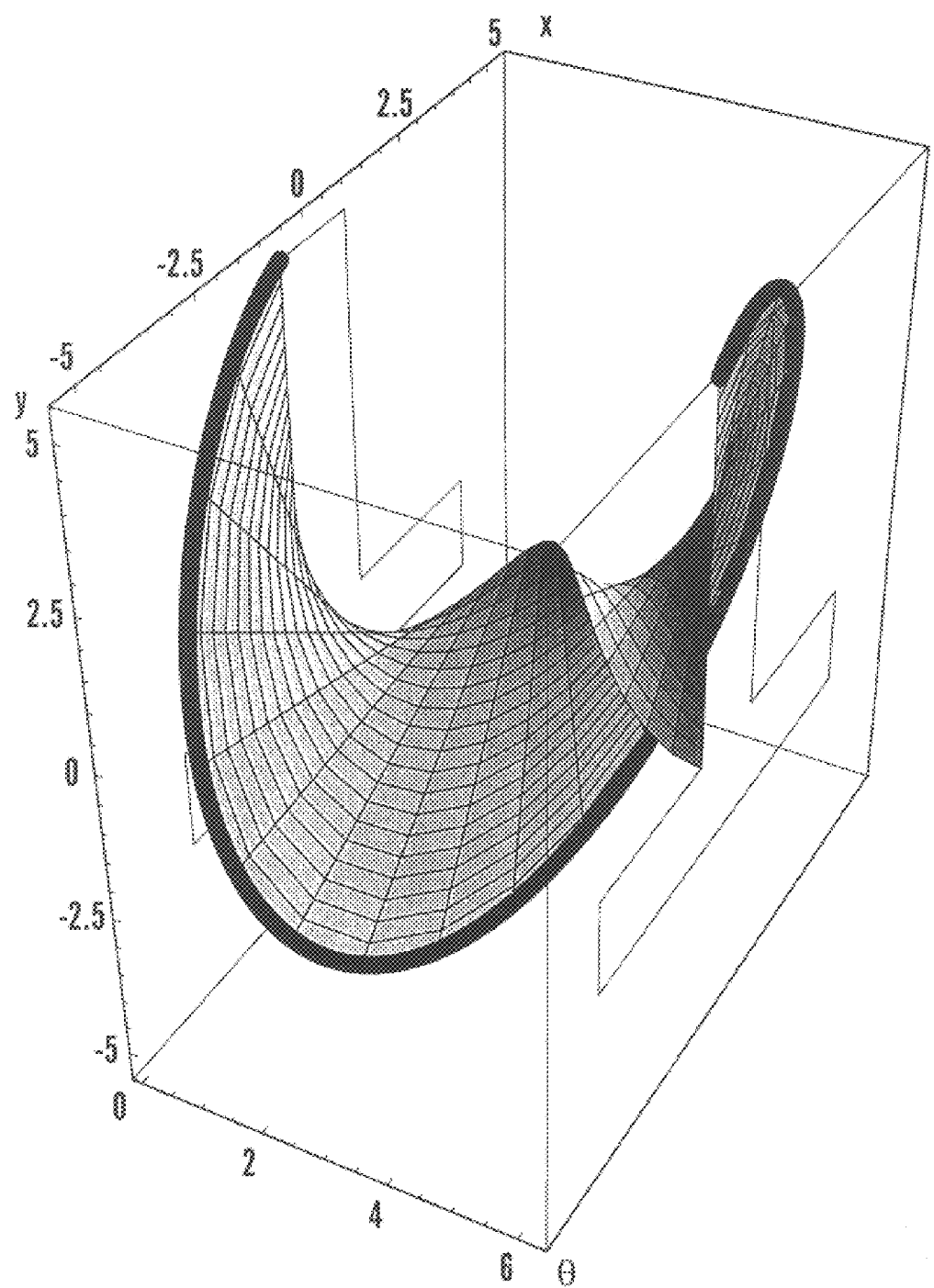
FIG. 9 illustrates the e-surface generated by one edge of an object with 0-slices of a C-obstacle drawn at orientations 0 radians and 2 Π radians

An edge surface or e-surface is the surface generated by one edge of the object in the configuration space. The intersection of two e-surfaces is a vertex curve or v-curve. The external surface of a C-obstacle is composed of e-surfaces and v-curves, and the set of e-surfaces and v-curves completely determines the shape of the C-obstacle. FIG. 9 shows an e-surface associated with an edge of the T-shaped object.

The intersection of a plane orthogonal to the θ axis with the configuration space is referred as a θ-slice. The intersection of this plane with an e-surface is an edge, and its intersection with a v-curve is a vertex, called in the following a vertex point or v-point. A θ-slice is represented by a polygon with a shape that is the same as the object except for a rotation, and with vertices that are v-points. Slices of the C-obstacle are drawn in FIG. 9 at 0 radians and 2Π radians. A v-curve is the thicker line.

Figure 10:
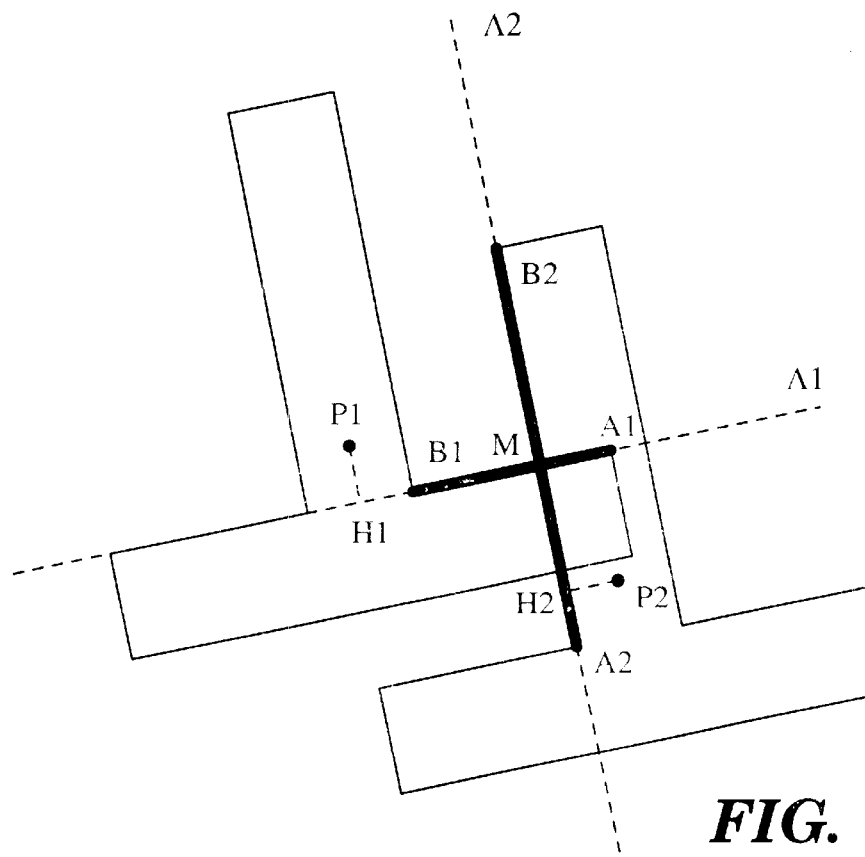
FIG. 10 illustrates a configuration space.

FIG. 10 displays a grid with two pins activated. Since the pins have the same shape, the individual C-obstacles have the same shape too, but each one is centered on its own pin. The configuration space is shown at orientation 0.2 radians when the pins (0, 0) and (4, −2) are activated.

Considering two pins $P_1$ and $P_2$ and two corresponding e-surfaces at a specific orientation θ, the corresponding edges are $[A_1(\theta), B_1(\theta)]$ and $[A_2(\theta), B_2(\theta)]$ with supporting lines $\Lambda_1(\theta)$ and $\Lambda_2(\theta)$; $A_1(\theta)$, $B_1(\theta)$, $A_2(\theta)$ and $B_2(\theta)$ are v-points and are of course θ-dependent. Determining the intersection $M(\theta)$ of the two edge is necessary. First, however, the parameterization of the intersection of $\Lambda_1(\theta)$ and $\Lambda_2(\theta)$ must be considered, then the constraint that the intersection must belong to both segments $[A_1(\theta), B_1(\theta)]$ and $[A_2(\theta), B_2(\theta)]$ must be added.

Figure 11:
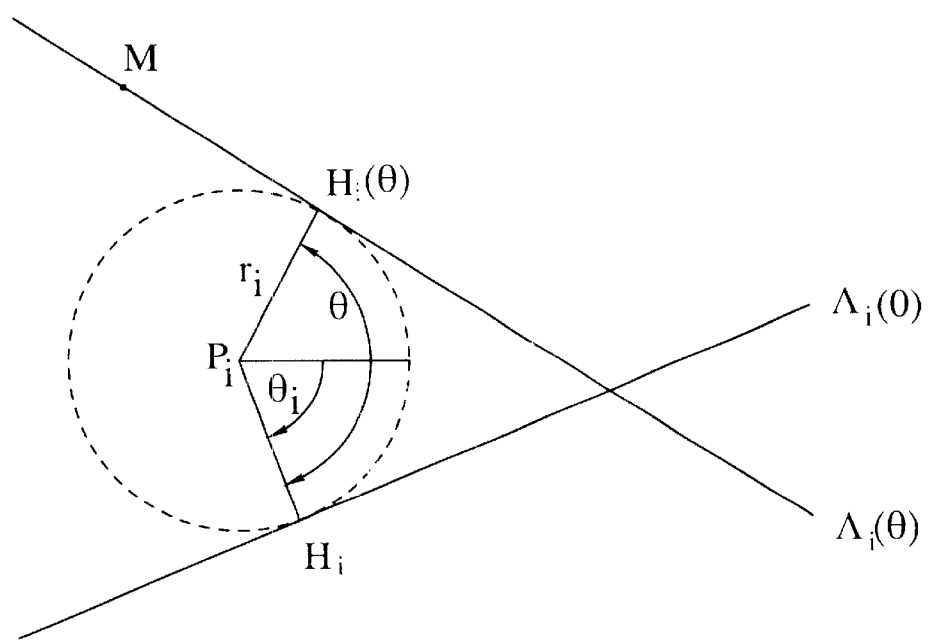
FIG. 11 shows parameterization of an e-surface.

To find a parameterization of the v-curves, the e-surfaces are first using the lines $\Lambda_i(\theta)$ (i=1, 2). These lines are subject to a rotation of angle θ about $P_1$. As shown by the parameterization of an e-surface in FIG. 11, $\Lambda_i(\theta)$ can be defined by $P_i H_i(\theta)$. $H_i(\theta)M=0$.

If $P_i=(x_i, y_i)$, $r_i$ denotes the distance between $P_i$ and $\Lambda_i(0)$, and $\theta_i$ is the angle between the horizontal and $P_i H_i(0)$, then this line is defined by $$x \cos(\theta+\theta_i)+y \sin(\theta+\theta_i)=r_i+x_i \cos(\theta+\theta_i)+y_i \sin(\theta+\theta_i).$$

The set of common solutions (x,y) to the equations of $\Lambda_1(\theta)$ and $\Lambda_2(\theta)$ depends on the value of the determinant $$\Delta = \begin{vmatrix} \cos(\theta+\theta_1) & \sin(\theta+\theta_1) \\ \cos(\theta+\theta_2) & \sin(\theta+\theta_2) \end{vmatrix} = \sin(\theta_2 - \theta_1)$$

One should note that this determinant does not depend on θ. The solution set is a point when Δ is non-zero, and empty or infinite when Δ is zero.

In the case where Δ is non zero, both lines intersect in a point whose coordinates are given by $$\begin{bmatrix} x \\ y \end{bmatrix} = \frac{1}{\sin(\theta_2-\theta_1)} \begin{bmatrix} \sin(\theta+\theta_2) & -\sin(\theta+\theta_1) \\ -\cos(\theta+\theta_2) & \cos(\theta+\theta_1) \end{bmatrix} \begin{bmatrix} r_1 + x_1\cos(\theta+\theta_1) + y_1\sin(\theta+\theta_1) \\ r_2 + x_2\cos(\theta+\theta_2) + y_2\sin(\theta+\theta_2) \end{bmatrix}$$

When Δ is zero, the two lines are parallel, and this happens when $\theta_1=\theta_2$ or $\theta_1=\pi-\theta_2$. The system yields an infinite number of solutions when the lines are the same, and an empty set when they are distinct.

Supposing that $\theta_1=\theta_2$, writing that the two lines are the same yields $$(x_1-x_2)\cos(\theta+\theta_1)+(y_1-y_2)\sin(\theta+\theta_1)=r_2-r_1$$

Figure 12:
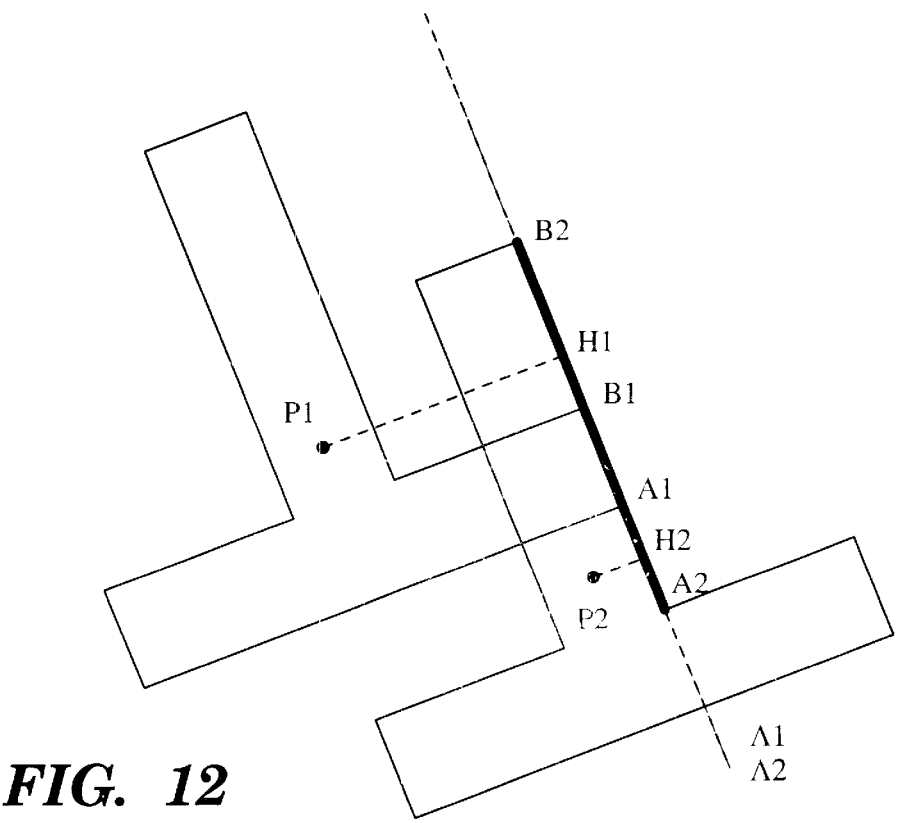
FIG. 12 illustrates the configuration space $\theta=0.371834$ radians.

This equation can have zero, one or two θ solutions. For each solution, the previous linear system has an infinite number of solutions. An example is shown in FIG. 12 with θ=0.371834 and $\Lambda_1$ and $\Lambda_2$ coincident. The solution is of course similar with $\theta_1=\pi-\theta_2$.

To summarize, a v-curve can be parameterized by θ when the determinant is non-zero, and it is a set of lines orthogonal to the θ axis otherwise.

The previous discussion, however, dealt with infinite edges. Actual object edges are of course finite in length. Thus, the intersection $M(\theta)$ of the lines $\Lambda_i(\theta)$ must also belong to the segments $[A_i(\theta), B_i(\theta)]$. The set of configurations where this happens is called the existence range of the v-curve.

The fact that $M(\theta)$ belongs to $[A_i(\theta), B_i(\theta)]$ can be expressed in terms of the relative position of $M(\theta)$, $A_i(\theta)$ and $B_i(\theta)$ along $\Lambda_i(\theta)$. The orthogonal projection $H_i(\theta)$ of $P_i$ on $\Lambda_i(\theta)$ is chosen as the reference point of the line. If $\vec{\mu}_{i\theta}$ is a direction vector of $\Lambda_i(\theta)$ and $[\alpha_i(\theta), \beta_i(\theta)]$ is the range of abscissas corresponding to $[A_i(\theta), B_i(\theta)]$ along $\Lambda_i(\theta)$, then the associated constraint is $$\vec{u}_{i,\theta} \cdot \overrightarrow{H_i(\theta)M(\theta)} \in [\alpha_i(\theta), \beta_i(\theta)]$$

$$\text{where} \begin{cases} \alpha_i(\theta) = \min(\vec{u}_{i,\theta} \cdot \overrightarrow{H_i(\theta)A_i(\theta)}, \vec{u}_{i,\theta} \cdot \overrightarrow{H_i(\theta)B_i(\theta)}), \\ \beta_i(\theta) = \max(\vec{u}_{i,\theta} \cdot \overrightarrow{H_i(\theta)A_i(\theta)}, \vec{u}_{i,\theta} \cdot \overrightarrow{H_i(\theta)B_i(\theta)}). \end{cases}$$

In the case where $\Delta$ is zero, this constraint is only relevant when the lines coincide, and it defines the intersection of two collinear segments in that case. FIG. 12 is an example of such a situation where the intersection of [$A_1$, $B_1$] and [$A_2$, $B_2$] is [$A_1$, $B_1$].

When $\Delta$ is non-zero, the position of $M(\theta)$ relative to $H_i(\theta)$ changes with $\theta$. The constraints define the valid orientations where $M(\theta)$ belongs to both segments, forming the existence range. Since $\theta \to \vec{u}_{i,\theta} \cdot \overrightarrow{H_i(\theta)M(\theta)}$ is a continuous function, the orientations where $\vec{u}_{i,\theta} \cdot \overrightarrow{H_i(\theta)M(\theta)}$ is equal to $\alpha_i(\theta)$ or $\beta_i(\theta)$ determine the bounds of the existence range.

Figure 13:
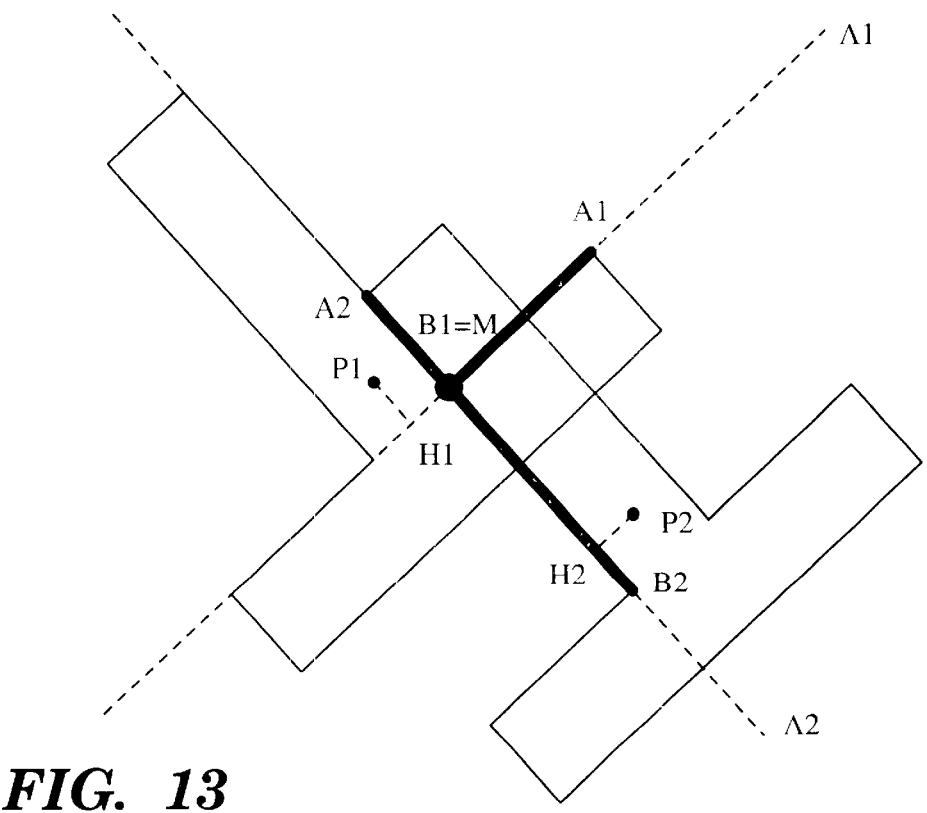
FIG. 13 shows type I configuration at $\theta=0.741269$ radians; B, and M collide.

Finding the solutions of $\vec{u}_{i,\theta} \cdot \overrightarrow{H_i(\theta)M(\theta)} = \alpha_i(\theta)$ can be reduced to solving an equation of the form $A \cos\theta + B \sin\theta + C = 0$, and can thus be done in closed form. Every orientation satisfying this equation will be called a critical orientation of type I of the v-curve. FIG. 13 shows such a critical orientation where M is equal to $B_1$. In FIG. 13, a type I configuration at $\theta = 0.741269$ radians is shown with $B_1$ and M coinciding.

This equation has at most two solutions. There is one equation for each $\alpha_i(\theta)$ and one for each $\beta_i(\theta)$, thus the maximal number of critical orientations is 8 for each v-curve. Since the set of v-curves is finite, the set of critical orientations of type I is finite too. Moreover, since the set of v-curves can only change at critical orientations, it is constant between two critical orientations of type I, and the set of all possible v-curves is also finite.

Figure 14C:
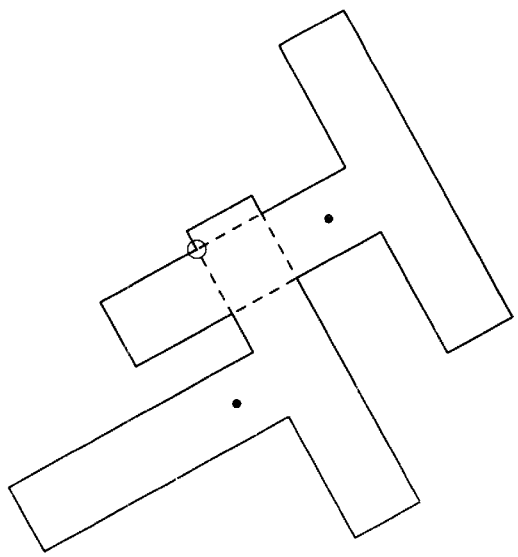
FIG. 14 illustrates qualitative change in the shape of an $\theta$ section at a critical orientation of type I: before ($\theta=0.2$ radians); at critical orientation ($\theta=0.371834$ radians); and after $\theta=0.5$ radians.
Figure 14B:
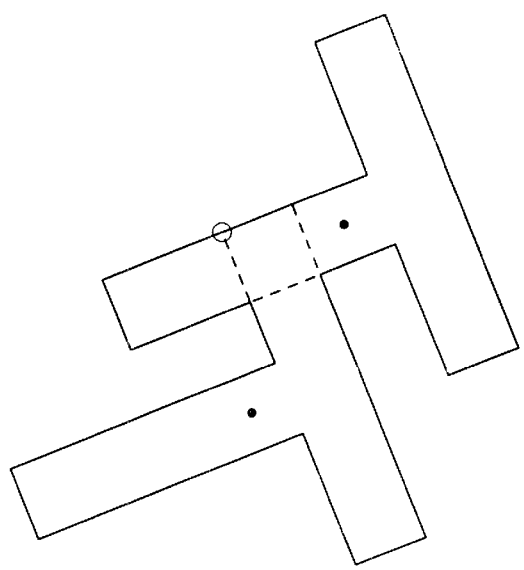
Figure 14A:
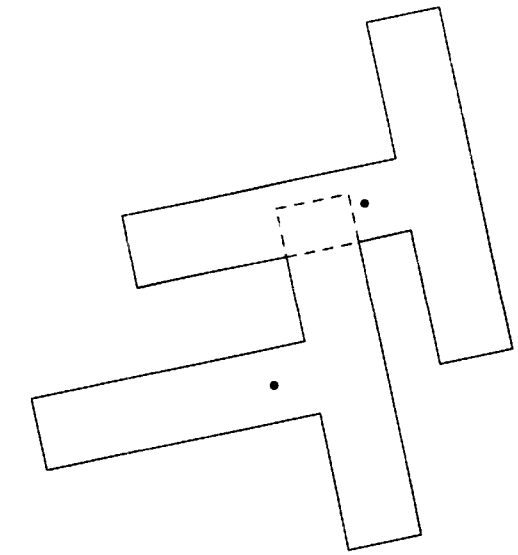

FIGS. 14A, 14B and 14C illustrate a qualitative change in the shape of a $\theta$-section at a critical orientation of type I: (a) before ($\theta = 0.2$ radians); (b) at critical orientation ($\theta = 0.371834$ radians); c) after ($\theta = 0.5$ radians). It shows three different $\theta$-slices, including a critical one. In particular, it focuses on a critical orientation at the boundary of the existence range of a v-curve. The circled points belong to this v-curve. Indeed, the v-curve does not exist for $\theta \leq 0.371834$ radians. If a v-curve is the intersection of two edges of the same C-obstacle, it is defined on $(0, 2\pi)$.

Now, a method for identifying the range over which a v-curve is inside a C-obstacle is introduced. Its complement in the existence range is called the effective range.

First consideration is given to a v-curve. Since either on the surface or inside of the C-obstacles it is continuous, there exists a set, possibly empty, of points where the v-curve goes from the inside of a C-obstacle to its surface and vice versa. Such a point can be characterized as M. By definition, M must belong to a pair of e-surfaces $S_i$ and $S_j$ that defines the v-curve.

Figure 15:
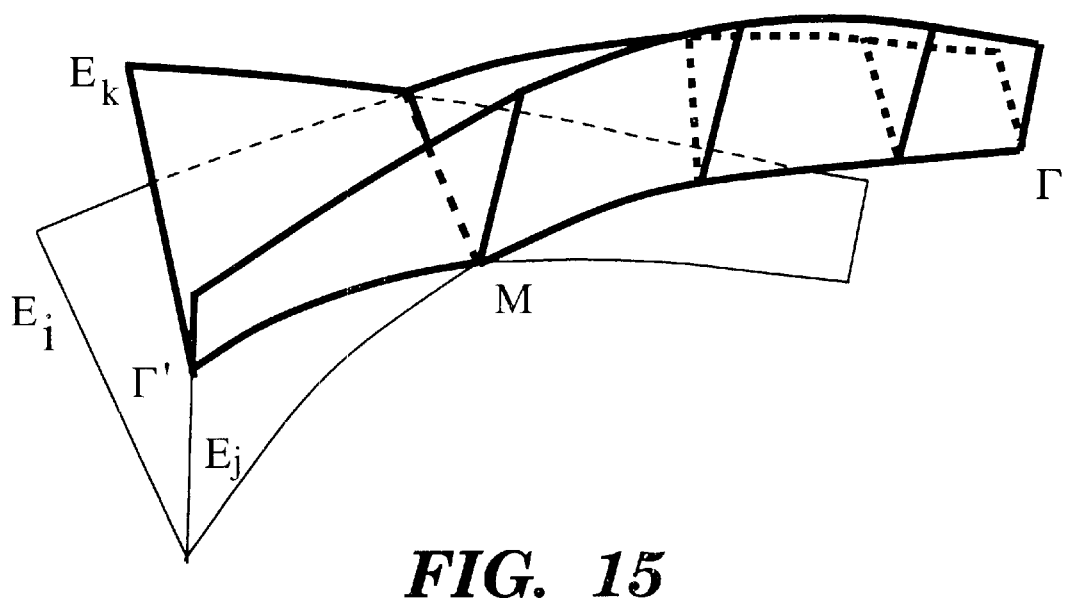
FIG. 15 illustrates space at a critical orientation of type II.

Considering the composite C-obstacle, i.e. the union of several C-obstacles, a e-surface E-S of one of these C-obstacles is either on the surface of the overall C-obstacle or not. Since E-S is a ruled surface whose limits are defined by two v-curves (each of them defined by this E-S and an other e-surface), the set of points where E-S goes from the surface of the composite C-obstacle into its inside is characterized as the intersection of E-S with another e-surface. This set of points is of course one-dimensional and bounded, and it is characterized by its endpoints. Obviously, and endpoint M is at the intersection of three e-surfaces, or two e-curves. FIG. 15 shows configuration space at a critical orientation of type II. Two v-curves $\Gamma$ and $\Gamma'$ intersect in M. The boundary of the C-obstacle is drawn with thicker lines. An orientation where different v-curves intersect is called a critical orientation of type II, and the points where this happens are called critical intersections.

Since three e-surfaces intersect in M, the lines $\Lambda_i$, $\Lambda_j$ and $\Lambda_k$ associated with these e-surfaces must also intersect in M in the corresponding $\theta$-section. Considering their parameterizations, it is obvious that the set of solutions is finite as long as $\Lambda_i$, $\Lambda_j$ and $\Lambda_k$ are all different. Since v-curves stay on the boundary of the C-obstacle are inside them between two critical intersections, the effective range is composed of intervals whose bounds are critical orientations.

Figure 16:
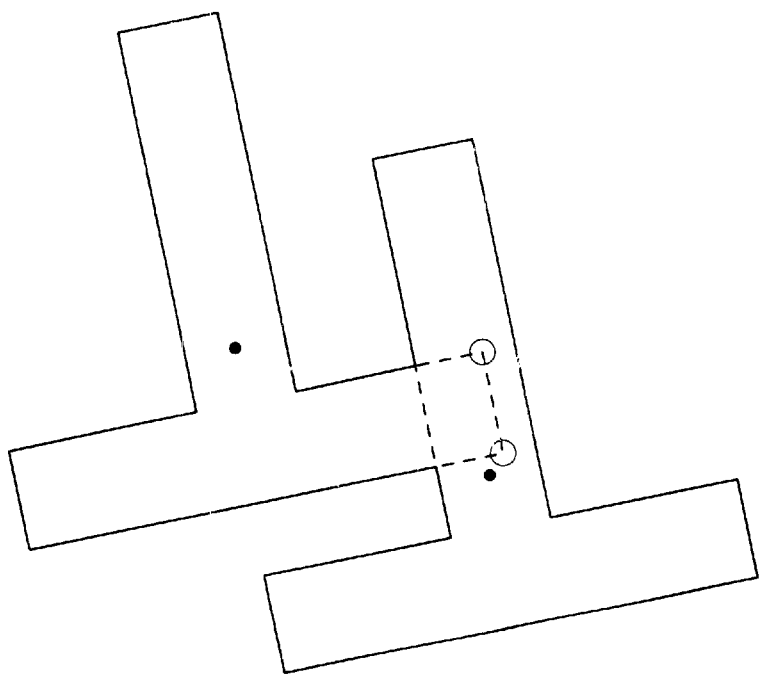
FIG. 16 illustrates configuration space at $\theta=0.2$ radians, with circled interior vertices.

A polygonal description can once again be constructed when two C-obstacles are involved. It is constructed as the union of the polygons formed by the $\theta$-sections. FIG. 16 shows configuration space at $\theta = 0.2$ radians, with circled interior vertices. The interior vertices shown as circles on FIG. 16 and the corresponding (dashed) edges are eliminated during the construction of the union of the two polygons.

Thus, the union of two C-obstacles can be represented by a set of v-curves and a collection of polygons. These polygons give a qualitative representation of the surface and the set of v-curves gives quantitative information about the location and actual shape of the C-obstacles at a given orientation. In fact, the actual shape of a $\theta$-slice deforms as $\theta$ changes but it remains qualitatively the same over a range without critical orientations.

The previous section focused on the case where two pins were activated. When more pins are actuated, new C-obstacles are added to the configuration space. The union of these C-obstacles forms the overall C-obstacle and it is characterized by the set of v-curves and e-surfaces which lie on its boundary.

Figure 17C:
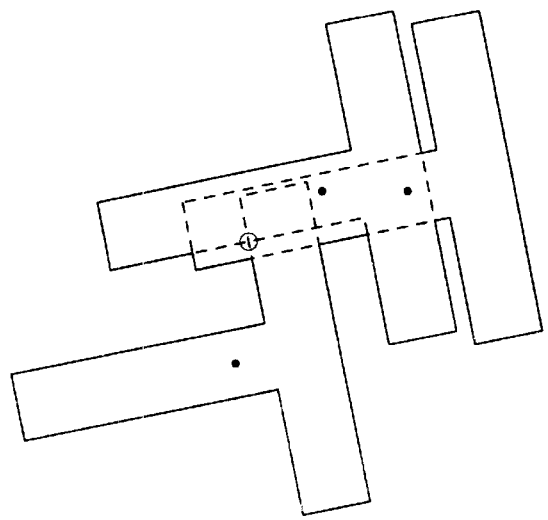
FIG. 17 illustrates qualitative change of the $\theta$ section at a critical orientation of type II with three pins involved: before ($\theta=6$ radians); at critical orientation ($\theta=0$ radians); after ($\theta=0.2$ radians)
Figure 17B:
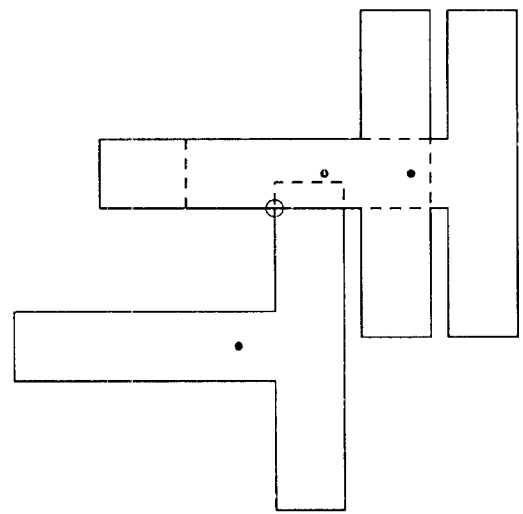
Figure 17A:
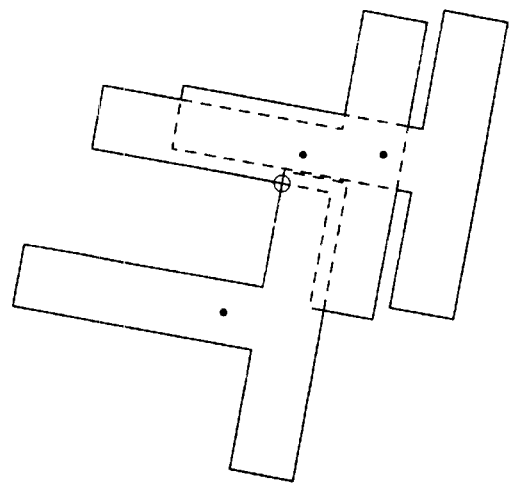

As in the case where only two pins are involved and for the same reasons, the polygonal description of a $\theta$-section can only change (qualitatively) at critical orientations of type I or II. For instance, FIG. 17 illustrates a qualitative change of the $\theta$-section at a critical orientation of type II with three pins involved: (a) before ($\theta = 6$. radians); (b) at critical orientation ($\theta = 0$. radians); (c) after ($\theta = 0.2$ radians). It shows how a vertex can move from the external surface to the interior of the C-obstacle. Thus, the framework used for two pins can be used for an arbitrary number of pins. It is assumed that the object has e edges and that p pins are active.

The procedure constructing the v-curves treats the curves generated by edges of the same C-obstacle and those generated by different C-obstacles separately. It computes the parameters of the v-curves and the critical orientations of type I.

1. A v-curve is generated for each vertex of the object and each C-obstacle.
2. A v-curve is generated for every pair of edges and for every pair of C-obstacles.

The time complexity of the first step is $O(pe)$. The second step takes $O((e/2)(p/2)) = O(p^2 e^2)$ since every pair must be considered.

The construction of a set of polygonal descriptions from the associated v-curves follows three steps.

1. Compute all the critical intersections. To do this, all pairs of v-curves are intersected whose existence ranges overlap. This is equivalent to finding all the three-contact poses of the object on the pins. The method described in "Brost & Peters" finds these poses by solving quadratic equations.

2. Sort all the critical orientations of type I and II in increasing θ order.
3. Between two consecutive critical orientations, pick a sample orientation and build the polygon representing the corresponding θ-section of the C-obstacle.
4. Construct the effective range of v-curves.

The first step takes at most time $$O\left(\binom{ep}{3}\right) = O(e^3 p^3).$$

If the resulting set of critical 3 orientations is of size l step two runs in $O(l \log l)$ time, and steps three and four in $O(lpe)$ time. Note that l is bounded by $O(e^3 p^3)$.

To summarize, the algorithm for building the configuration obstacle is as follows:

1. Compute all v-curves (parameters and existence range).
2. Compute all the sample polygons.

The total time complexity is $O(p^2 e^2 + e^3 p^3 + l \log l + lpe)$, which gives a worst time complexity of $O(e^4 p^4)$.

Figure 18:
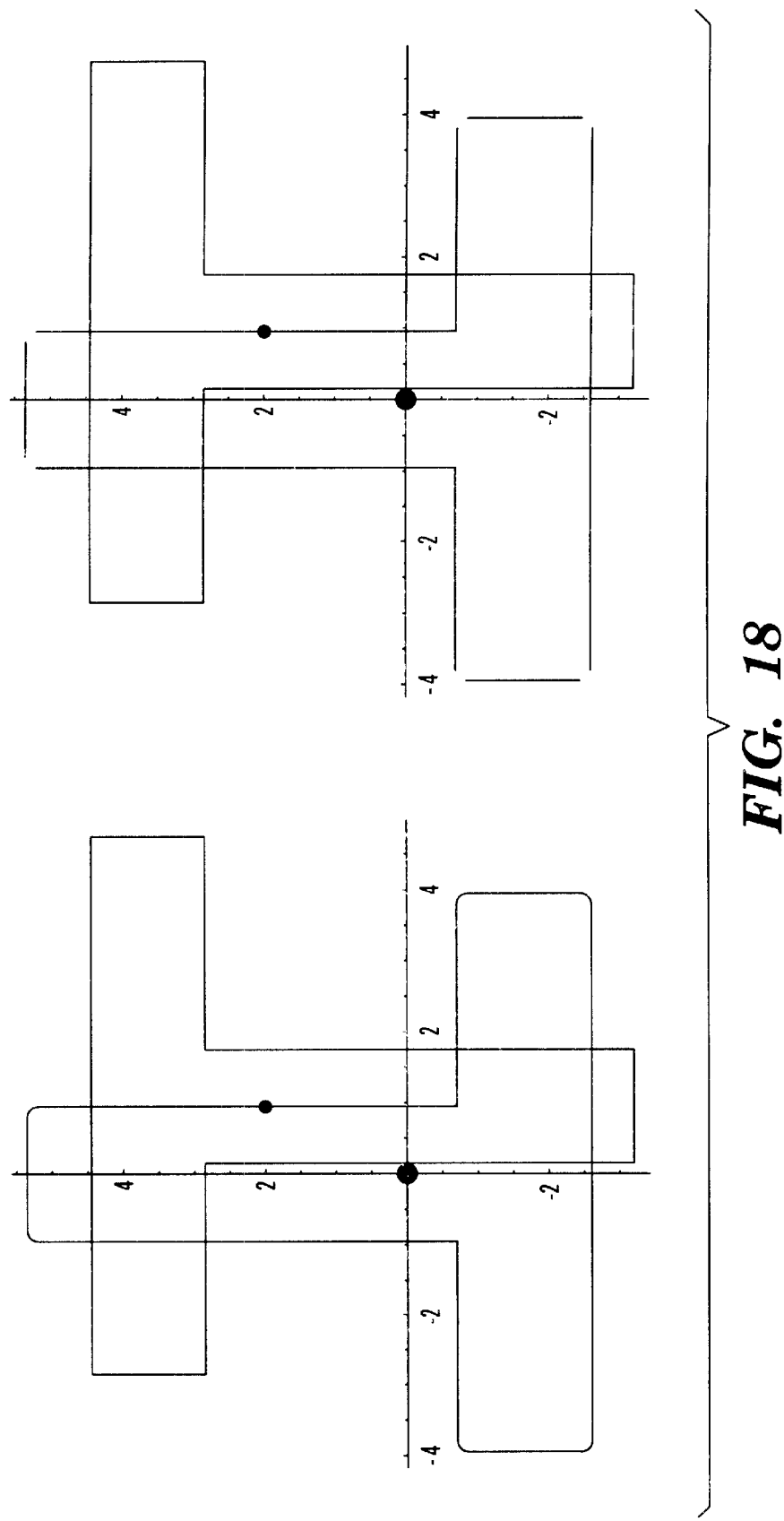
FIG. 18 is illustrative of a pin with diameter 0.15 cm activated at (0,0) and an approximation of the c-obstacle.

In the previous sections, the pins were supposed to have zero diameter. The physical implementation of the parts manipulation apparatus does not have pins of zero diameter. The current implementation uses pins with a diameter of 0.15 cm. In this case, a correct polygonal description should include both polygonal and circular edges. Instead, the size of the pins is assumed to be small compared to the size of the object, the circular edges are removed as shown in FIG. 18.

When a set of pins is actuated, an object will eventually come to rest on these pins, or fall through to the bottom of the part feeder. The following provides a background from Morse Theory about capture regions and then characterizes the equilibria of an object on a pin configuration. An effective method for finding equilibria and constructing capture regions in configuration space is also provided.

Figure 19:
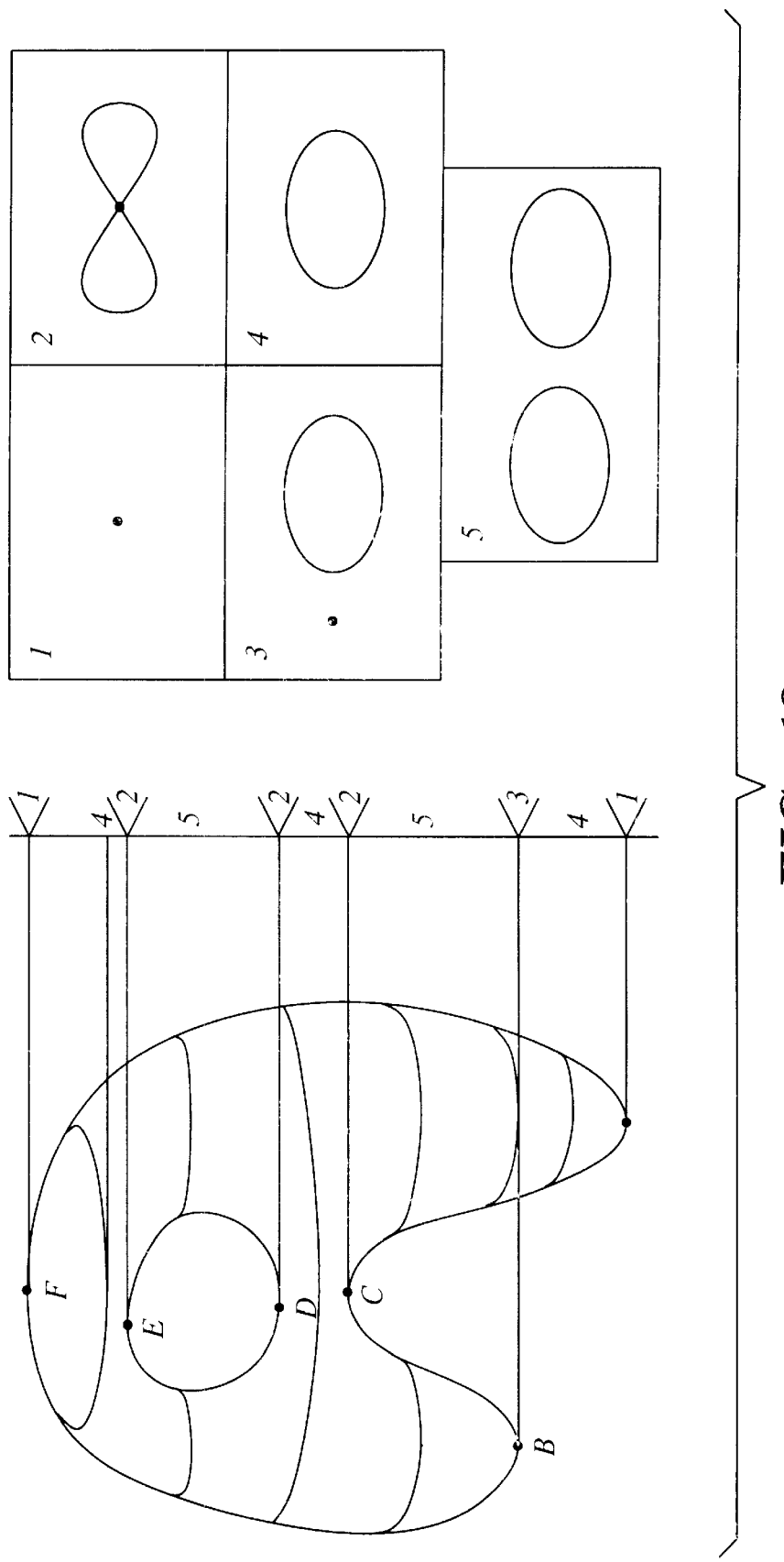
FIG. 19 is illustrative of Morse theory: critical points and level sets of a generic smooth surface—the labels on the vertical axis refer to five types of level curves.

FIG. 19 displays critical points and level sets of a generic smooth surface—the labels on the vertical axis refer to the five types of level curves shown in the central part of the figure. Assuming that configuration obstacles are bounded by a compact smooth surface like the one shown in FIG. 19, Morse theory shows that the level sets of such a surface in general smooth, non-intersecting curves. J. Milnor, *Morse Theory,* Princeton University Press, Princeton, N.J., 1963, ("Milnor"). They may only be singular at a finite number of critical values of the height function: minima (points A and B), maxima (point F) and saddle points (points C, D and E). Furthermore, the qualitative shape of the level curves does not change between critical points, and it may only assume five different states, as shown in FIG. 19 (there may of course be an arbitrary number of connected components).

There are two types of saddles: those where two connected level curves merge into a single one as the height increases (type I saddles, see points C and E in the figure) and those where a connected curve splits into two (type II saddles, see point D).

When the reference point of the object is its center of mass, a gravity potential field can be associated with the configuration space, with the y coordinate of the center of mass defining the potential.

Figure 20:
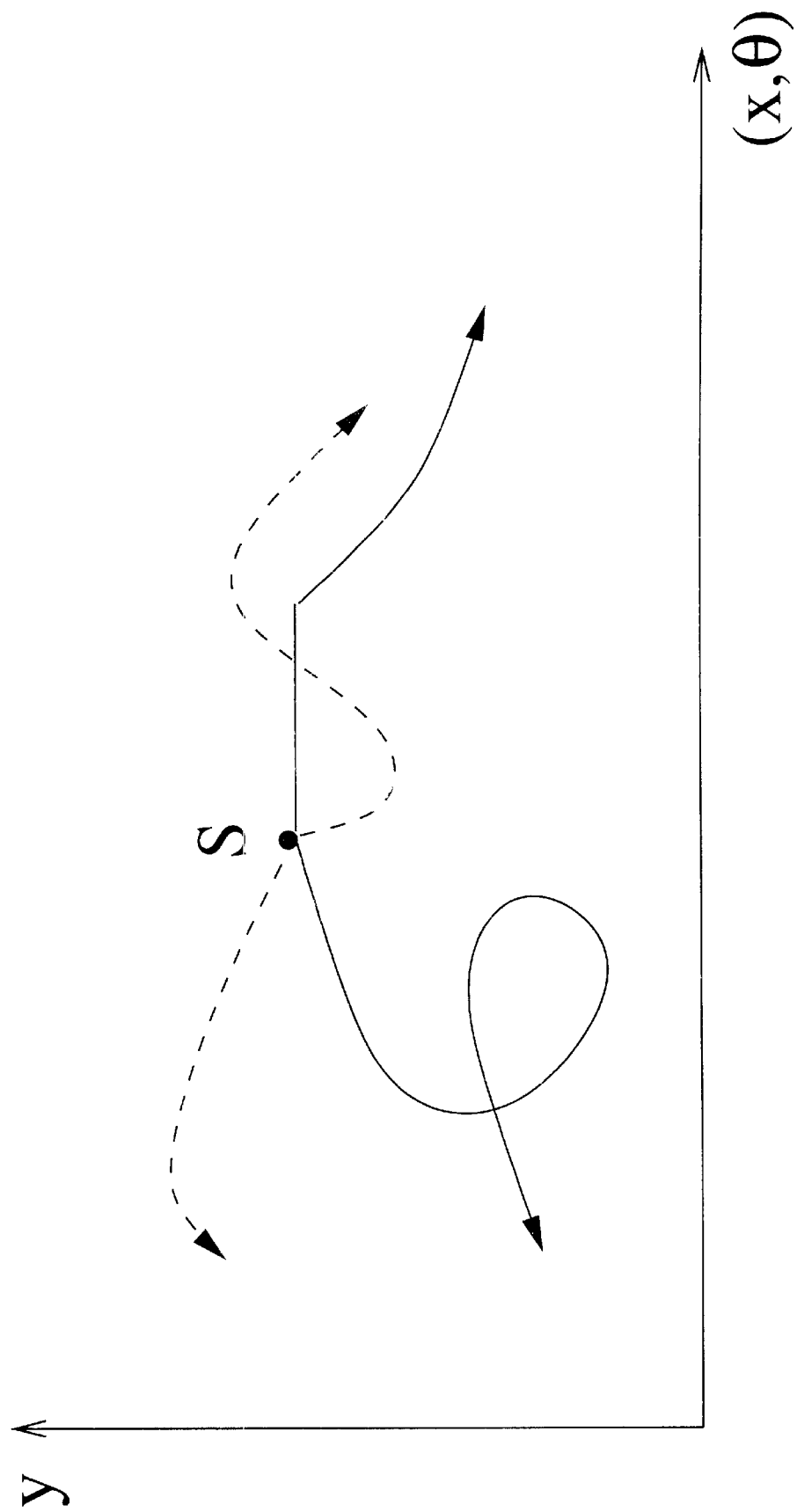
FIG. 20 illustrates potential constraints.

Since energy is dissipative, an object dropped from a point S with a negligible velocity cannot reach a higher position; on the other hand, it can reach any configuration E that can be linked to S by a path in free space whose height never exceeds the height of S. FIG. 20 shows these potential constraints. The dashed paths are impossible and the solid paths are valid.

Figure 21:
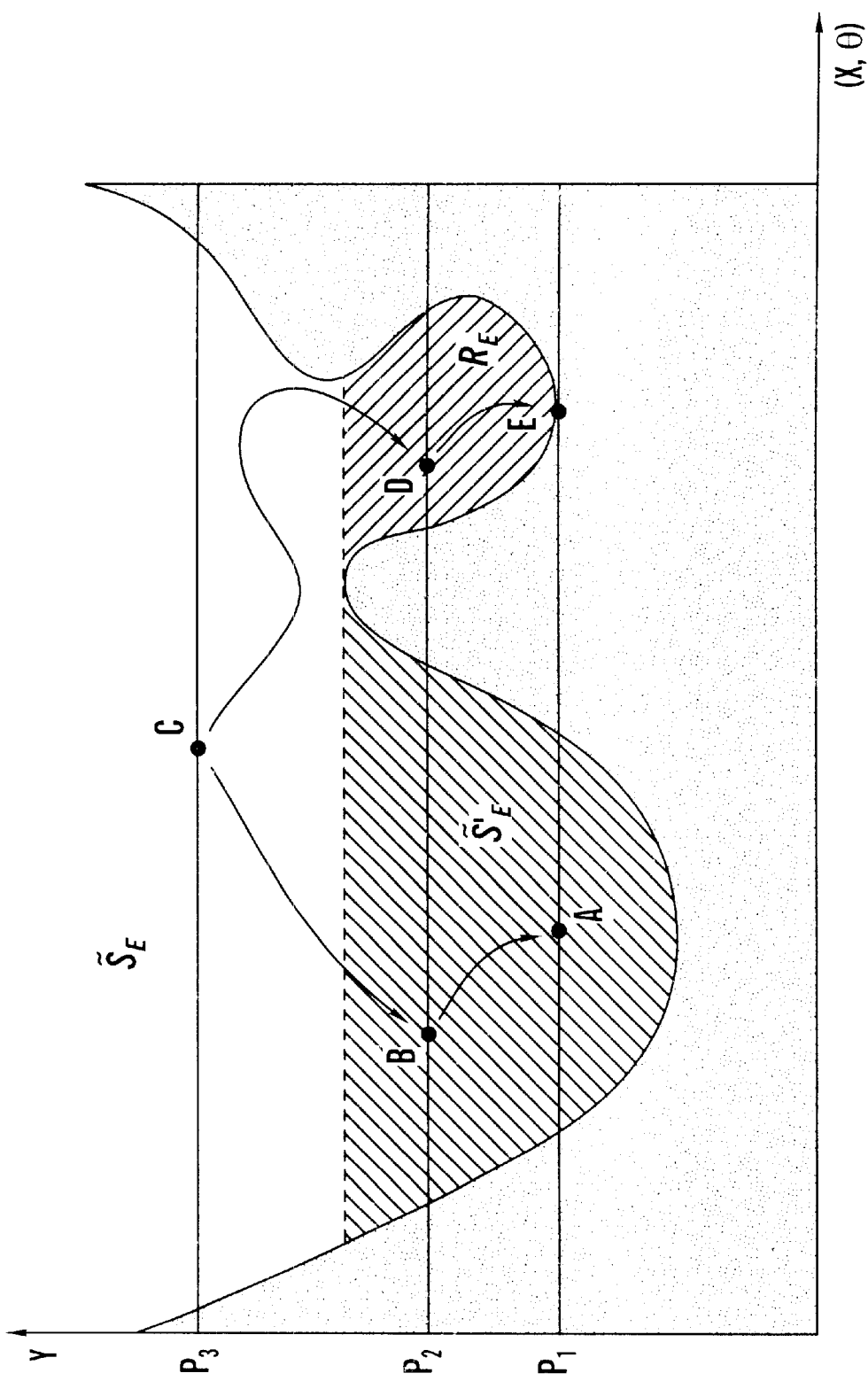
FIG. 21 is an illustration of sets and a capture region.

This constraint and an equilibrium position E split the set of start configurations splits into a subset $\tilde{S}_E$ of configurations from which there exists a valid path leading to E, and its complement $\tilde{S}^1_E$. The capture region $R_E$ associated with an equilibrium E is the subset of $\tilde{S}_E$ which cannot lead to any configuration of $\tilde{S}^1_E$. FIG. 21 provides an illustration of the sets $\tilde{S}_E$, $\tilde{S}^1_E$ and a capture region $R_E$. $\tilde{S}^1_E$ and $R_E$ are dashed differently. $\tilde{S}_E$ is the union of the undashed region and $R_E$. E is an equilibrium. D belongs to $R_E$, C belongs to $\tilde{S}_E$ but not to $R_E$, and A and B belong to $\tilde{S}^1_E$. The sets are of course defined by the shape of the C-obstacle and the position of E.

Figure 22:
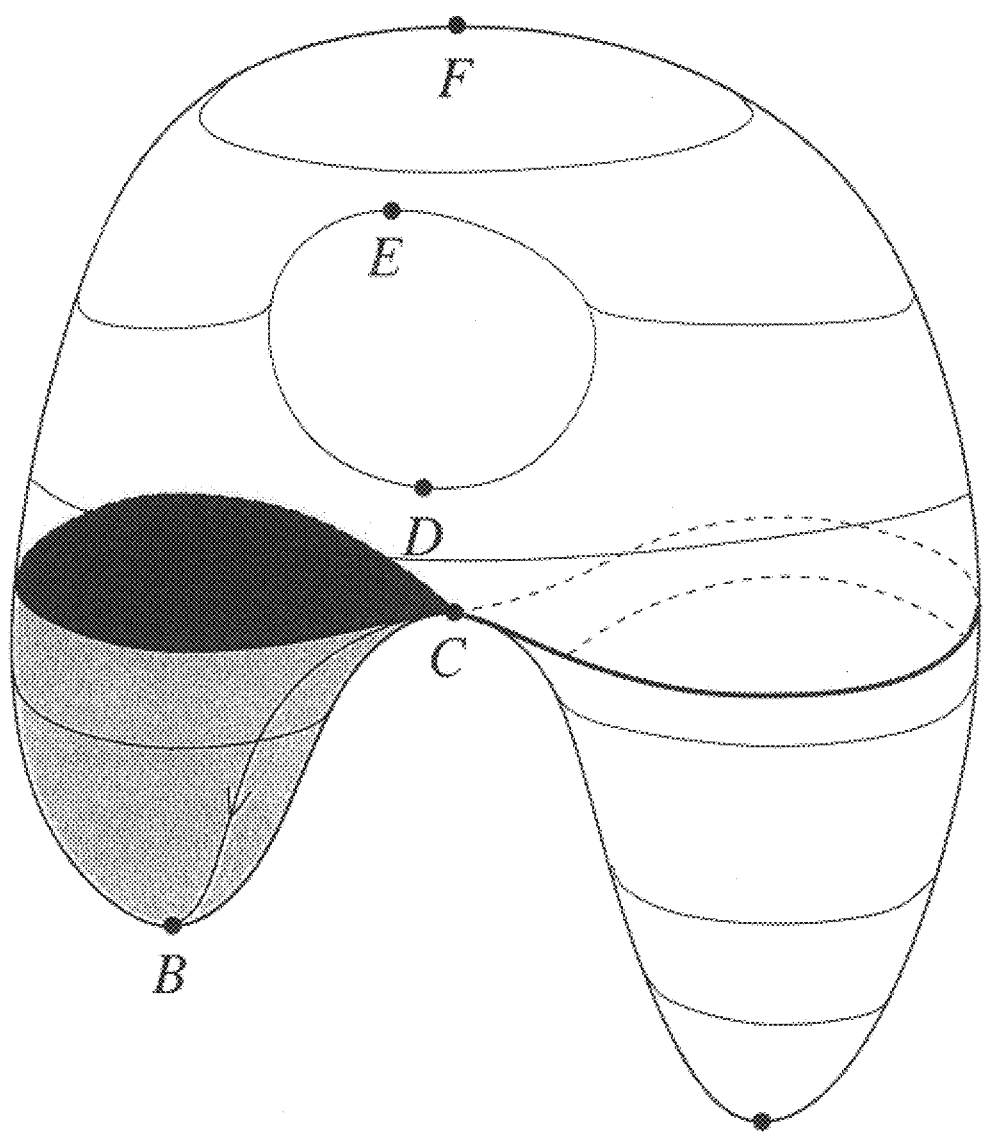
FIG. 22 provides illustration for Morse theory with capture region associates minimum B.

In this context, the capture region associated with a minimum is the subset of the free configuration space bounded below by the obstacle and above by the plane that contains a type I saddle point with minimal height such that there exists a valid path from the saddle to the minimum. FIG. 22 shows the capture region associated with a minimum B drawn in grey. In reality, of course, the surfaces of configuration space obstacles are only piecewise-smooth. M. Goresky and R. Macpherson, *Stratified Morse Theory,* Springer-Verlag, New York, 1980, ("Goresky & Macpherson"), provide a complete classification of the level curves and critical points of piecewise-smooth surfaces whose height functions satisfy certain non-degeneracy conditions (Morse functions), and it has been used by Kriegman to construct the capture regions of the stable poses of solids bounded by algebraic and polyhedral surfaces (see A. Rao, D.Kriegman, and K. Goldberg, *Complete Algorithms for Reorienting Polyhedral Parts Using a Pivoting Gripper,* IEEE Transactions on Robotics and Automation, 12(2): 331–342, April 1996, "Rao, Kriegman, & Goldberg", for applications to part re-orienting using a pivoting gripper), and by Mason, Rimon and Burdick to analyze the stable configurations of heavy objects held by multiple contacts. R. Mason, E. Rimon, and J. Burdick, *The Stability of Heavy Objects with Multiple Contacts,* IEEE Int. Conf. On Robotics and Automation, pages 439–445, Nagoya, Japan, May 1995, ("Mason, Rimon, & Burdick"). The rest of the present discussion will not explicitly use the classification from Stratified Morse theory; instead, it will exploit the existence of a finite number of (smooth or not) critical points, and characterize as before the capture region of a minimum by finding the lowest type I saddle linked to it by a valid path.

Now follows a discussion of how to characterize the equilibria and the saddle points of the configuration space.

The local minima of the potential energy are the stable equilibria of the system. They occur at contacts between the object and the pins, and thus belong to the boundary of the composite C-obstacle. Since this surface is composed of v-curves and e-surfaces, an equilibrium must either be on a v-curve or an e-surface, and it is by definition a local minimum of the y coordinate along the corresponding curve or surface. Assuming that the equilibrium lies in the interior of an e-surface. In such a position, only one edge of the object makes contact with a single pin. A stable equilibrium is impossible in that case, thus equilibria belong to v-curves.

Figure 23C:
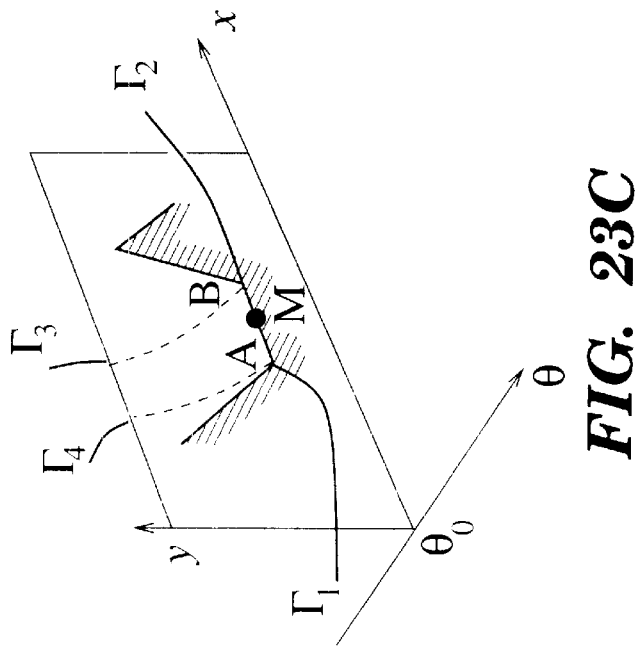
FIGS. 23A–C illustrate different equilibrium in the configuration space.
Figure 23B:
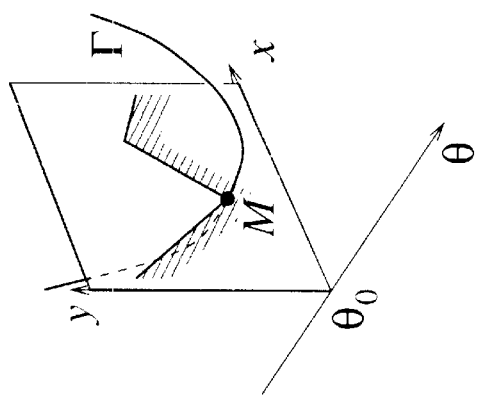
Figure 23A:
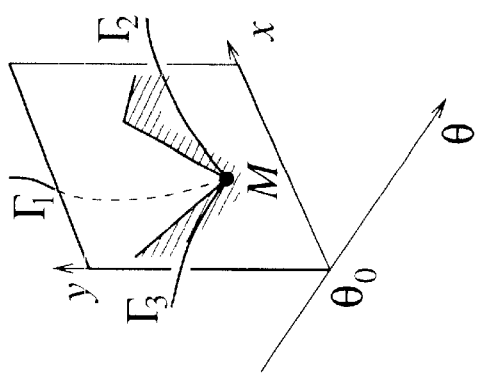

Now, consider a minimum M which lies on a v-curve. Obviously, M is a local minimum of the associated θ-section. Suppose first that M belongs to several v-curves. M is an equilibrium if it is a minimum for each v-curve it belongs to (FIG. 23A). Thus, M is an extremity of the effective range of the v-curves. Now assume that M belongs to the interior of a v-curve. If this curve is parameterized by θ, the conditions $y^1(\theta)=0$ and $y^{11}(\theta)>0$ must be satisfied at M(FIG. 23B). If the v-curve is a segment in the (x,y) plane (cf previous chapter), then this segment must be horizontal (FIG. 23C) (if it were not, there would exist other points adjacent to M on the segment with a lower height). Note that the extremities of the segment belong to some v-curves and thus, must also be local minima of these curves.

Figure 24C:
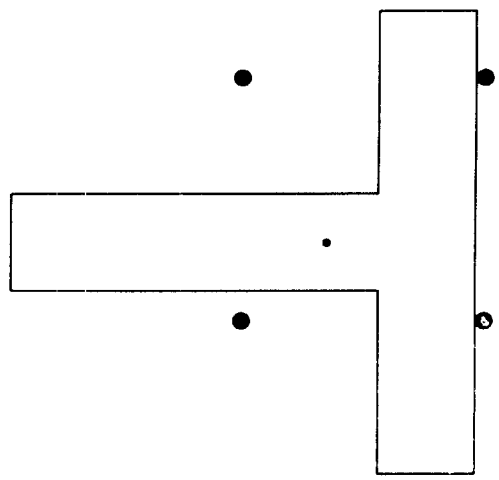
FIGS. 24A–C illustrate examples of equilibria with equilibrium at the intersection of three v-curves in 24A and equilibria at a minimum of a v-curve in 24B and C.
Figure 24B:
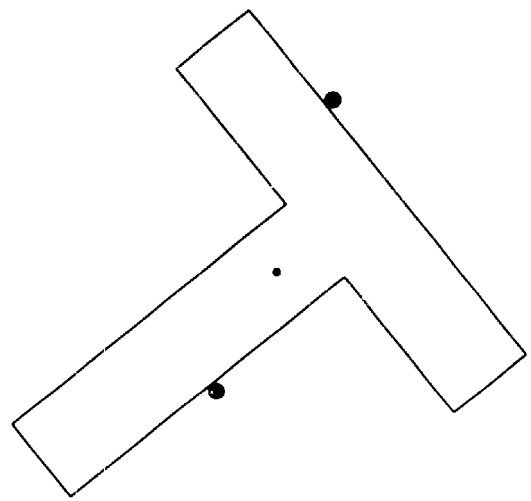
Figure 24A:
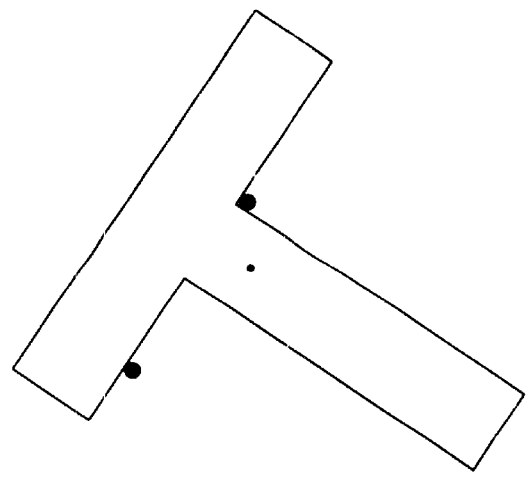
Figure 25D:
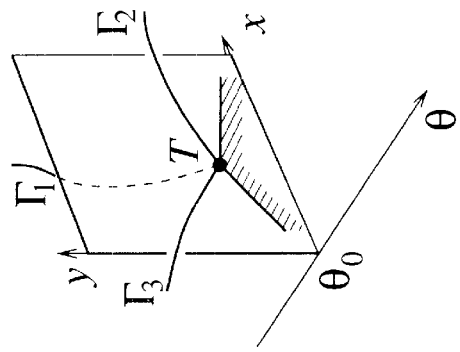
FIGS. 25A–H illustrate eight possible saddle points.
Figure 25C:
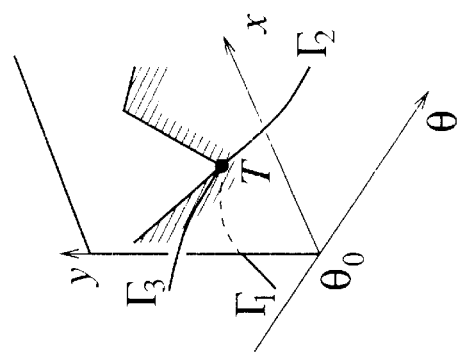
Figure 25B:
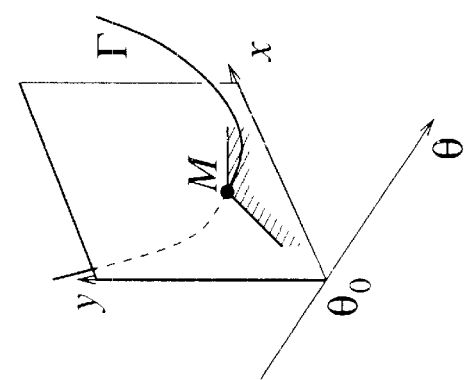
Figure 25A:
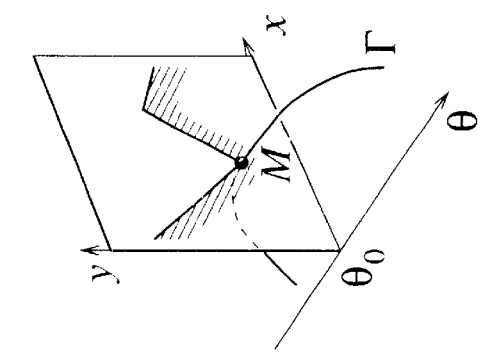
Figures 25E, 25F, 25G, 25H:
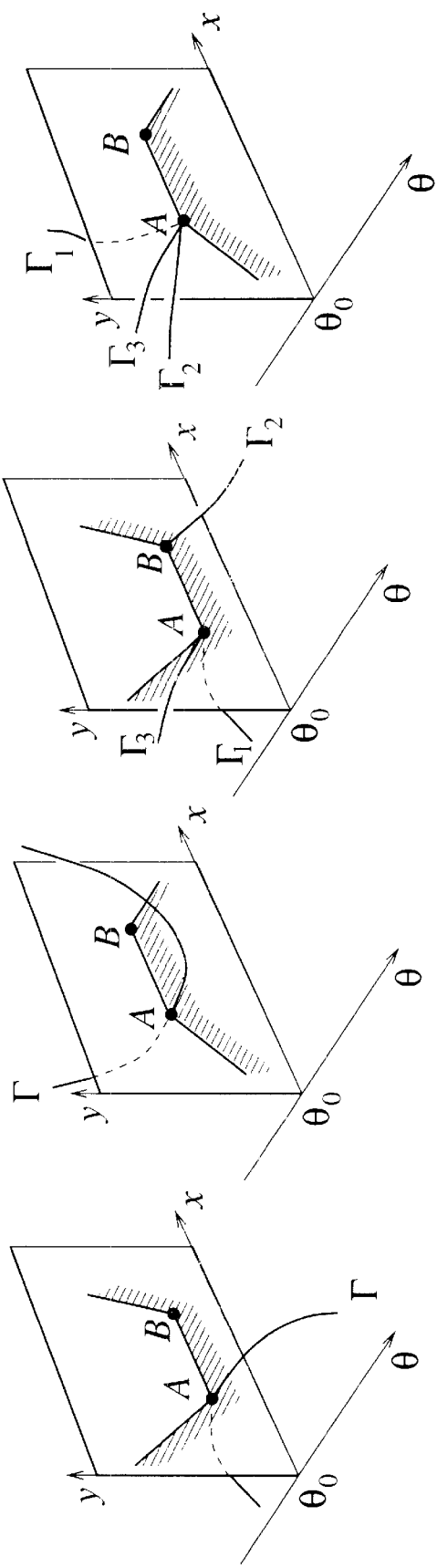

Thus, there are only three types of equilibria. FIG. 23 shows the different cases, while FIGS. 24A, 24B and 24C show object configurations associated with each of them.

A critical orientation of type III is defined as an orientation where they coordinate of a v-curve has a local minimum or one of the two edges intersecting at M is horizontal. It is easy to see that the y coordinate of a v-curve is monotonic on a range without any critical orientation. Thus, extremum points, and in particular equilibria, must lie at critical orientations of type I, II or III.

As shown in FIG. 25 there are eight possible saddle points configurations. A saddle may occur at a local maximum (resp. minimum) M of the y variable along a v-curve when the corresponding polygonal section has a minimum (resp. maximum) at this point (see FIGS. 25A–B and FIGS. 25E–F for degenerate instances of these cases). A saddle may also occur at an extremity of a v-curve, when two of the incident v-curves point down (resp. up) and the polygonal section has a minimum (resp. maximum) at this point (see FIGS. 25C–D and FIGS. 25G–H for degenerate cases).

As shown previously, the extent of a capture region is determined by changes in the qualitative shape of the level sets of the configuration space. Thus, the following will now address the construction of a level set of the configuration space, or y-slice. Then, a description is provided of how the C-obstacle can be represented to efficiently build the y-slices. Finally a method for constructing the capture region of an equilibrium is presented.

The intersection of a horizontal (x, θ) plane with the C-obstacles is formed by a set of v-points, which are the intersection of the plane with a v-curve, and a set of edge curves or e-curves, which are the intersection of the plane with an e-surface.

Figure 26:
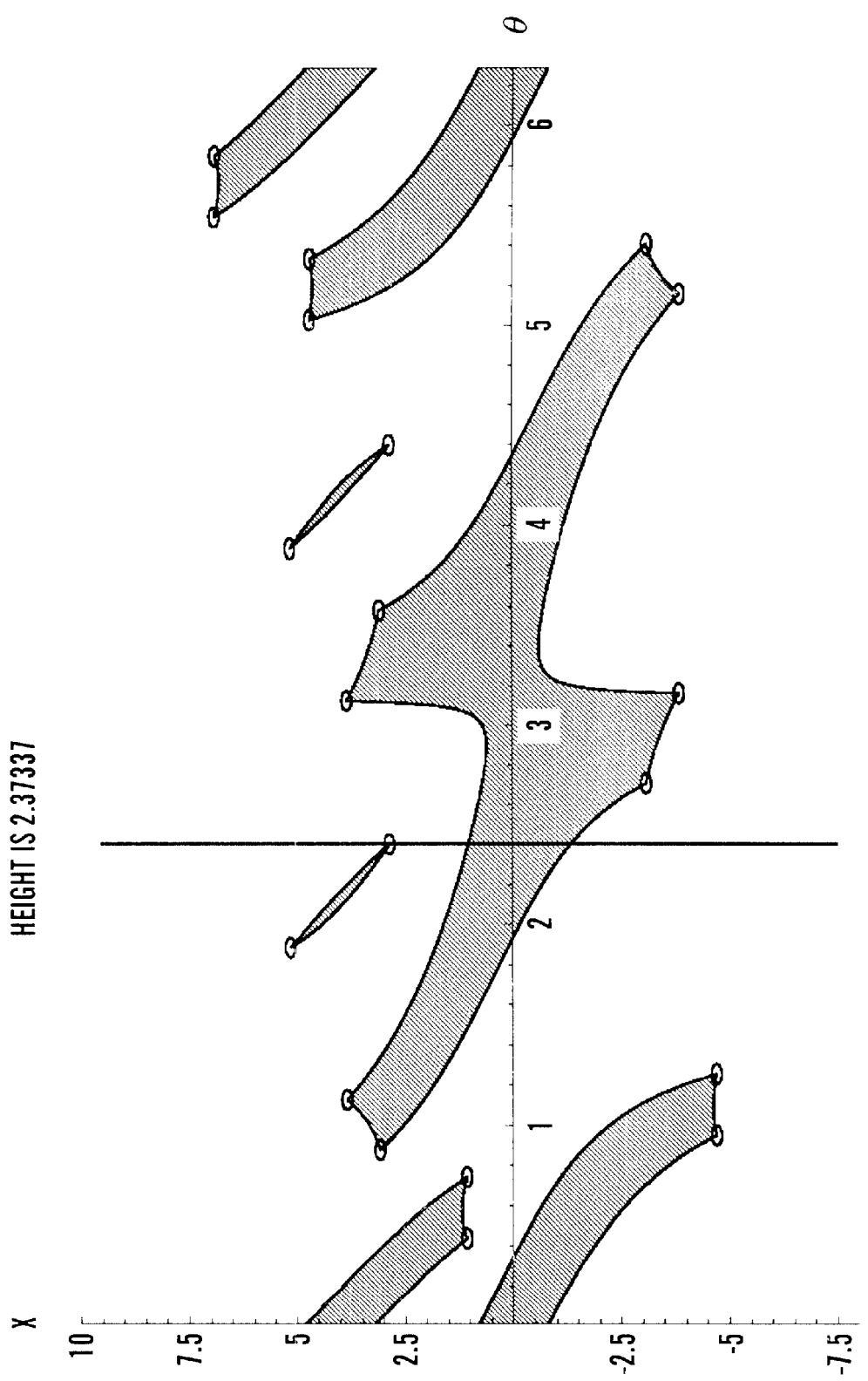
FIG. 26 is illustrative of a C-obstacle at height=2.37337.
Figure 27:
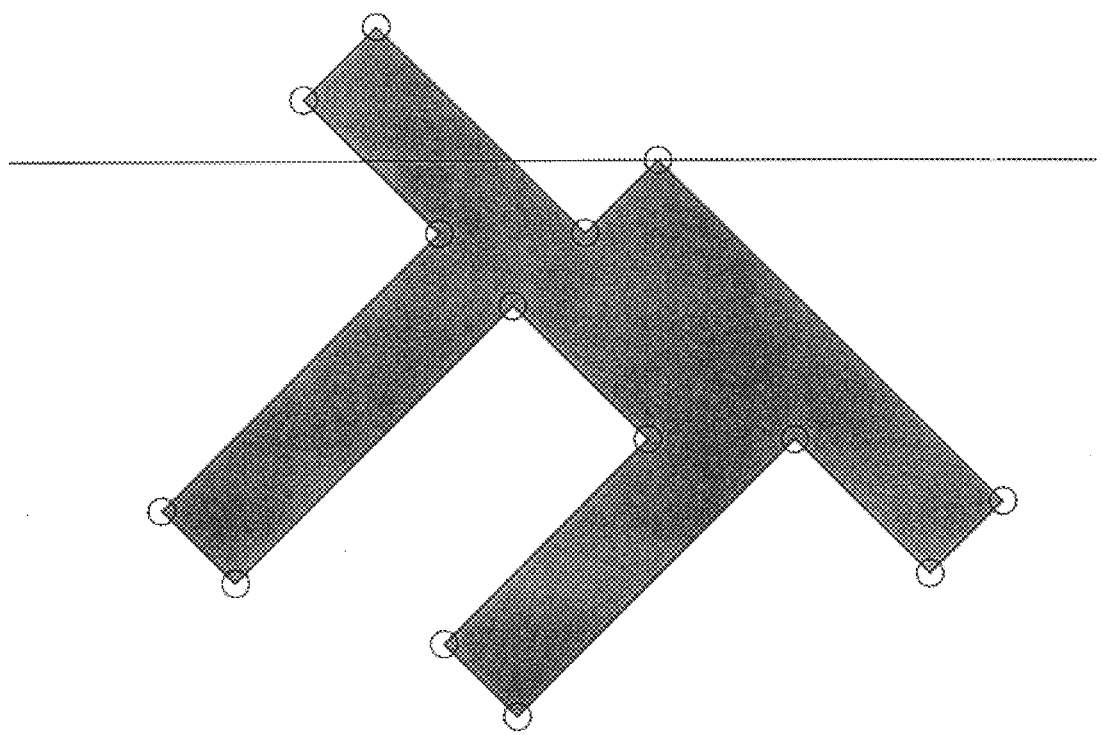
FIG. 27 shows the $\theta$-slice at $\theta=2.4$ radians.

Consider a y-slice of the configuration space of the T-shaped object when the pins (0,0) and (4, −2) are activated. FIG. 26 shows the y-slice at height 2.37337. C-obstacle areas are shaded. V-points are circled and e-curves are linking v-points. The line corresponds to the θ-slice when θ=2.4 radians. FIG. 27 shows the θ-slice when θ=2.4 radians. The height of the horizontal line (i.e. the y-slice) is 2.37337. The C-obstacle is shaded.

E-curves are easily parameterizable when the height of the horizontal plane is not the height of a v-curve at a critical orientation of type I, II or III, which is called here a critical height. Their parameterization is $$x \cos(\theta+\theta_i)+h \sin(\theta+\theta_i)=r_i+x_i \cos(\theta+\theta_i)+y_i \sin(\theta+\theta_i)$$

Now a discussion of the construction or the set of e-curves at any non-critical height and the construction of this set at any critical height is provided.

An e-surface is the surface generated by one edge of the object in the configuration space, and two e-surfaces intersect along a v-curve. A horizontal plane intersects an e-surface along an e-curve, and it intersects a v-curve at a v-point.

Figure 28:
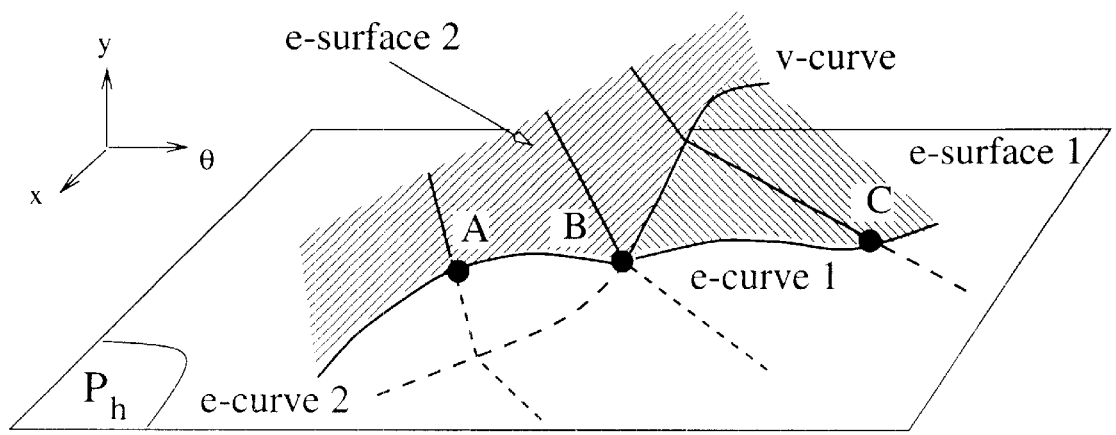
FIG. 28 shows E-curves starting at a v-point B.

Consider a v-point B which is the intersection of a v-curve with the plane $P_h$. The v-curve is defined as the intersection of two e-surfaces, and it intersects $P_h$ in B. In fact, these e-surfaces intersect $P_h$ along e-curves defined over some range of orientations. FIG. 28 shows e-curves starting at a v-point B. $P_h$ is the horizontal plane, and it intersects the e-surfaces along the e-curves. E-curve 2 ends at B while e-curve 1 starts at B. A and C belong to e-curves. The two e-surfaces are dashed differently.

Figure 29:
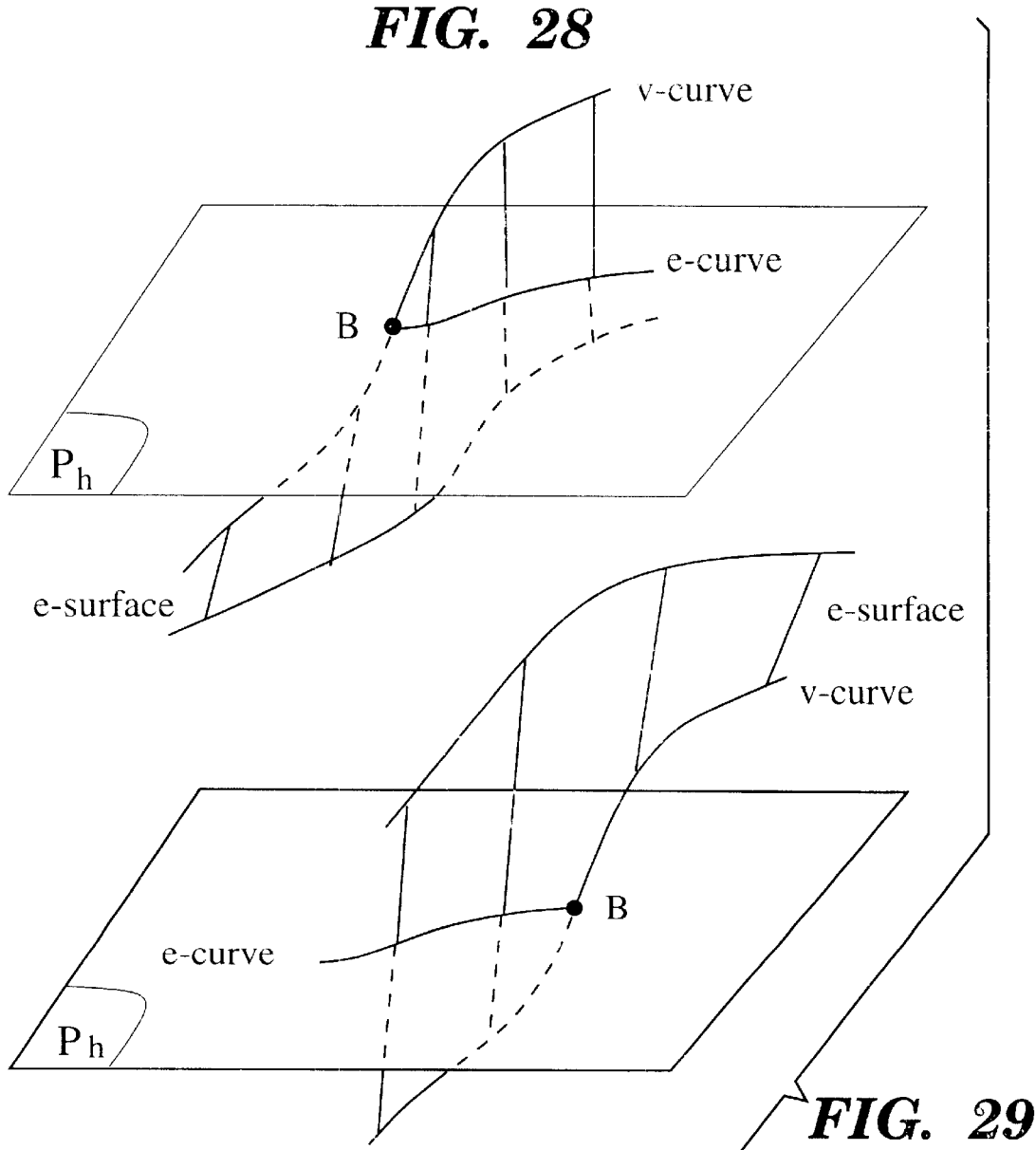
FIG. 29 illustrates an intersection between an e-surface and a horizontal plane the e-curve exists after B and the e-curve is defined before B.

An e-curve must start or end at a v-point. Of course, the local shape of the e-surface determines whether the e-curve starts or ends at the v-point. The e-curve starts (resp. ends) at a v-point if the e-surface intersects the horizontal plane for greater (resp. smaller) orientations. FIG. 29 illustrates the two ways an e-surface can intersect the horizontal plane at a non critical height.

Figure 30:
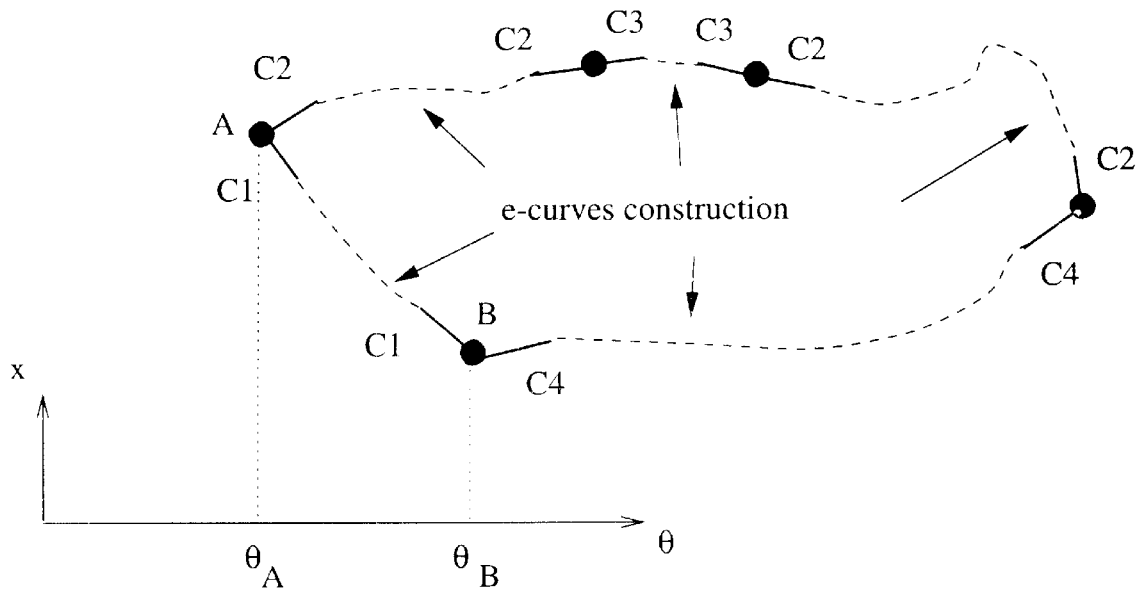
FIG. 30 illustrates v-points being connected by e-curves.

Referring to FIG. 30, a y-slice is formed by e-curves and v-points. In FIG. 30, v-points are connected by e-curves. E-curves are denoted as $C_i$. The start and end portions of the e-curves are shown as bold segments at v-points. Dashed lines represent the constructed e-curves. For instance, $C_1$ starts at A and ends at B. The e-curves are defined over ranges of orientations and their end points are v-points. Consider a single e-curve. If the e-curve starts at some v-point A at orientation $\theta_A$ and ends at v-point B at orientation $\theta_B$, and if it is parameterized by θ, then the e-curve exists over the interval $[\theta_A, \theta_B]$. Using this property for all e-curves allows one to build the whole y-slice.

Following is a method to build a y-slice between two critical heights that subsumes the steps presented before:

1. Find all the v-curves that exist at the given height.
2. Solve equations to find v-points.
3. Find local shape of C-obstacles for each v-point.
4. Connect v-points with e-curves.

The set of e-curves and how they connect v-points does not change between two consecutive critical heights. Thus, the set of v-points only changes at critical heights. Considering the parameterization of an e-surface, its intersection with a horizontal plane $P_{ho}$ at a critical height $h_0$ is always defined as the limit of its intersection with a plane $P_h$ when h tends towards $h_0$. Thus, since the surface of the C-obstacle is composed of e-surfaces, any y-slice can be computed.

Consider two successive vertices of a θ-slice and their corresponding v-curves. Any critical orientation of type I, II or III of one the first v-curve is called a critical orientation of type IV of the second one, and any point of a v-curve at a critical orientation of type I, II, III or IV is called a critical vertex point or cv-point.

The configuration mesh is a non-oriented graph formed by the cv-points (x,y,θ) of the C-obstacle. Two cv-points are connected in the graph if there exists a v-curve to which both of them belong, or if they belong to the same θ-slice and they correspond to successive vertices.

Figure 31:
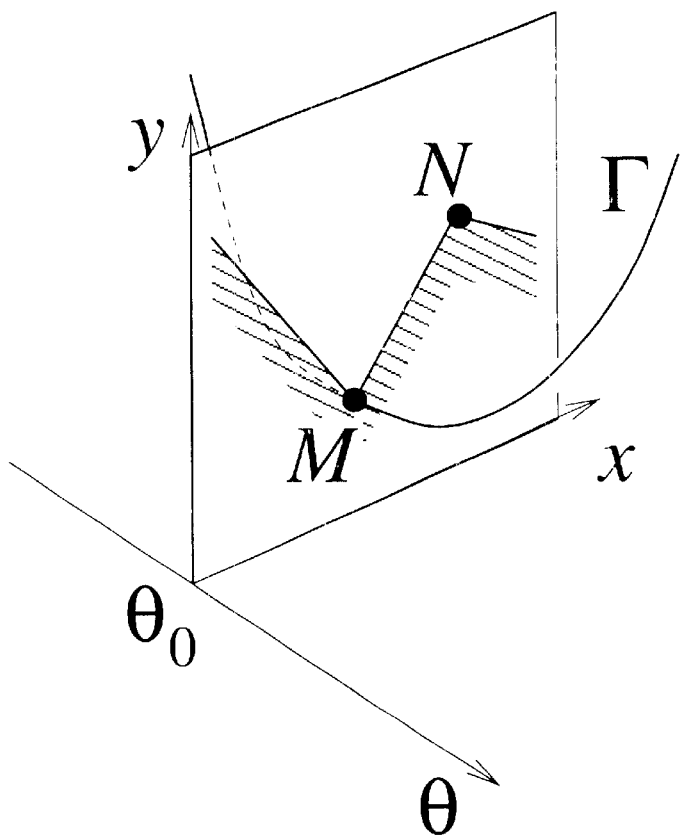
FIG. 31 is an example of a critical orientation of type IV.

For instance, FIG. 31 shows a point M with a critical orientation of type III and one of its neighbor N in the θ-slice. Of course, M and N belong to the configuration mesh.

Since the mesh includes all the cv-points, it also includes all equilibria and saddles. It also reflects the C-obstacle, and the intersection of the C-obstacle with a horizontal plane is fully described by the intersection of the mesh with the horizontal plane. More precisely, all the links which are cut determine the set of v-curves which intersect the horizontal plane, and thus, they also determine the e-curves and v-points which compose the y-slice.

Figure 32:
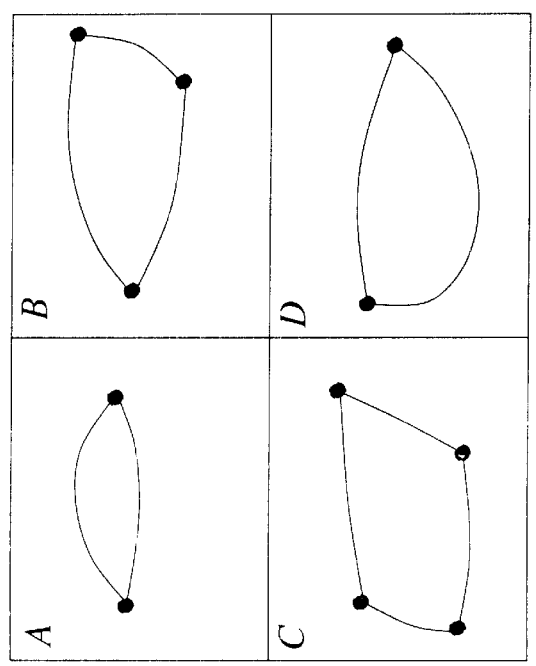
FIG. 32 is an illustration of the change of the set of v-curves at cv-points.
Figure 32:
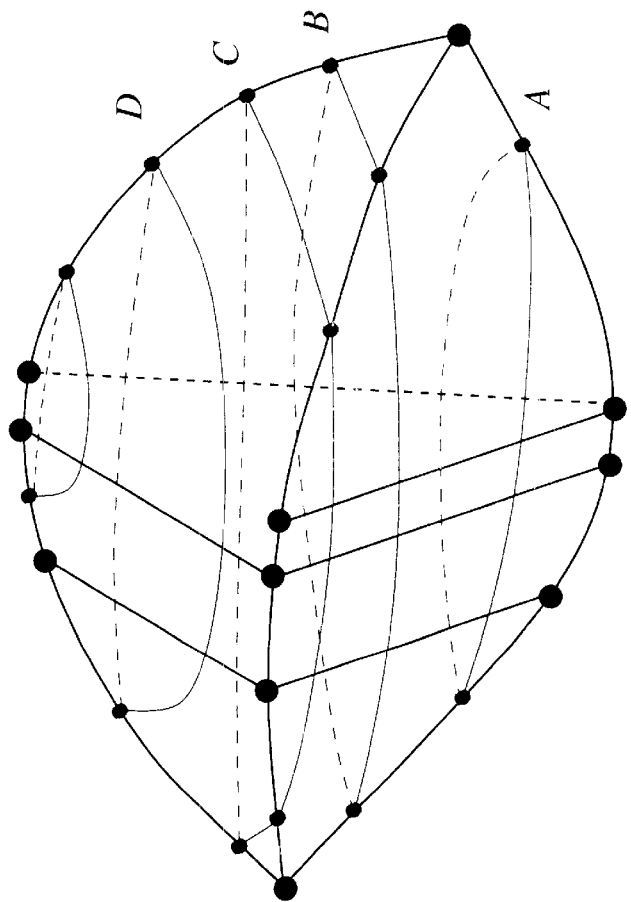

FIG. 32 provides an illustration of the change of the set of v-curves at cv-points. Big black dots represent cv-points. Small ones are v-points. The links of the mesh are represented as thick lines. A–D are the intersections of the mesh with a horizontal plane. FIG. 32 illustrates how the set sets of the v-curves which are cut by a horizontal plane changes as the horizontal plane moves up. For instance, four horizontal cuts are performed on the mesh and they give four different set of e-curves (FIGS. 32A–D).

The mesh is constructed from the set of v-curves and the collection of the polygon samples.

1. Compute the (x,y,θ) coordinates of all cv-points.
2. Create the links between the nodes when there exists a v-curve between them.
3. Create the successor and predecessor of all nodes in their respective polygonal description. Link them.

Since a capture region is determined by all its cv-points and the v-curves they belong to, we apply an upward plane sweep algorithm on the mesh from an equilibrium point. Of course, equilibrium points and saddle points are cv-points and thus, they belong to the mesh. Local boundary is maintained of the capture region as the plane moves upward, and the algorithm stops when a saddle point is encountered on the mesh or when the capture region vanishes.

Figure 33:
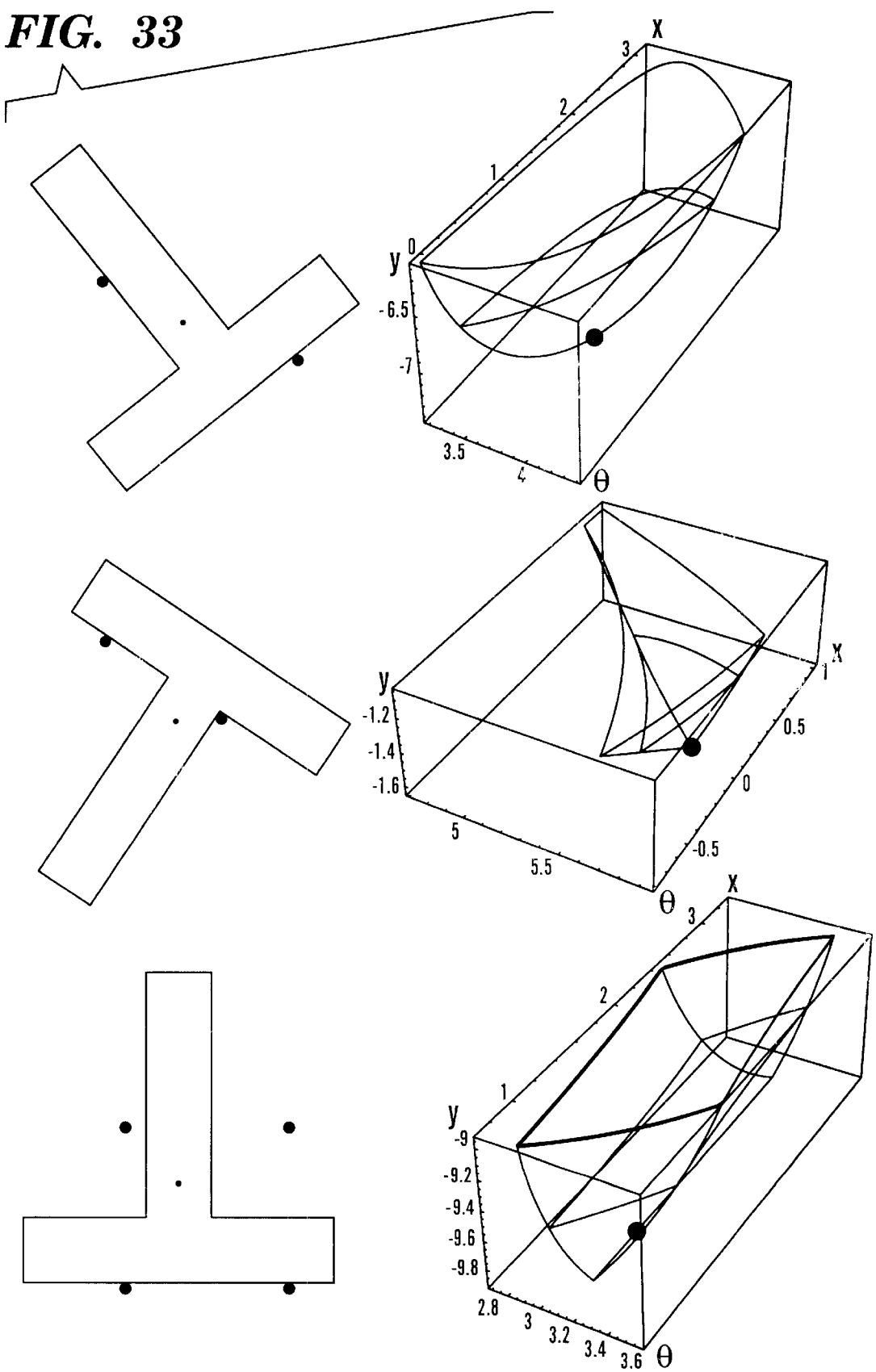
FIG. 33 shows examples of equilibria at their capture regions
Figure 34:
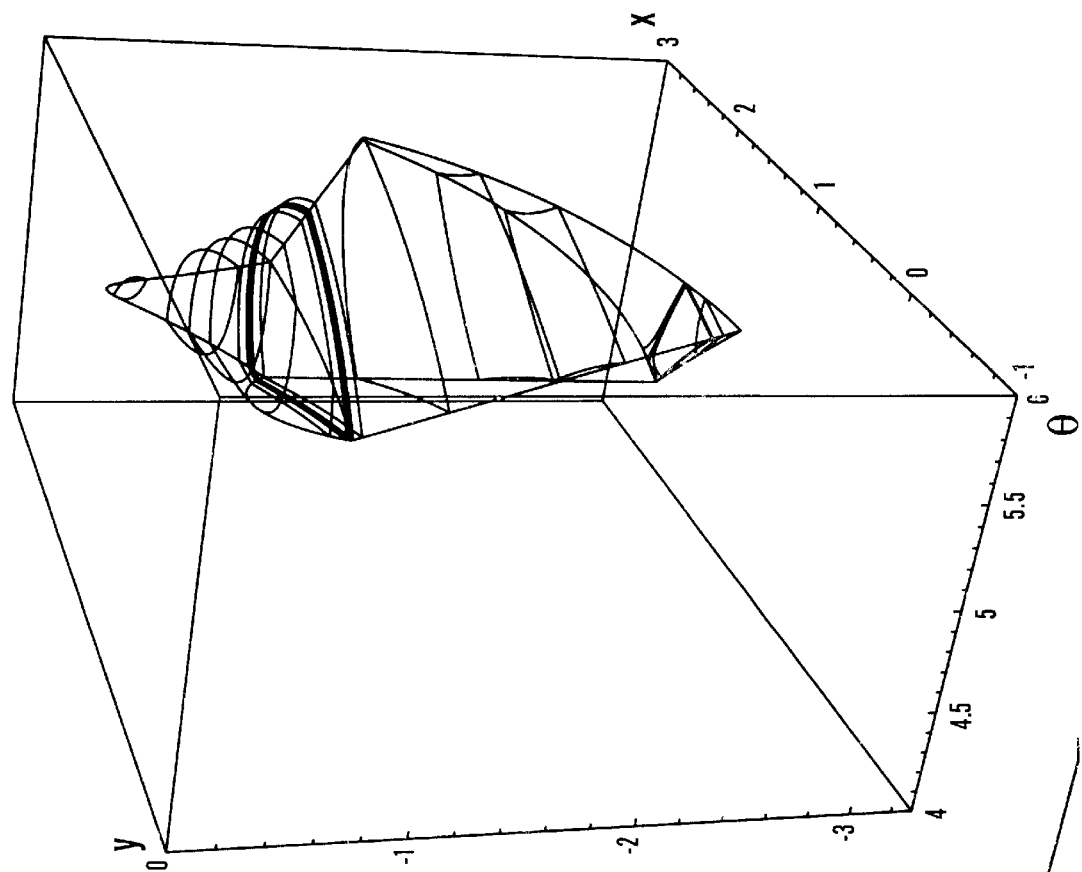
FIG. 34 illustrates an inescapable capture region.
Figure 34:
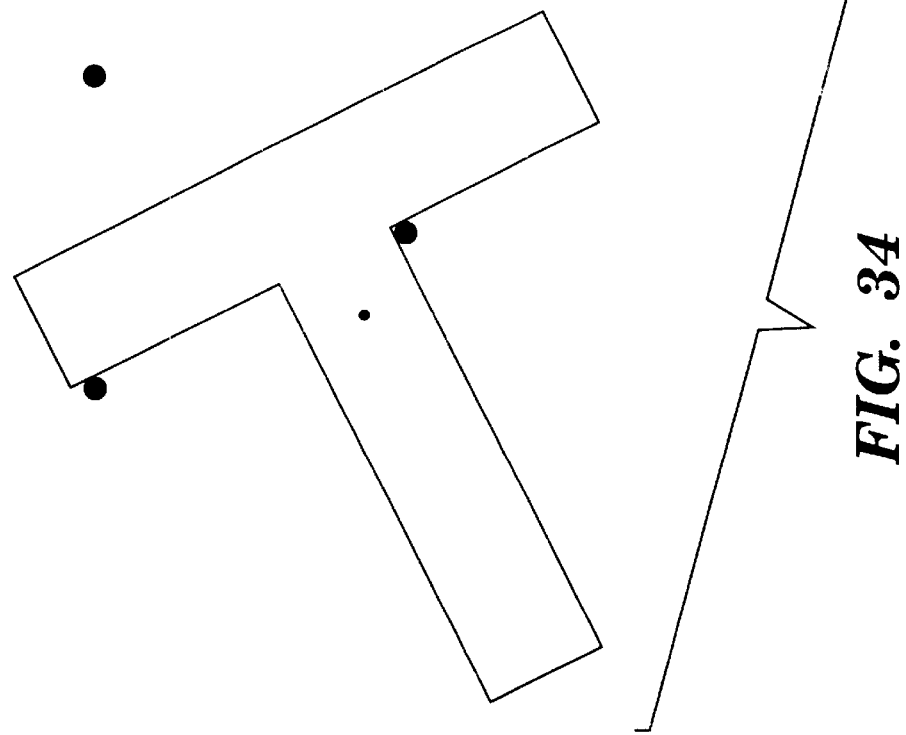

FIG. 33 presents examples of capture regions. An example of a capture region bounded only by obstacle space is presented in FIG. 34.

The complexity of the algorithm depends linearly on the number of visited cv-points. Since only cv-points which belong to the capture region are visited, the time spent on exploration is optimal. The total number of cv-points is proportional to lpe, thus, an upper bound of the number of visited cv-points is O(lpe).

A discussion of manipulation planning is now provided herein. Consider now two pin configurations $P_1$ and $P_2$. If an equilibrium $E_1$ of $P_1$ belongs to the capture region of an equilibrium $E_2$ of $P_2$, an atomic manipulation of the object can be performed: if the object is in $E_1$, and if the pins in $P_1$ are retracted and those in $P_2$ are activated, the object will eventually come to rest at configuration $E_2$. This is guaranteed by the fact that $E_1$ is in the capture region of $E_2$.

Figure 35:
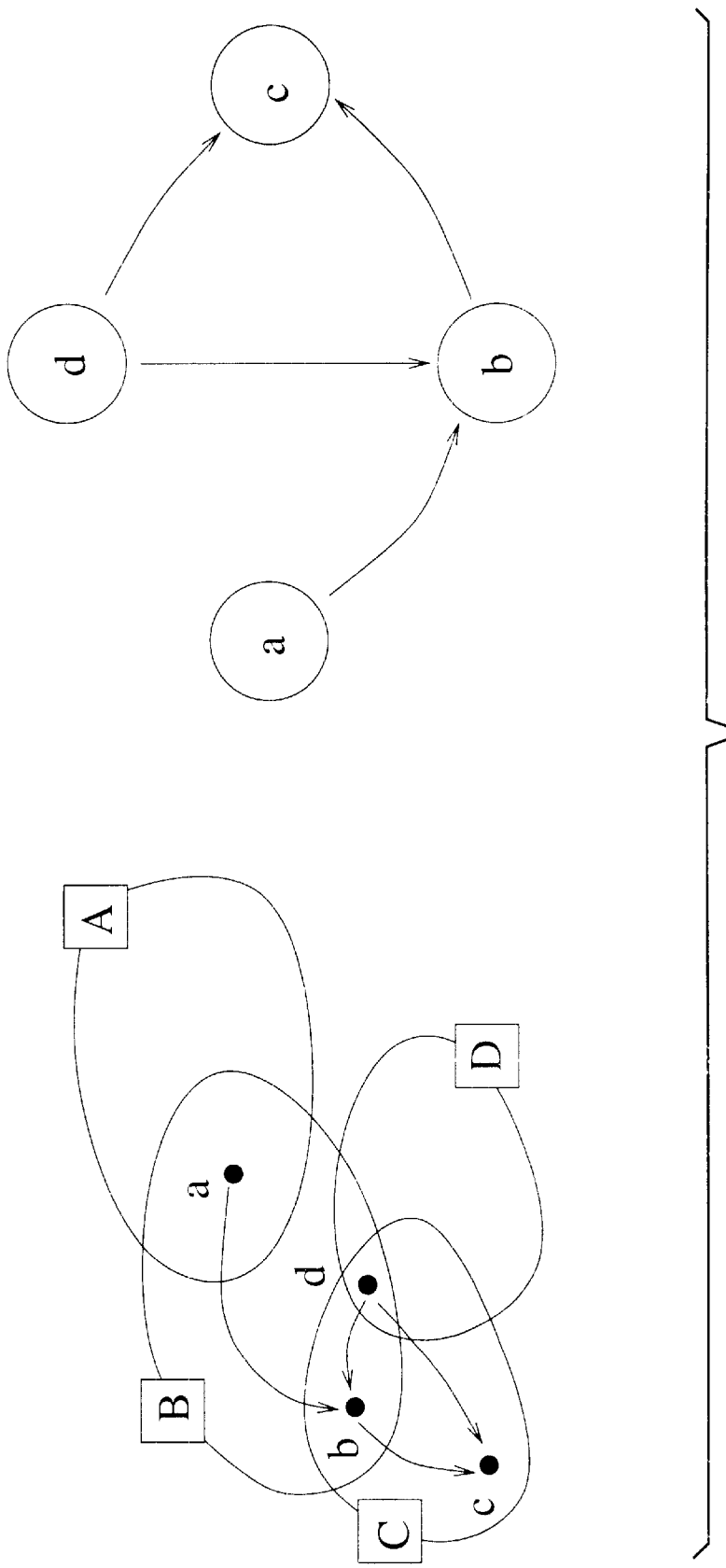
FIG. 35 provides an example of equilibria.

The manipulation apparatus can be modeled as a finite state machine whose each state corresponds to a pin configuration. Each of these states may contain some equilibria and their corresponding capture regions. Manipulation planning amounts to constructing a directed transition graph whose nodes consist of equilibrium configurations and whose arcs link pairs of nodes such that the first equilibrium lies in the capture region of the second one, and then exploring this graph to find paths from initial to goal nodes. FIG. 35 illustrates this idea. FIG. 35 shows example equilibria (a ,b, c and d), their capture regions (A, B, C, D) and the corresponding directed transition graph. Arrows represent possible transitions; for instance, a lies in the capture region of b and is a possible transition. The following describes how to construct the graph and proposes a compact and efficient way to represent all the possible atomic manipulations.

Manipulation apparatus is composed of several rows of pins. In one example, the vertical spacing of the rows is 2 cm, and the pins in a row are spaced at 2 cm intervals. Each pin can be located on the board by its coordinate (x,y), and the set of pins can be generated by the two vectors $V_1=(2,0)$ and $V_2=(1,2)$. Thus, every pin is located by $\lambda V_1+\mu V_2$ where $\lambda$ and $\mu$ are integers. The machine shown in FIGS. 1–4 has been constructed and has thirty pins. The number of pins and the configuration of the pins is provided for exemplary purposes only. Manipulation apparatuses having less pins and different configurations are considered to be within the scope of the present application. The pins are the metal shafts of pneumatic cylinders, which are mounted on a Plexiglas plate slightly tilted from the vertical (see FIG. 1). The pneumatic cylinders are actuated by solenoid valves (see FIG. 4) that are independently controlled by a PC.

Now a discussion of a transition graph depicting the equilibrium states for an object is provided. A set of equivalence classes of pin configurations over the set of pin configurations are now defined. Two pin configurations are equivalent if and only if one is the image of the other by a translation. An equivalence class of pin configurations is denoted by $\tilde{P}_i$. All the pin configurations of the same equivalence class have the same equilibrium configurations, except for a translation. The jth equilibrium configuration class of a pin configuration class is denoted by $\tilde{E}_{i,j}$ and its capture region by $\tilde{C}_{i,j}$.

The transition graph is the directed graph with nodes of equilibria $\tilde{E}_{i,j}$. An arc exists between two nodes $\tilde{E}_{i,j}$ and $\tilde{E}_{i^1j^1}$ if there exists an element $\tilde{E}_{i,j}$ of the equivalence class $\tilde{E}_{i,j}$ which belongs to the capture region of an element $\tilde{E}_{i^1j^1}$, of the equivalence class $\tilde{E}_{i^1j^1}$. Thus, an equilibrium class $\tilde{E}_{i,j}$ is captured by a capture region class $\tilde{C}_{i^1j^1}$, if and only if there exists a translation $T=\lambda V_1+\mu V_2$ where $\lambda$ and $\mu$ are integers, such that $E_{i,j}+T$ is captured by $C_{i^1j^1}$. The computation of these translations is now provided.

The following describes how to generate the transition graph of an object. This can be done in three steps:

1. Generate all configurations of pins which can make simultaneous contact with the object. Identify all the equilibrium configuration classes for these pin configurations.
2. Compute the capture regions of all the equilibrium configurations. The equilibria and their capture regions form the nodes of the transition graph.
3. Compute all the links of the transition graph.

The following sections describe each of these steps.

Figure 36:
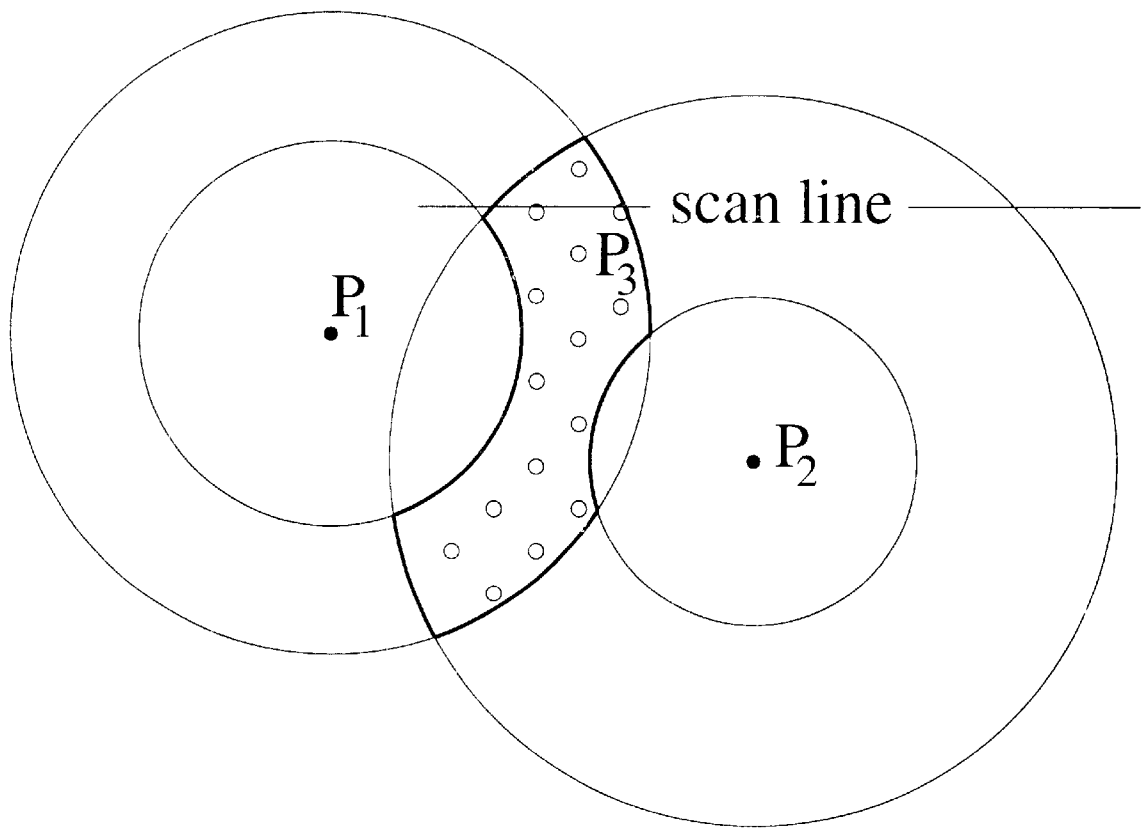
FIG. 36 illustrates constraints on a location of pin $P_3$.

For every pair or triple of edges of the object, an enumeration is made of all the pin configurations which can make simultaneous contact with these edges. This enumeration can be done as described by Wallack and Canny A. Wallack and J. Canny, *Planning for Modular and Hybrid Fixtures,* IEEE Int. Conf. on Robotics and Automation, pages 520–527, San Diego, Calif., 1994, ("Wallack & Canny"), and Brost and Goldberg. Consider a pair of pins in contact with a pair of edges. The minimum and maximum distances between the two edges gives two constraints on the relative location of one pin to the other. FIG. 36 illustrates these constraints with a triple of pins ($P_1$, $P_2$, $P_3$) and a triple of edges ($E_1$, $E_2$, $E_3$). $P_3$ must belong to a ring centered around $P_1$ for the object to be in contact with $P_1$ and $P_3$. Similarly, $P_2$ has to belong to a ring centered at $P_1$ for the object to be in contact with $P_1$ and $P_2$. For a selected position of $P_2$, similar constraints exist between $P_2$ and $P_3$. The intersection area of these constraints gives the positions of $P_3$ for which the object can be in contact with $P_1$, $P_2$, and $P_3$. A scan-line algorithm is used to get the valid positions of $P_3$ on the grid of the manipulation object.

We then identify the equilibrium configurations from the set of configurations where all the pins are in contact with the given set of edges.

Previously a discussion of how to compute the set of pin configurations which can make contact with two or three given edges of a specific object, and how to find all possible equilibrium configurations was provided. For each equilibrium configuration, a capture region is computed as described above. Since the extent of a capture region is determined by local attributes of the C-obstacle, there is no need to build the whole C-obstacle to construct the capture regions. Thus, the C-obstacle is built incrementally until the whole capture region has been found. Only relevant features of the C-obstacle are constructed.

Figure 37:
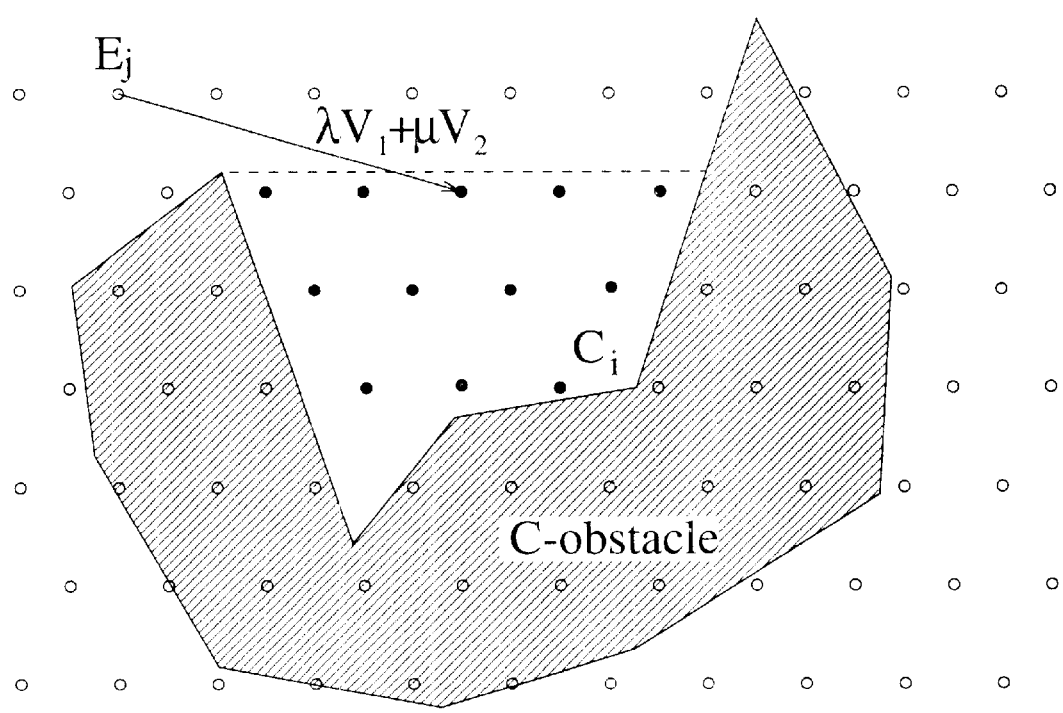
FIG. 37 shows a representation of the images of E.

The previous sections described how to compute the nodes of the transition graph. Now referring to FIG. 37, the problem of building the set of links efficiently is addressed. In FIG. 37, the black dots represent the images of $E_j$ which belong to the capture region $C_i$ of $E_i$ by the translations which are returned, while circles represent the images of $E_j$ which do not belong to $C_i$. The capture region $C_i$ is delimited by the C-obstacle (dashed area) and a maximal height (dashed line). Finding all the links to a node whose equilibrium configuration is $E_i$ (with i indexing the node in the transition graph) takes two steps:

1. Identify every equilibrium configuration $E_i$ whose orientation belongs to the θ range of the capture region of $E_i$. Equilibrium configurations are stored in a binary search tree according to their orientation, and can be rapidly identified.
2. For each selected equilibrium $E_j$, find the θ-section of the capture region of $E_i$ at the orientation of $E_i$. Apply a scan-line conversion algorithm to find all the translations of $E_1$; by $\lambda V_1 + \mu V_2$ which lie in the capture region. A link is created from $E_j$ to $E_i$ if a valid translation exists; all valid translations are stored in the link. If no valid translations exist, the nodes are not linked.

The algorithm used in the manipulation apparatus differs from the algorithm described above. It follows three steps:

1. Build the set of equivalence classes of pin configurations. Keep one instance of every pin configuration class.
2. Compute for each instance all the feasible equilibria of the object and their capture regions. These define the set of nodes of the transition graph.
3. For each node $N_i$, add a directed arc from $N_i$ to a node $N_j$ if there exist valid translations of $N_i$ into the capture region of $N_j$. Valid translations are the links of the transition graph.

The following described in detail each step of the manipulation algorithm.

To cover all the possible equilibria described in the previous chapter, all the pin configurations of the following types are generated:

1. a pair of pins,
2. a triple of pins,
3. a quadruple of pins such that two of them lie on a horizontal line.

Moreover, the pins are chosen so that they all belong to disk of specified diameter. The resulting number of pin configurations is then proportional to the cube of the surface of this disk, since the triples of pins can span the whole disk.

The relation between the number of pin configurations and the number of nodes of the transition graph is a function of the arrangement of the pins on the grid and the shape of the object. An upper bound of the number of nodes can be characterized as the maximum number of equilibria of the object on a pin configuration times the number of pin configurations. This is not a tight upper bound since some pin configurations do not allow any equilibrium configurations.

The entire configuration space of every pin configuration to get the equilibrium configurations and their capture region is built.

The algorithm implemented to find all the translations $\lambda V_1 + \mu V_2$ that bring a point M into a capture region computes the y-slices of the capture region rather than the θ-slices. This fits in with the approach of building the capture regions using the y-slices. It follows three steps:

1. Get the θ and y bounds of the capture region.
2. Since $\mu$ determines the vertical translation of the pins, compute the valid range of $\mu$ from the y bounds of the capture region.
3. For each value of $\mu$, build the corresponding y-slice to find the values of λ, such that $M + \lambda V_1 + \mu V_2$ is in the capture region. The construction of the y-slice is the same for all the points with the same height, and needs to be done only once.
4. Return the valid pairs $(\lambda, \mu)$.

Figure 38:
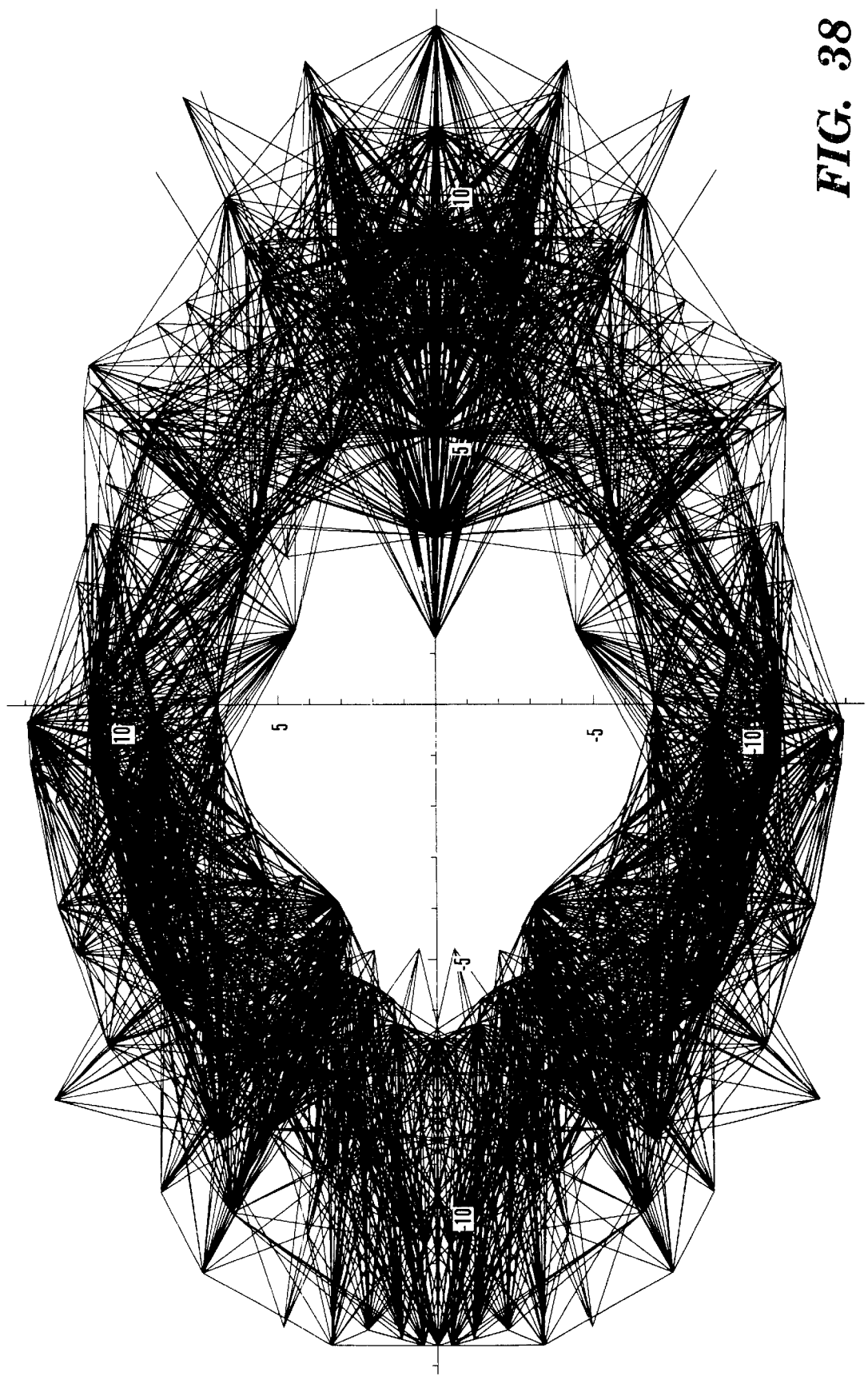
FIG. 38 is a representation of a transition graph for a T-Shaped object.

An implementation of the resulted algorithm transition graph for the T-shaped object is shown in FIG. 38. A point (x, y, θ) of the transition graph is represented as ((y+10)cos (θ), (y+10) sin(θ)). Since the T-shaped object is symmetric along one axis, a transition graph defined over all the possible equilibria on the object manipulation device (i.e., not over the set of equivalence classes) is symmetric. Since a pin configuration is selected to represent an equivalence class of pin configuration, some asymmetries can be introduced if the set of representatives is not symmetric. A careful choice of these guarantees the symmetry of the representation of the graph.

Given the chosen size of the T-shaped object and the pin spacing, there are 1064 different nodes in the transition graph and a total of 14889 links. In one example, the computation of the transition graph took 3 hours and 45 minutes on a 233 MHz Pentium II processor. The computation of all the nodes took 2 hours and 16 minutes, while the computation of the links took 1 hour and 29 minutes.

Now are considered manipulation sequences for the manipulation apparatus. The sequences consist of an exploration of the transition graph which was described earlier. Here two classes of problems, and present generated plans are discussed as well as the actual experiments. The first class of problem consists of bringing an object from a known configuration to a known configuration. The latter is an extension of the first one. It consists of bringing several known initial configurations to a unique goal configuration. Many industrial assembly lines would be simplified with the use of such device.

Figure 39:
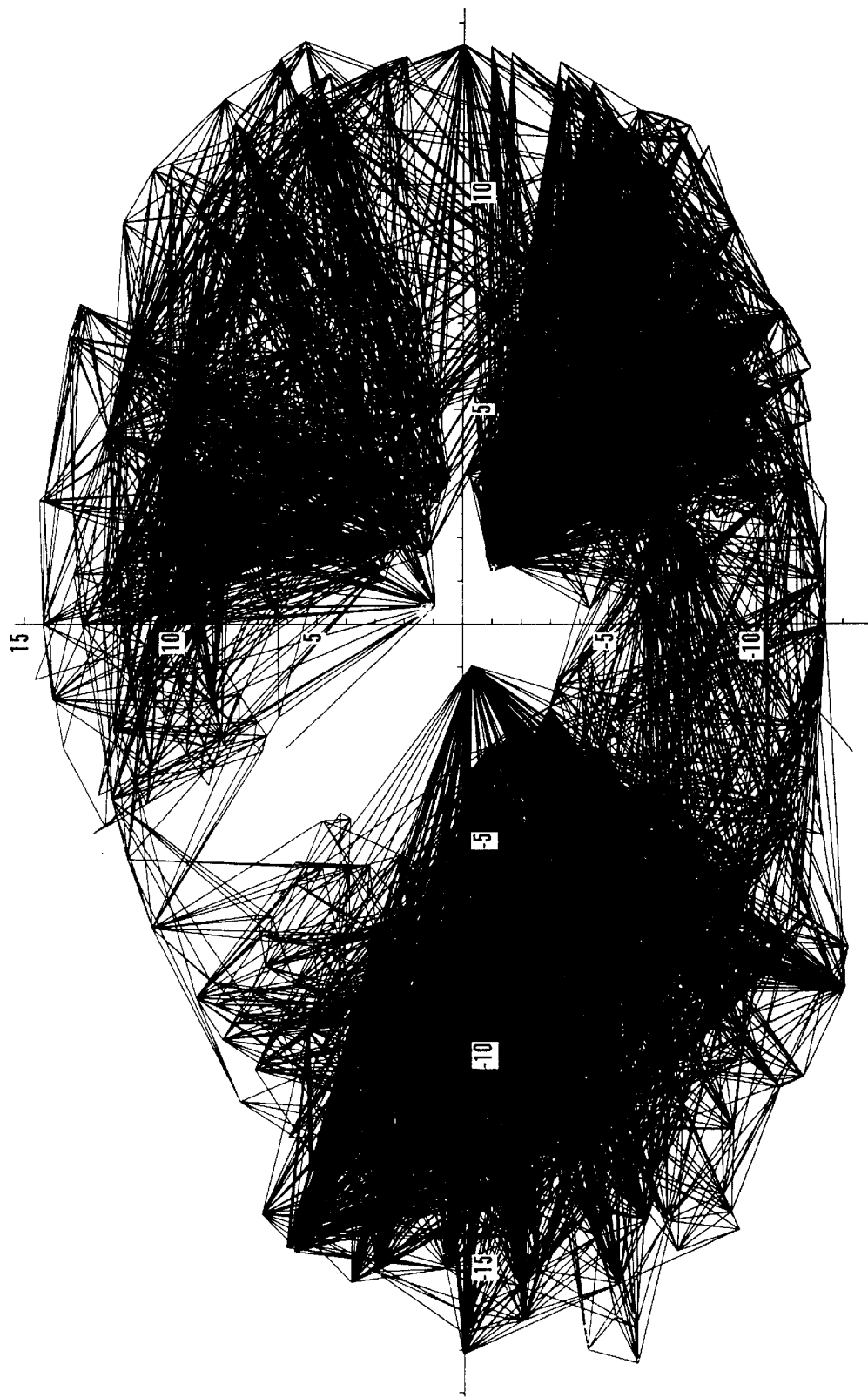
FIG. 39 is a transition graph of a triangular shaped object.
Figure 40:
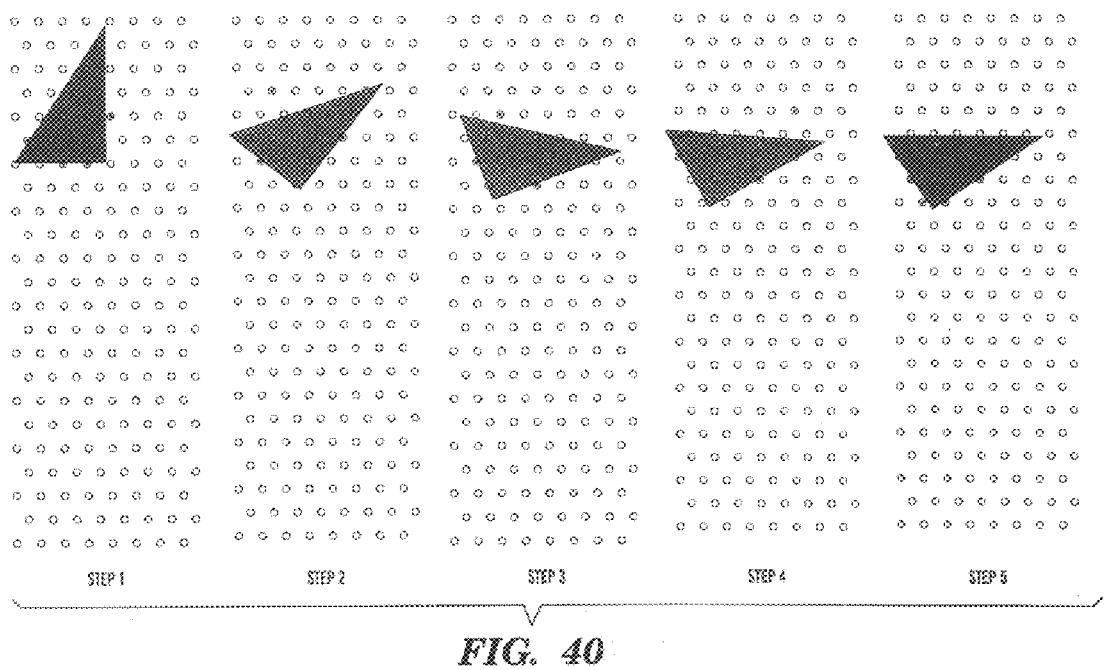
FIGS. 40, 41 and 42 show the steps of a manipulation sequence for a triangular shaped object.
Figure 41:
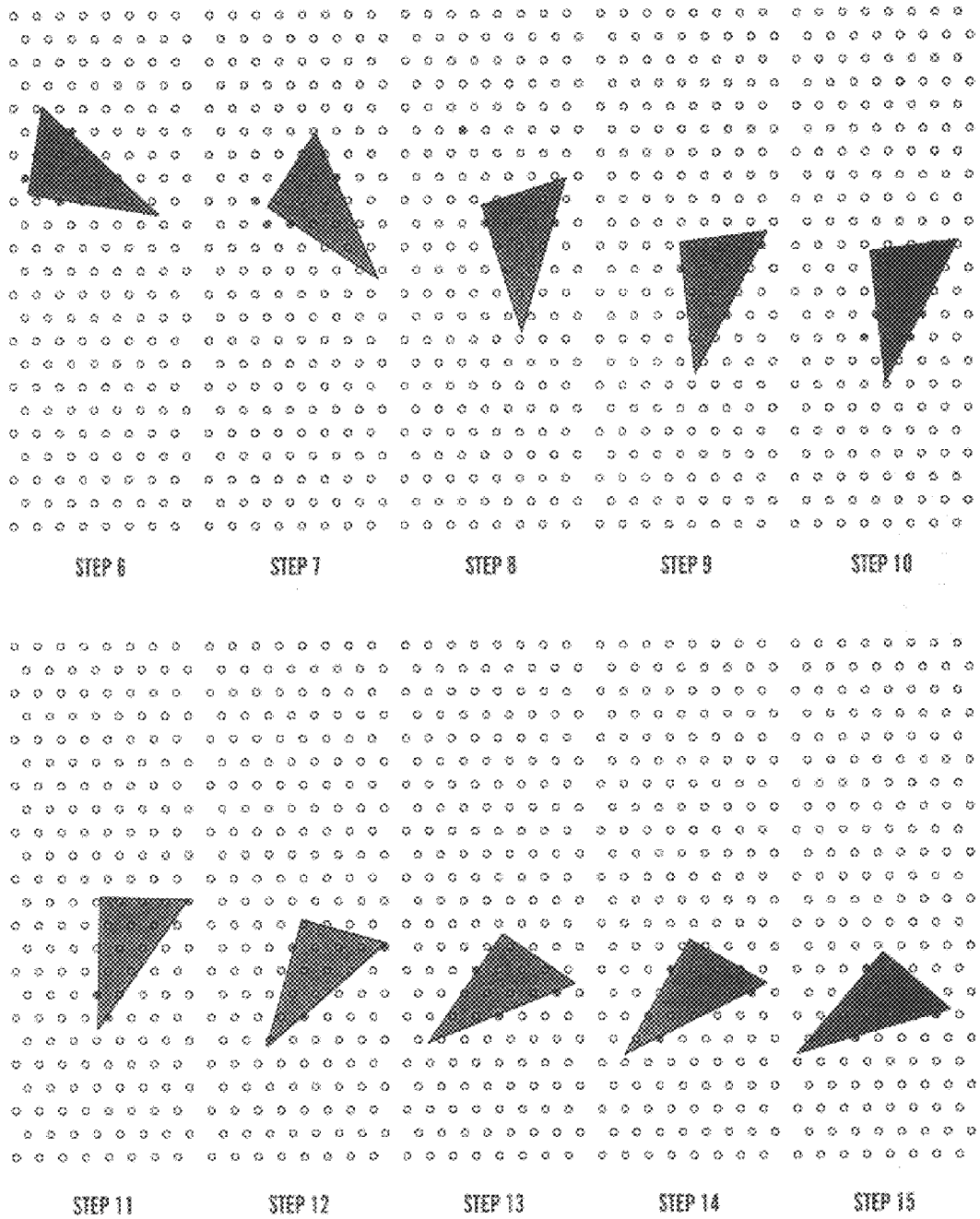
Figure 42:
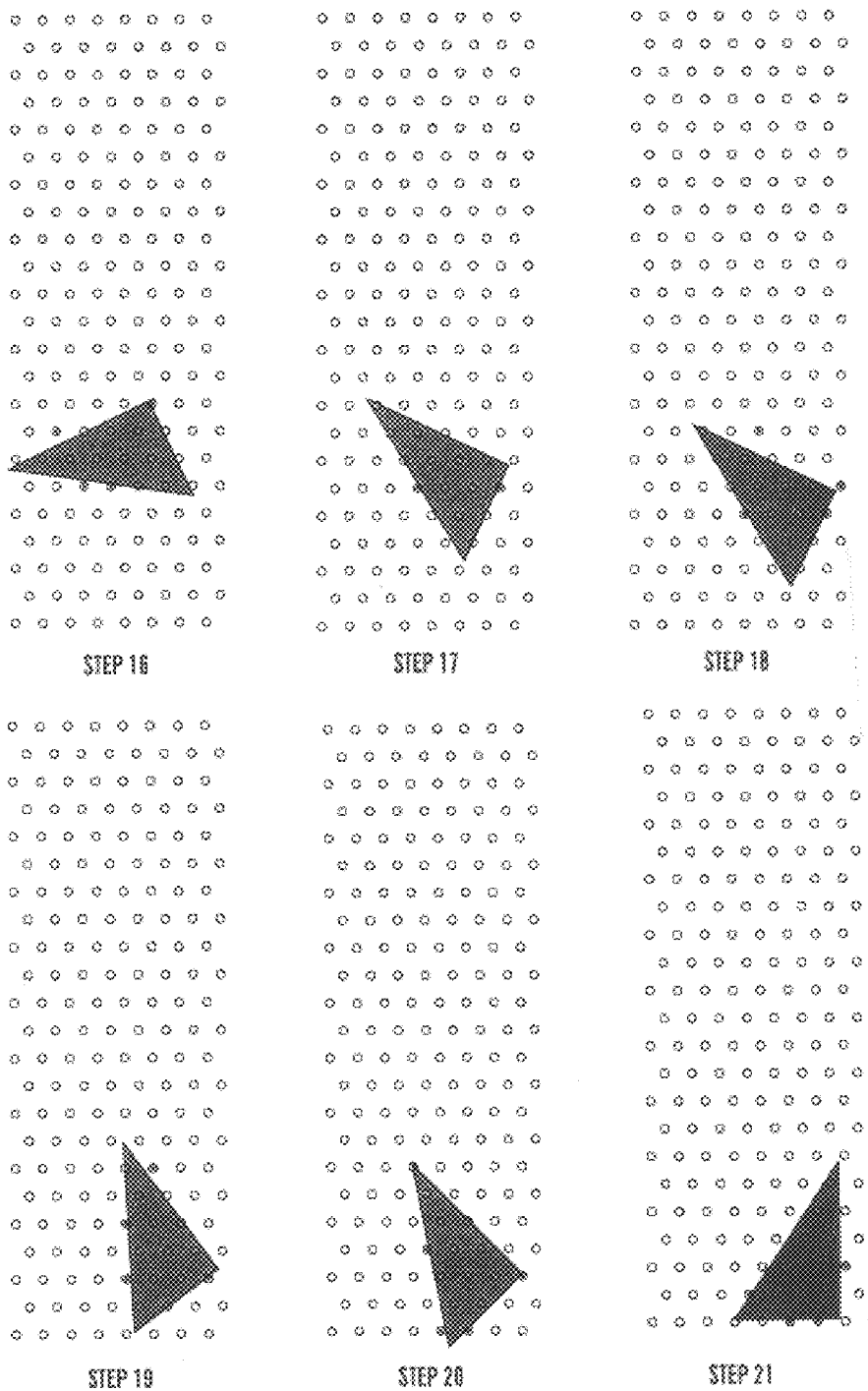

First is addressed the case where the initial configuration is known and a given transformation on the object is preformed. Thus, the initial equivalence configuration class and the goal equivalence configuration class are known. The manipulation problem is reduced to finding a path from the initial class to the goal class. Presented here is a manipulation of a right triangle whose dimensions are 3 inches×4.5 inches. FIG. 39 presents its transition graph. FIG. 40 to FIG. 42 show a manipulation consisting of a rotation of 2π radians. The object is of course translated downward during the manipulation.

A second important class of manipulations is when there exist different starting configurations but the object must be brought to a configuration with the same orientation. Solutions to this problem would enable the manipulation apparatus to accept unoriented parts as input and would output the part in a determined orientation. Nevertheless, it would require the use of a sensor to determine in which initial configuration the object is to decide which manipulation plan to apply. It also requires the existence of a nest of pins on the top of which the object can rest in several possible equilibrium configurations.

Obviously, the goal configuration must be reachable from all the starting configurations of the object. The set of achievable goal configurations is the intersection of the sets of achievable configurations from each starting configuration. Assume here the initial configuration of the object as soon as it comes to rest on the initial state of the manipulation apparatus, and thus, a different plan for each starting configuration is applied. The main interest of this class of problem is to bring the object to a unique configuration, whatever its initial configuration is.

Figure 43:
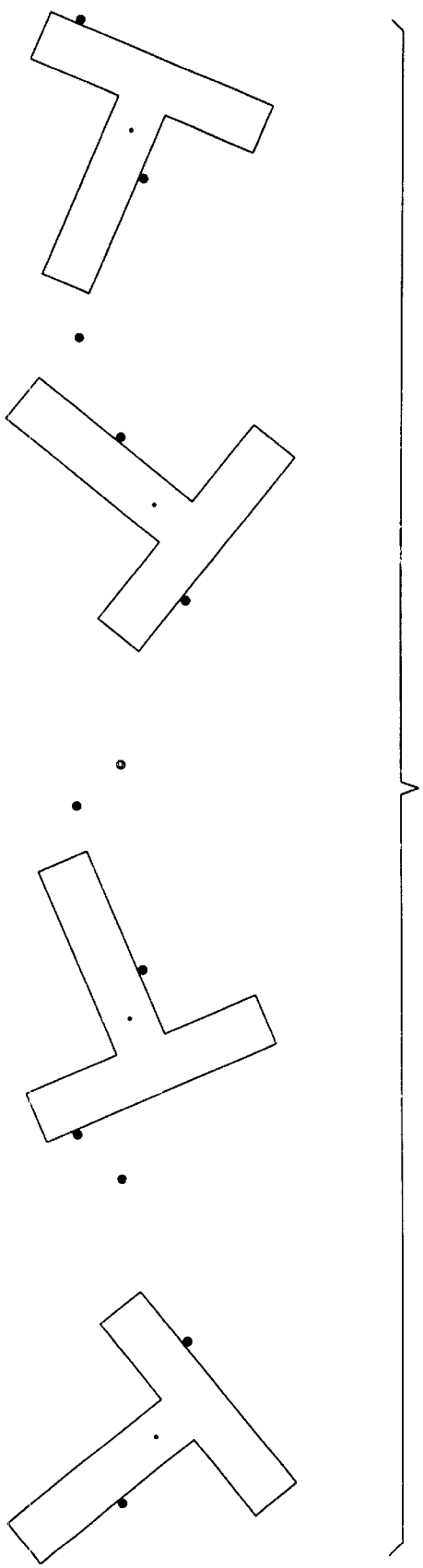
FIG. 43 shows four different equilibrium configurations of an object in a nest.
Figure 44:
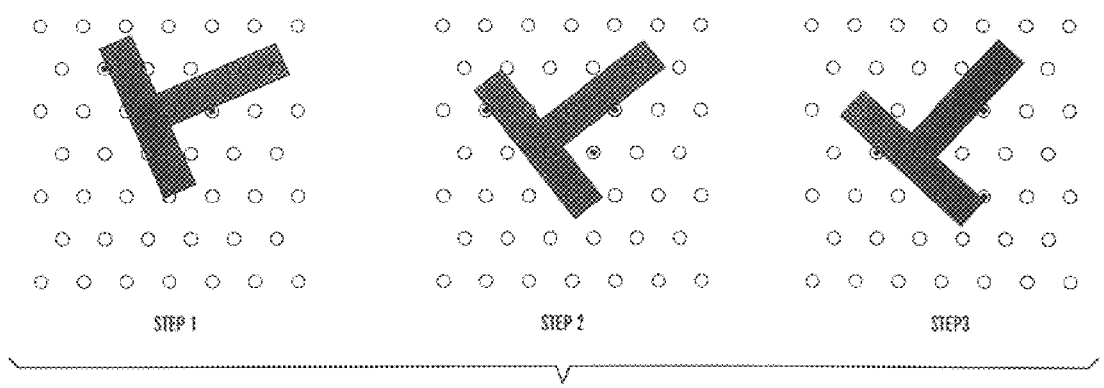
FIGS. 44, 45, 46, 47, 48 and 49 illustrate various steps of a manipulation sequences for a T-Shaped object from various orientations.
Figure 45:
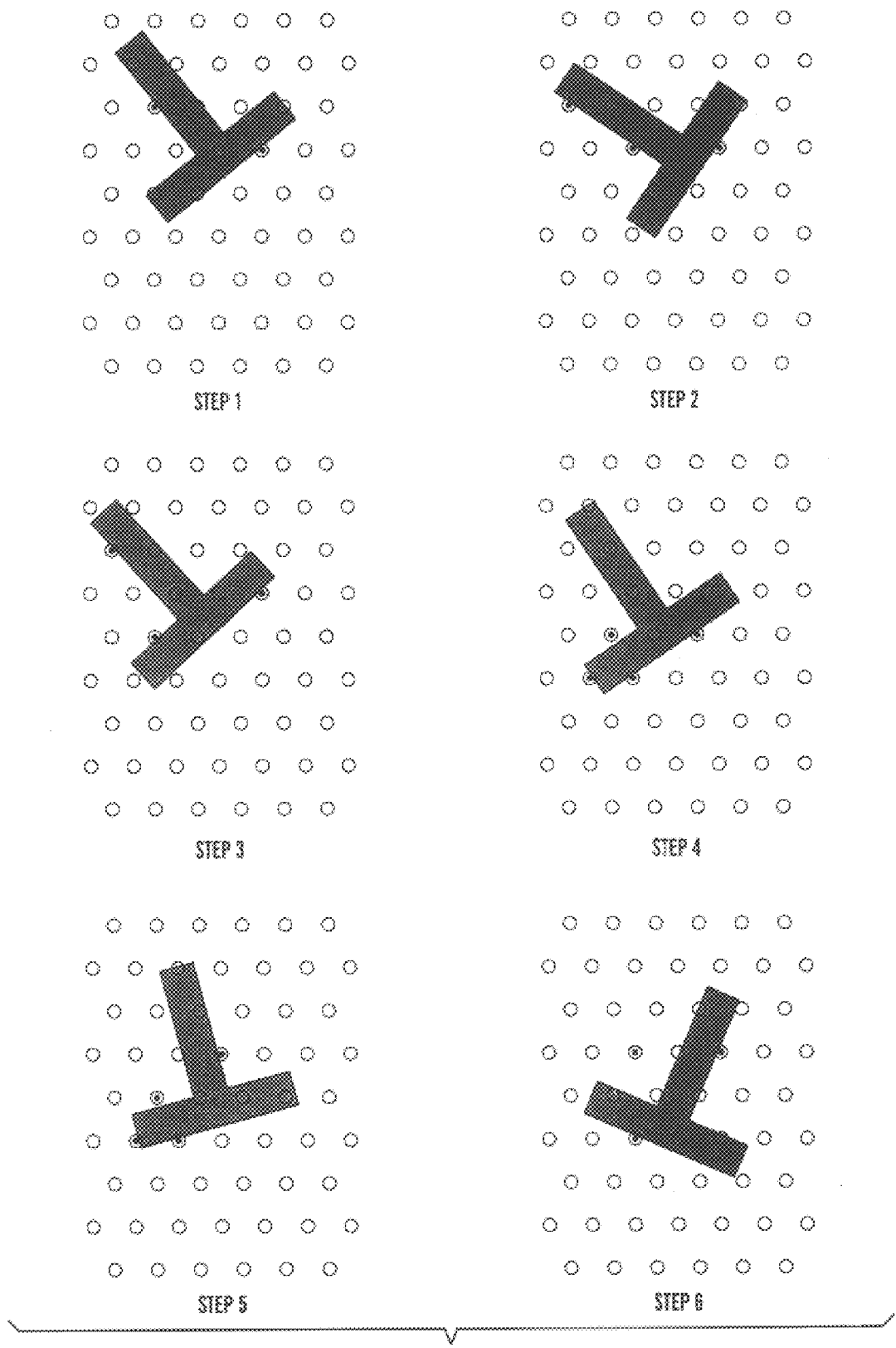
Figure 46:
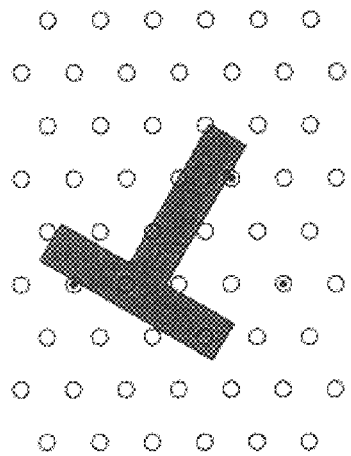
Figure 46:
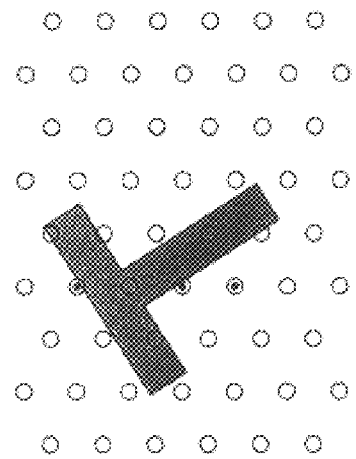
Figure 46:
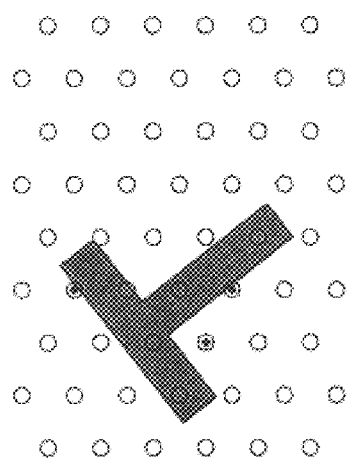
Figure 46:
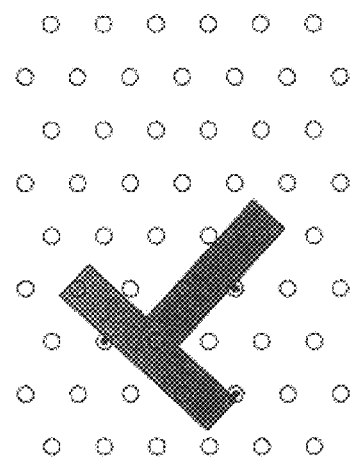
Figure 47:
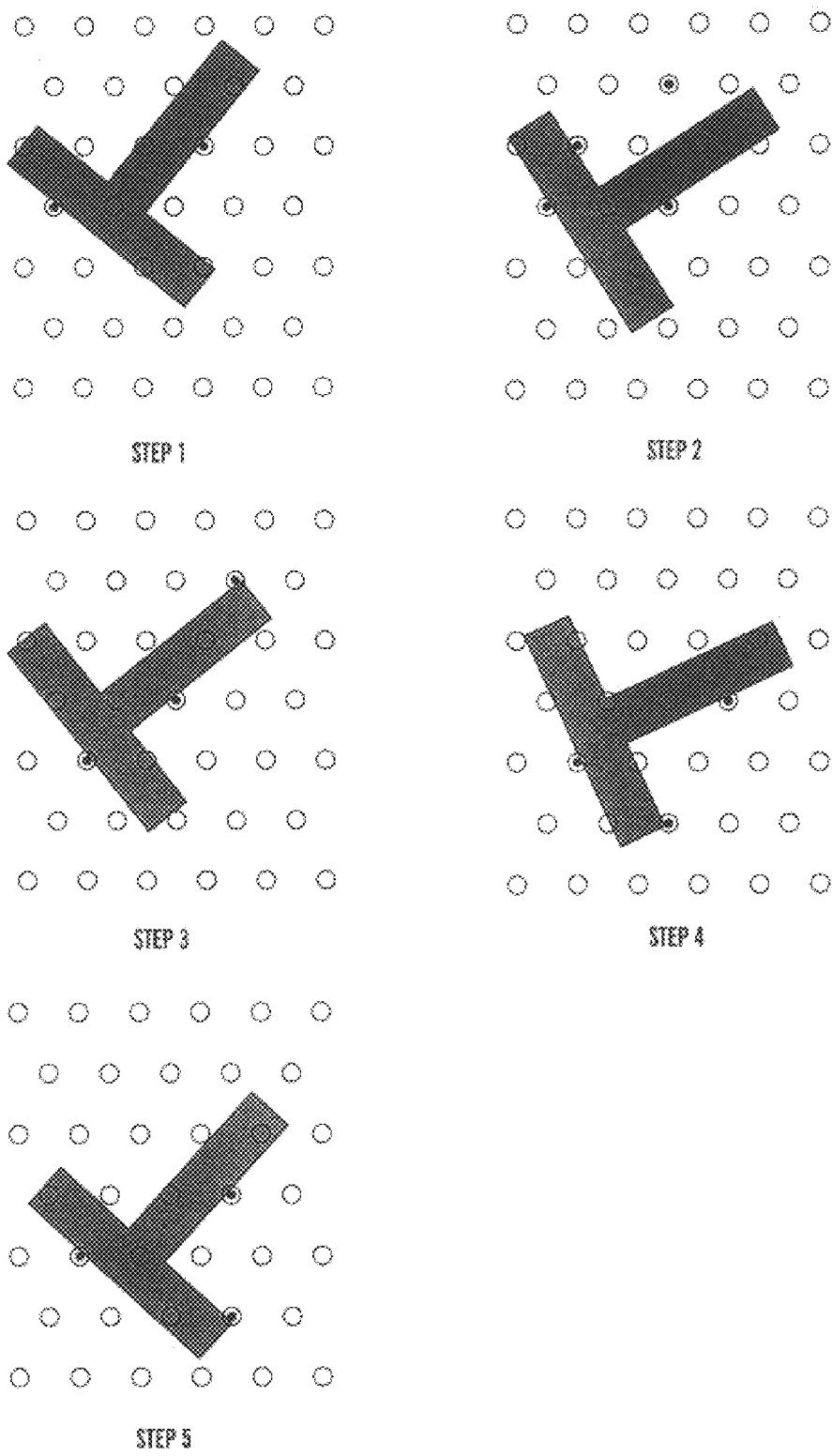
Figure 48:
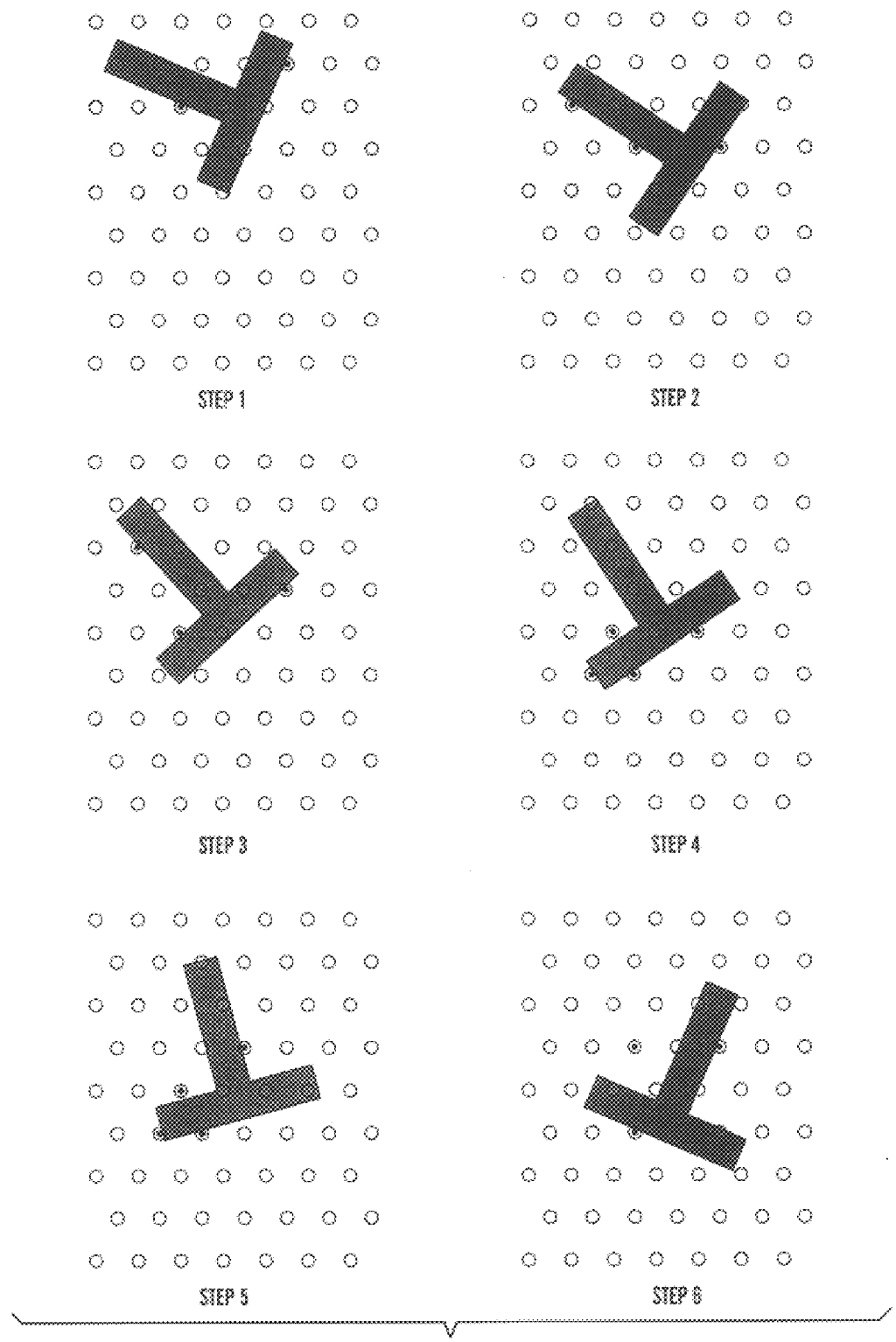
Figure 49:
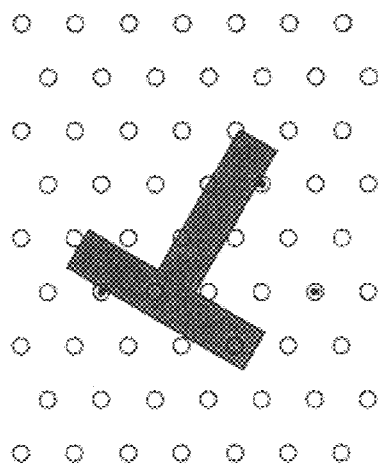
Figure 49:
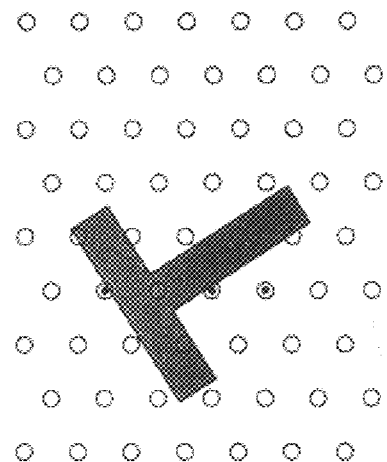
Figure 49:
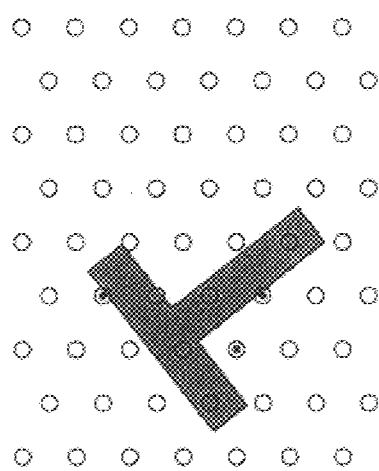
Figure 49:
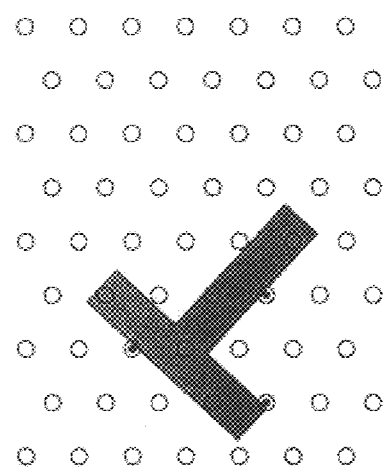

The following example illustrates this class of problem with a nest of three activated pins. The object can be captured by the nest in multiple equilibrium configurations, but some are discarded according to the size of their capture region. Then four different equilibria are kept as shown in FIG. 43. The transition graph of the T-shaped object shows that some configuration classes are achievable from all of these equilibria. FIG. 44 depicts a three step manipulation sequence for the T-shaped object from orientation 1.97373 radians to 2.4005 radians. FIG. 45 depicts a ten step manipulation sequence of the T-shaped object from orientation 3.81992 radians to 2.4005 radians. Steps 1 to 6 are shown. FIG. 46 depicts a ten step manipulation sequence of the T-shaped object from orientation 3.81992 radians to 2.4005 radians. Steps 7 to 10 are shown. FIG. 47 depicts a five-step manipulation sequence of the T-shaped object from orientation 2.46326 radians to 2.4005 radians. FIG. 48 depicts a ten step manipulation sequence of the T-shaped object from orientation 4.30942 radians to 2.4005 radians. Steps 1 to 6 are shown. FIG. 49 depicts a ten step manipulation sequence of the T-shaped object from orientation 4.30942 radians to 2.4005 radians. Steps 7 to 10 are shown. One should note that the object ends with the same orientation, but possibly not the same location on the grid. All these configurations are in fact in the same equivalence class.

Although certain embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method for manipulating an object to a desired state, comprising the steps of:

receiving the object in a grid of retractable pins such that the object rests in an initial equilibrium state;

determining, through employment of a manipulation algorithm, one or more retractable pins to actuate to place the object in the desired state; and actuating the one or more retractable pins.

2. The method of claim 1, wherein the determining step comprises the steps of:

determining, through employment of the manipulation algorithm, one or more intermediate equilibrium states in which the object must be placed before the object reaches the desired state, and utilizing the manipulation algorithm to determine one or more retractable pins to actuate to place the object in the one or more intermediate equilibrium states.

3. The method of claim 2, further comprising the step of:

actuating the one or more pins to place the object in the one or more intermediate equilibrium states.

4. The method of claim 1, wherein the determining step comprises the steps of:

determining all possible equilibrium states for the object, constructing a capture region for each of the all possible equilibrium states, constructing a directed graph having nodes that represent the all possible equilibrium states and arcs that link one or more pairs of nodes such that a first equilibrium state lies in a capture region of a second equilibrium state, and employing the directed graph to determine a path between the first equilibrium state and the desired state.

5. The method of claim 4, wherein the step of constructing a capture region comprises:

calculating a maximal subset of configuration space of the object in a possible equilibrium state such that any motion starting within the maximal subset ends in the possible equilibrium state.

6. The method of claim 1, wherein the desired state comprises an equilibrium state having a desired position for the object and a desired orientation for the object.

7. The method of claim 1, further comprising:

detecting at least one of a position and an orientation of the object.

8. The method of claim 7, wherein the determining step comprises:

employing the at least one of the position and the orientation to determine the one or more pins to actuate to place the object in the desired state.

9. The method of claim 1, wherein the step of actuating comprises the steps of:

outputting one or more coordinated signals to one or more solenoid valves that correspond to the one or more retractable pins, receiving the one or more coordinated signals at the one or more solenoid valves, activating and deactivating the one or more solenoid valves in response to receipt of the one or more coordinated signals, projecting, in response to activation and deactivation of the one or more solenoid valves, the one or more retractable pins out of a surface of a plate to which the one or more retractable pins are mounted, and retracting the one or more retractable pins to a position below the surface of the plate.

10. An apparatus for manipulating an object to a desired state, comprising:

a grid of retractable pins to receive the object;

a control component that determines, through employment of a manipulation algorithm, one or more retractable pins to actuate to place the object in the desired state; and an actuation component, coupled to both the grid of retractable pins and the control component, to actuate the one or more pins.

11. The apparatus of claim 10, further comprising one or more sensors, coupled to the grid, that detect at least one of a position and an orientation of the object.

12. The apparatus of claim 11, wherein the control component employs the at least one of the position and the orientation of the object to determine the one or more retractable pins to actuate to place the object in the desired state.

13. The apparatus of claim 10, wherein the control component includes means for determining one or more intermediate equilibrium states in which the object must be placed before the object reaches the desired state, and means for determining one or more retractable pins to actuate to place the object in the one or more intermediate equilibrium states.

14. The apparatus of claim 13, wherein the control component includes
- means for determining all possible equilibrium states for the object,
- means for constructing a capture region for each of the possible equilibrium states,
- means for constructing a directed graph that has nodes that represent the all possible equilibrium states and has arcs that link one or more pairs of nodes such that a first equilibrium state lies in a capture region of a second equilibrium state, and
- means for employing the directed graph to determine a path between the first equilibrium state and the desired state.

15. The apparatus of claim 14, wherein the control component constructs a capture region through calculation of a maximal subset of configuration space for the object in a possible equilibrium state such that any motion starting within the maximal subset ends in the possible equilibrium state.

16. The apparatus of claim 10, wherein the desired state comprises an equilibrium state having a desired position for the object and a desired orientation for the object.

17. The apparatus of claim 10, wherein the grid of retractable pins comprises:
- a plate, and
- one or more pneumatic cylinders mounted to the plate, in which the one or more retractable pins are each mounted to a corresponding one of the one or more pneumatic cylinders such that the one or more retractable pins are each receivable within an opening of the one or more pneumatic cylinders.

18. The apparatus of claim 17, wherein the actuation component activates the one or more retractable pins to project out of a surface of the plate, and retracts the one or more retractable pins below the surface of the plate.

19. The apparatus of claim 17, further comprising:
- one or more solenoid valves each coupled to a corresponding one of the one or more pneumatic cylinders and coupled to an air supply, wherein the actuation component actuates the one or more retractable pins through the output of one or more coordinated signals that activate and deactivate the one or more solenoid valves.

* * * * *

UNITED STATES PATENT AND TRADEMARK OFFICE
CERTIFICATE OF CORRECTION

PATENT NO. : 6,633,797 B1
DATED : October 14, 2003
INVENTOR(S) : Akella et al.

It is certified that error appears in the above-identified patent and that said Letters Patent is hereby corrected as shown below:

<u>Title page,</u>
Item [76], Inventors, delete "Sebastien L. Blind" and insert -- Sebastien J. Blind --

Signed and Sealed this

Twentieth Day of January, 2004

JON W. DUDAS
*Acting Director of the United States Patent and Trademark Office*